(12) United States Patent
Wang et al.

(10) Patent No.: US 12,510,988 B2
(45) Date of Patent: Dec. 30, 2025

(54) ENHANCED ARCHITECTURE FOR HIGH-PERFORMANCE DETECTION DEVICE TECHNICAL FIELD

(71) Applicant: ASML Netherlands B.V., Veldhoven (NL)

(72) Inventors: Yongxin Wang, San Ramon, CA (US); Matthias Oberst, Nuremberg (DE); Harald Gert Helmut Neubauer, Erlangen (DE); Thomas Schweiger, Nuremberg (DE)

(73) Assignee: ASML Netherlands B.V., Veldhoven (NL)

( * ) Notice: Subject to any disclaimer, the term of this patent is extended or adjusted under 35 U.S.C. 154(b) by 498 days.

(21) Appl. No.: 18/000,118

(22) PCT Filed: May 25, 2021

(86) PCT No.: PCT/EP2021/063947
§ 371 (c)(1),
(2) Date: Nov. 28, 2022

(87) PCT Pub. No.: WO2021/239754
PCT Pub. Date: Dec. 2, 2021

(65) Prior Publication Data
US 2023/0215685 A1 Jul. 6, 2023

Related U.S. Application Data

(60) Provisional application No. 63/031,486, filed on May 28, 2020.

(51) Int. Cl.
*G06F 3/041* (2006.01)
(52) U.S. Cl.
CPC .............................. *G06F 3/04164* (2019.05)

(58) Field of Classification Search
USPC .......................................................... 250/397
See application file for complete search history.

(56) References Cited

U.S. PATENT DOCUMENTS

| 6,897,458 B2 | 5/2005 | Wieland et al. | |
|---|---|---|---|
| 2004/0268096 A1* | 12/2004 | Master | G06F 9/3885 |
| | | | 348/222.1 |

(Continued)

FOREIGN PATENT DOCUMENTS

| CN | 101300656 A | 11/2008 |
|---|---|---|
| GB | 2352323 A | 1/2001 |

(Continued)

OTHER PUBLICATIONS

International Search Report issued in related PCT International Application No. PCT/EP2021/063947; mailed Aug. 31, 2021 (2 pgs.).

*Primary Examiner* — Kiet T Nguyen
(74) *Attorney, Agent, or Firm* — Finnegan, Henderson, Farabow, Garrett & Dunner, LLP

(57) ABSTRACT

A detector includes a plurality of sensing elements, section circuitry that communicatively couples a first set of sensing elements to an input of first signal processing circuitry, and a switch network that connects sets of sensing elements. Inter-element switches may connect adjacent sensing elements, including those in a diagonal direction. An output bus may be connected to each sensing element of the first set by a switching element. There may be a common output (pickup point) arranged at one sensing element that is configured to output signals from the first set. Various switching and wiring schemes are proposed. For example, the common output may be directly connected to the switch network. A switch may be provided between the output bus and first signal processing circuitry. A switch may be pro- (Continued)

vided between the switch network and the first signal processing circuitry.

19 Claims, 25 Drawing Sheets

(56) References Cited

U.S. PATENT DOCUMENTS

| | | |
|---|---|---|
| 2005/0242302 A1 | 11/2005 | Platzgummer et al. |
| 2005/0269528 A1 | 12/2005 | Kruit |
| 2015/0348738 A1 | 12/2015 | Zeidler et al. |
| 2015/0348749 A1 | 12/2015 | Lang et al. |
| 2015/0357157 A1 | 12/2015 | Mueller et al. |
| 2016/0071696 A1 | 3/2016 | Kuiper et al. |

FOREIGN PATENT DOCUMENTS

| | | |
|---|---|---|
| WO | WO 0160456 A1 | 8/2001 |
| WO | WO 02/15223 A1 | 2/2002 |
| WO | WO 05/024881 A2 | 3/2005 |
| WO | 2019053173 A1 | 3/2019 |
| WO | WO 2019/053174 A1 | 3/2019 |
| WO | 2019201544 A1 | 10/2019 |
| WO | WO 2019/192821 A1 | 10/2019 |

\* cited by examiner

ENHANCED ARCHITECTURE FOR HIGH-PERFORMANCE DETECTION DEVICE TECHNICAL FIELD

CROSS-REFERENCE TO RELATED APPLICATIONS

This application claims priority to International Application No. PCT/EP2021/063947, filed May 25, 2021, and published as WO 2021/239754 A1, which claims priority of U.S. application 63/031,486 which was filed on May 28, 2020. The contents of these applications are incorporated herein by reference in their entireties.

TECHNICAL FIELD

The description herein relates to detectors, and more particularly, to detectors that may be applicable to charged particle detection.

BACKGROUND

In manufacturing processes of integrated circuits (ICs), unfinished or finished circuit components are inspected to ensure that they are manufactured according to design and are free of defects. An inspection system utilizing an optical microscope typically has a resolution down to a few hundred nanometers, and the resolution is limited by the wavelength of light. As the physical sizes of IC components continue to reduce down to sub-100 or even sub-10 nanometers, inspection systems capable of higher resolution than those utilizing optical microscopes are needed.

A charged particle (e.g., electron) beam microscope, such as a scanning electron microscope (SEM) or a transmission electron microscope (TEM), capable of resolution down to less than a nanometer, serves as a practical tool for inspecting IC components having a feature size that is sub-100 nanometers. With a SEM, electrons of a single primary charged-particle beam, or electrons of a plurality of primary charged-particle beams, can be focused at locations of interest of a wafer under inspection. The primary electrons interact with the wafer and may be backscattered or may cause the wafer to emit secondary electrons. The intensity of the electron beams comprising the backscattered electrons and the secondary electrons may vary based on the properties of the internal and external structures of the wafer, and thereby may indicate whether the wafer has defects.

SUMMARY

Embodiments consistent with the present disclosure include apparatuses, systems, and methods for beam detection for a charged-particle inspection system, such as ultrafast beam current detection. In some embodiments, a detector may include a set of sensing elements including a first set of sensing elements and a second set of sensing elements. The detector may also include first section circuitry configured to communicatively couple the first set of sensing elements to an input of first signal processing circuitry. The detector may further include second section circuitry configured to communicatively couple the second set of sensing elements to an input of second signal processing circuitry. The detector may further include interconnection circuitry configured to communicatively couple an output of the first signal processing circuitry to an output of the second signal processing circuitry. In some embodiments, the detection system may further include an interface configured to control image signal processing of the detection system.

In some embodiments, a charged-particle inspection system may include a charged-particle beam source configured to generate a primary charged-particle beam for scanning a sample. The charged-particle inspection system may also include a detector configured to receive a secondary charged-particle beam exiting from a point of incidence of the primary charged-particle beam. The detector may include sets of sensing elements including a first set of sensing elements and a second set of sensing elements. The detector may also include first section circuitry configured to communicatively couple the first set of sensing elements to an input of first signal processing circuitry. The detector may further include second section circuitry configured to communicatively couple the second set of sensing elements to an input of second signal processing circuitry. The detector may further include interconnection circuitry configured to communicatively couple an output of the first signal processing circuitry to an output of the second signal processing circuitry.

In some embodiments, the first signal processing circuitry may include a first amplifier, and the second signal processing circuitry may include a second amplifier. At least one of the first amplifier or the second amplifier may be configured to perform one of receiving a current signal and outputting an amplified current signal, or receiving an electric-charge signal and outputting an amplified electric-charge signal.

In some embodiments, a computer-implemented method may include determining a sensing-element group comprising a sensing element being projected by a beam spot of a charged-particle beam in a charged-particle detector. The computer-implemented method may also include determining whether a total analog signal bandwidth for processing an output signal of the sensing-element group under a predetermined pixel rate satisfies a condition. The computer-implemented method may further include, based on a determination that the total analog signal bandwidth satisfies the condition, dividing the sensing-element group into a plurality of sensing-element subgroups, each sensing-element subgroup comprising at least one sensing element of the sensing-element group. The computer-implemented method may further include communicatively coupling the plurality of sensing-element subgroups to a plurality of signal processing circuits of the charged-particle detector. The computer-implemented method may further include determining a combined signal using output signals of the plurality of signal processing circuits at a first output of an interconnection layer communicatively coupled to the plurality of signal processing circuits. The computer-implemented method may further include outputting the combined signal to a first analog-to-digital converter (ADC) communicatively coupled to the first output of the interconnection layer.

In some embodiments, a detector may include a set of sensing elements including a first common output. The detector may also include inter-element switching elements configured to communicatively couple adjacent sensing elements of the set of sensing elements. The detector may further include an output bus configured to be communicatively coupled to each sensing elements of the set of sensing elements. The detector may further include a junction configured to be communicatively coupled to the first common output via a first switching element and to the output bus via a second switching element. The detector may further include a switch network arranged between the first common output and the first switching element, including an inter-set switching element configured to communicatively couple the first common output to a second common output in another set of sensing elements.

In some embodiments, a detection system may include a detector, as discussed above. The detection system may further include an output bus configured to be communicatively coupled to each sensing elements of the set of sensing elements. The detection system may further include a junction configured to be communicatively coupled to the first common output via a first switching element and to the output bus via a second switching element. The detection system may further include a switch network arranged between the first common output and the first switching element, including an inter-set switching element configured to communicatively couple the first common output to a second common output in another set of sensing elements. The detection system may further include signal processing circuitry communicatively coupled downstream from the junction, configured to process a signal from the junction.

In some embodiments, a charged-particle inspection system may include a charged-particle beam source configured to generate a primary charged-particle beam for scanning a sample. The charged-particle inspection system may also include a detector configured to receive a secondary charged-particle beam exiting from a point of incidence of the primary charged-particle beam. The detector may include a set of sensing elements including a first common output. The detector may also include inter-element switching elements configured to communicatively couple adjacent sensing elements of the set of sensing elements. The detector may further include an output bus configured to be communicatively coupled to each sensing element of the set of sensing elements. The detector may further include a junction configured to be communicatively coupled to the first common output via a first switching element and to the output bus via a second switching element. The detector may further include a switch network arranged between the first common output and the first switching element, including an inter-set switching element configured to communicatively couple the first common output to a second common output in another set of sensing elements.

In some embodiments, a computer-implemented method may include receiving charged particles of a secondary charged-particle beam at a first section of sensing elements and a second section of sensing elements of a charged-particle detector, wherein the first section and the second section are adjacent sections being capable of independent charged-particle detection. The computer-implemented method may also include receiving instruction data indicative of one of a first mode or a second mode for operating the charged-particle detector. The computer-implemented method may further include, based on the instruction data, causing one of outputting a combined signal determined using signals from at least one of the first section or the second section corresponding to the second mode, or outputting independent signals from at least one of the first section or the second section corresponding to the first mode.

In some embodiments, a non-transitory computer-readable medium may store a set of instructions that is executable by at least one processor of an apparatus to cause the apparatus to perform a method. The method may include receiving charged particles of a secondary charged-particle beam at a first section of sensing elements and a second section of sensing elements of a charged-particle detector, wherein the first section and the second section are adjacent sections being capable of independent charged-particle detection. The method may also include receiving instruction data indicative of one of a first mode or a second mode for operating the charged-particle detector. The method may further include, based on the instruction data, causing one of outputting a combined signal determined using signals from at least one of the first section or the second section corresponding to the second mode, or outputting independent signals from at least one of the first section or the second section corresponding to the first mode.

In some embodiments, inter-element switching elements provided in a detector may include a first inter-element switching element configured to communicatively couple a first sensing element to a second sensing element, wherein the first sensing element and the second sensing element are arranged along a first direction of the set of sensing elements. The inter-element switching elements may also include a second inter-element switching element configured to communicatively couple the first sensing element to a third sensing element, wherein the first sensing element and the third sensing element are arranged along a second direction orthogonal to the first direction. The inter-element switching elements may further include a third inter-element switching element configured to communicatively couple the second sensing element to the third sensing element.

In some embodiments, a computer-implemented method may include receiving charged particles of a secondary charged-particle beam at a first sensing element and a second sensing element of a charged-particle detector, wherein the first sensing element and the second sensing element are adjacent sensing elements communicatively coupled by an inter-element switching element in a diagonal direction in a section of sensing elements. The computer-implemented method may also include outputting a common signal by adding a first signal output by the first sensing element to a second signal output by the second sensing element.

In some embodiments, a non-transitory computer-readable medium may store a set of instructions that is executable by at least one processor of an apparatus to cause the apparatus to perform a method. The method may include receiving charged particles of a secondary charged-particle beam at a first sensing element and a second sensing element of a charged-particle detector, wherein the first sensing element and the second sensing element are adjacent sensing elements communicatively coupled by an inter-element switching element in a diagonal direction in a section of sensing elements. The method may also include outputting a common signal by adding a first signal output by the first sensing element to a second signal output by the second sensing element.

DETAILED DESCRIPTION

Figure 1:
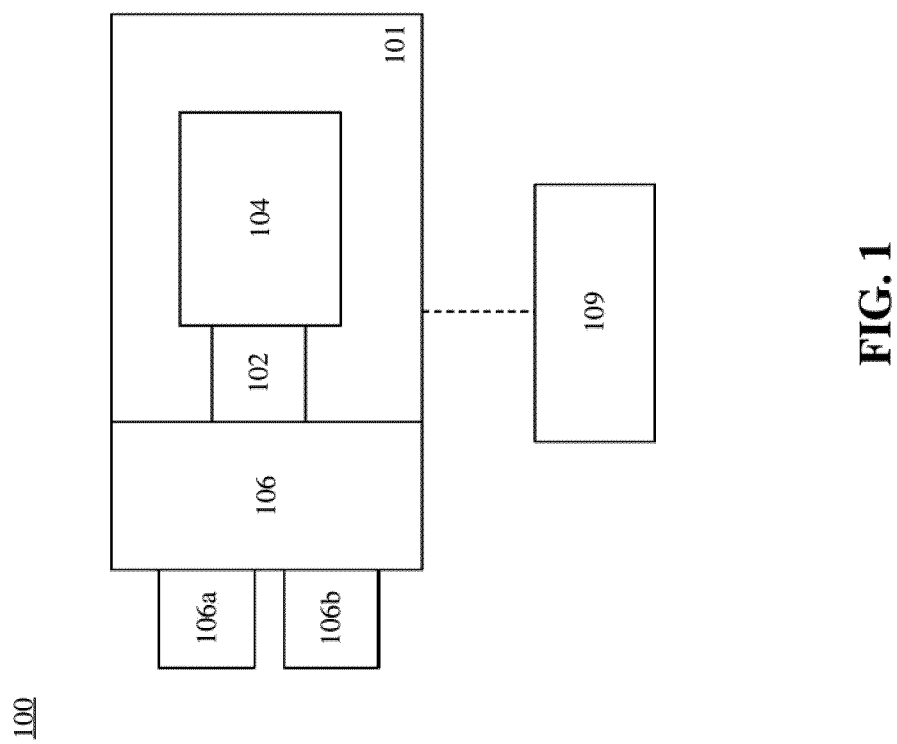
FIG. 1 is a schematic diagram illustrating an exemplary charged-particle beam inspection system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For example, although some embodiments are described in the context of utilizing charged-particle beams (e.g., electron beams), the disclosure is not so limited. Other types of charged particle beams may be similarly applied. Furthermore, other imaging systems may be used, such as optical imaging, photodetection, x-ray detection, or the like.

Electronic devices are constructed of circuits formed on a piece of semiconductor material called a substrate. The semiconductor material may include, for example, silicon, gallium arsenide, indium phosphide, or silicon germanium, or the like. Many circuits may be formed together on the same piece of silicon and are called integrated circuits or ICs. The size of these circuits has decreased dramatically so that many more of them can be fit on the substrate. For example, an IC chip in a smartphone can be as small as a thumbnail and yet may include over 2 billion transistors, the size of each transistor being less than 1/1000th the size of a human hair.

Making these ICs with extremely small structures or components is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process; that is, to improve the overall yield of the process.

One component of improving yield is monitoring the chip-making process to ensure that it is producing a sufficient number of functional integrated circuits. One way to monitor the process is to inspect the chip circuit structures at various stages of their formation. Inspection can be carried out using a scanning charged-particle microscope ("SCPM"). For example, an SCPM may be a scanning electron microscope (SEM). A SCPM can be used to image these extremely small structures, in effect, taking a "picture" of the structures of the wafer. The image can be used to determine if the structure was formed properly in the proper location. If the structure is defective, then the process can be adjusted, so the defect is less likely to recur.

The working principle of a SEM is similar to a camera. A camera takes a picture by receiving and recording intensity of light reflected or emitted from people or objects. A SEM takes a "picture" by receiving and recording energies or quantities of electrons reflected or emitted from the structures of the wafer. Before taking such a "picture," an electron beam may be projected onto the structures, and when the electrons are reflected or emitted ("exiting") from the structures (e.g., from the wafer surface, from the structures underneath the wafer surface, or both), a detector of the SEM may receive and record the energies or quantities of those electrons to generate an inspection image. To take such a "picture," the electron beam may scan through the wafer (e.g., in a line-by-line or zig-zag manner), and the detector may receive exiting electrons coming from a region under electron-beam projection (referred to as a "beam spot"). The detector may receive and record exiting electrons from each beam spot one at a time and join the information recorded for all the beam spots to generate the inspection image. Some SEMs use a single electron beam (referred to as a "single-beam SEM") to take a single "picture" to generate the inspection image, while some SEMs use multiple electron beams (referred to as a "multi-beam SEM") to take multiple "sub-pictures" of the wafer in parallel and stitch them together to generate the inspection image. By using multiple electron beams, the SEM may provide more electron beams onto the structures for obtaining these multiple "sub-pictures," resulting in more electrons exiting from the structures. Accordingly, the detector may receive more exiting electrons simultaneously and generate inspection images of the structures of the wafer with higher efficiency and faster speed.

Exiting electrons received by the detector of the SEM may cause the detector to generate electrical signals (e.g., current signals or voltage signals) commensurate to the energy of the exiting electrons and the intensity of the electron beam. For example, the amplitudes of the electrical signals may be commensurate to the charges of the received exiting electrons. The detector may output the electrical signals to an image processor, and the image processor may process the electrical signals to form the image of structures of the wafer. A multi-beam SEM system uses multiple electron beams for inspection, and a detector of the multi-beam SEM system may have multiple sections to receive them. Each section may have multiple sensing elements and may be used to form a "picture" of a sub-region of the wafer. The "picture" generated based on signals from each section of the detector may be merged to form a complete picture of the inspected wafer.

The sections of the detector may be communicatively interconnected. Each section of the detector may have corresponding signal processing circuits for processing the electrical signals generated by the detector. When an electron beam impinges on a section, its signal processing circuits may be activated for signal processing. When an electron beam impinges on multiple adjacent sections, their signal processing circuits may be activated in a coordinated way for signal processing. When no electron beam impinges on the section, its signal processing circuits may be deactivated. When an electron beam impinges on a malfunctioning section, signal processing circuits of its adjacent section may be activated for signal processing. By such an interconnecting-section design, the detector of the SEM may provide flexibilities and malfunction tolerance to signal processing of the detector.

The detector has many performance indicators. One indicator is the "pixel rate," which is the rate at which pixels of the inspection image are generated. The pixel rate may indicate the digital data processing bandwidth in a digital system, and the maximum pixel rate of a detector may indicate its maximum digital data processing speed. Another indicator is the "analog signal bandwidth," which is the frequency range between the lowest and highest attainable frequency of analog signals. High-frequency analog signals may reflect "details" of the inspected structures. The analog signal bandwidth indicates the detection capability of the detector and fineness of the inspection results, which is a different performance indicator from the pixel rate. For example, even if the pixel rate is high, the inspection image may still be blurred if the analog signal bandwidth is low, because some details of the structures may be lost due to the low analog signal bandwidth and may not be reflected in the inspection image.

The pixel rate and analog signal bandwidth are prone to "parasitic parameters," which are undesired or unexpected electromagnetic effects incurred by operating components of the detector. The parasitic parameters may include parasitic capacitance (e.g., stray capacitance), parasitic resistance, or parasitic inductance. The parasitic parameters may be incurred even when some components are not operating. The parasitic parameters may alter the designed specification of the components, and may cause adverse effects to the performance of the detector, such as suppressing signal dynamics and reducing the pixel rate. For example, stray capacitance may resist the movement of electric charges. Parasitic resistance may increase internal detection signal loss. Parasitic inductance may resist the flow of a dynamic electric current. In addition, the parasitic parameters may introduce noise and interference to the inspection image. Ideally, the design of a detector strives to minimize the generation of the parasitic parameters.

The pixel rate and analog signal bandwidth may have critical impact to other performance indicators of the detector, such as a signal-to-noise ("SNR") ratio or performance capacity (e.g., maximum inspection speed or maximum inspection throughput) of the detector. For increasing the pixel rate and analog signal bandwidth, a detector may be designed to shorten the distance of the electrical connections between individual sensing elements and their signal processing circuits, which may suppress the generation of parasitic parameters (e.g., series resistance, parasitic capacitance, or series inductance). Alternatively, architectures of the signal processing circuits may be enhanced or redesigned for the detector to be less sensitive to the parasitic parameters.

However, the existing interconnecting-section design of the detector still faces several challenges related to the analog signal bandwidth and the pixel rate. For example, there are ways to further suppress the generation of parasitic parameters, to reduce the impact of parasitic parameters on analog signal bandwidth, to increase processing bandwidth of analog or digital signal processing, or to increase the pixel rate and the performance adaptability of the detector, without incurring significant costs.

In this disclosure, a detector with an improved architecture is provided for improving the analog signal bandwidth and the pixel rate. In some embodiments of the detector, an interconnection layer is provided between analog signal processing circuitry of the detector and current- or charge-based analog-to-digital converters (ADCs) corresponding to the analog signal processing circuitry. An advantage of such an architecture is reduced sensitivity of current- or charge-based analog processing circuitry, compared with equivalent voltage-based analog processing circuitry, which enables relatively increased analog signal bandwidth. The interconnection layer may communicatively couple outputs of the analog signal processing circuitry to each other via interconnection switching elements. Switching elements may be provided at the inputs and outputs of the analog signal processing circuitry. By controlling the switching elements, different analog signal processing circuits may be communicatively activated or deactivated in the detector. By coupling the outputs of different analog signal processing circuits via the interconnection switching elements in the interconnection layer, multiple analog signal processing circuits may be associated with a single current- or charge-based ADC via the interconnection layer, by which a high analog signal bandwidth may be achieved without necessitating additional digital output capacity. By coupling the ADCs via the interconnection layer, the ADCs may be controlled to work in an interleaving mode, which may provide a pixel rate higher than the specification of a single ADC. Overall, by using the provided architecture, the limits of the performance adaptability and capability of existing detectors may be pushed higher.

Further, the existing design of the sections of the detector also faces several challenges. Typically, a section of a detector may include multiple charged-particle sensing elements arranged as an array and switches arranged between adjacent sensing elements. However, some existing electric connection schemes of the components for detector sections may include an excessive number of switches, which may cause excessive parasitic parameters (e.g., equivalent series resistance or parasitic capacitance) in the signal processing circuit. Moreover, many existing designs arrange the inter-element switches only in the horizontal or vertical direction of the section, which may limit the performance (e.g., analog signal bandwidth and configuration flexibility) of the detector.

In this disclosure, a detector with an improved architecture is provided for improving the analog signal bandwidth, the pixel rate, and the configuration flexibility of the detector. In some embodiments of the detector, the number of switches between the section and the corresponding signal processing circuit is reduced. In some embodiments of the detector, switches may be provided between diagonally adjacent sensing elements. An advantage of such an architecture is that the side effects of parasitic parameters incurred in the signal processing circuit may be further reduced (e.g., may be 50% or more in some cases), which may enable higher analog signal bandwidth. Other advantages of such an architecture include that the configuration flexibility of the sections may be improved. Overall, by using the provided architecture, the limits of the performance, adaptability, and capability of existing detectors may be pushed higher.

Relative dimensions of components in drawings may be exaggerated for clarity. Within the following description of drawings, the same or like reference numbers refer to the same or like components or entities, and only the differences with respect to the individual embodiments are described.

Objects and advantages of the disclosure may be realized by the elements and combinations as set forth in the embodiments discussed herein. However, embodiments of the present disclosure are not necessarily required to achieve such exemplary objects or advantages, and some embodiments may not achieve any of the stated objects or advantages.

Without limiting the scope of the present disclosure, some embodiments may be described in the context of providing detection systems and detection methods in systems utilizing electron beams ("e-beams"). However, the disclosure is not so limited. Other types of charged particle beams may be similarly applied. Furthermore, systems and methods for detection may be used in other imaging systems, such as optical imaging, photon detection, x-ray detection, ion detection, or the like.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an exemplary electron beam inspection (EBI) system 100 consistent with embodiments of the present disclosure. EBI system 100 may be used for imaging. As shown in FIG. 1, EBI system 100 includes a main chamber 101, a load/lock chamber 102, a beam tool 104, and an equipment front end module (EFEM) 106. Beam tool 104 is located within main chamber 101. EFEM 106 includes a first loading port 106a and a second loading port 106b. EFEM 106 may include additional loading port(s). First loading port 106a and second loading port 106b receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by beam tool 104. Beam tool 104 may be a single-beam system or a multi-beam system.

A controller 109 is electronically connected to beam tool 104. Controller 109 may be a computer configured to execute various controls of EBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes and data may include an operating system (OS) and one or more application programs (or "apps") for specific tasks. The memory may also be a virtual memory that includes one or more memories distributed across multiple machines or devices coupled via a network.

Figure 2:
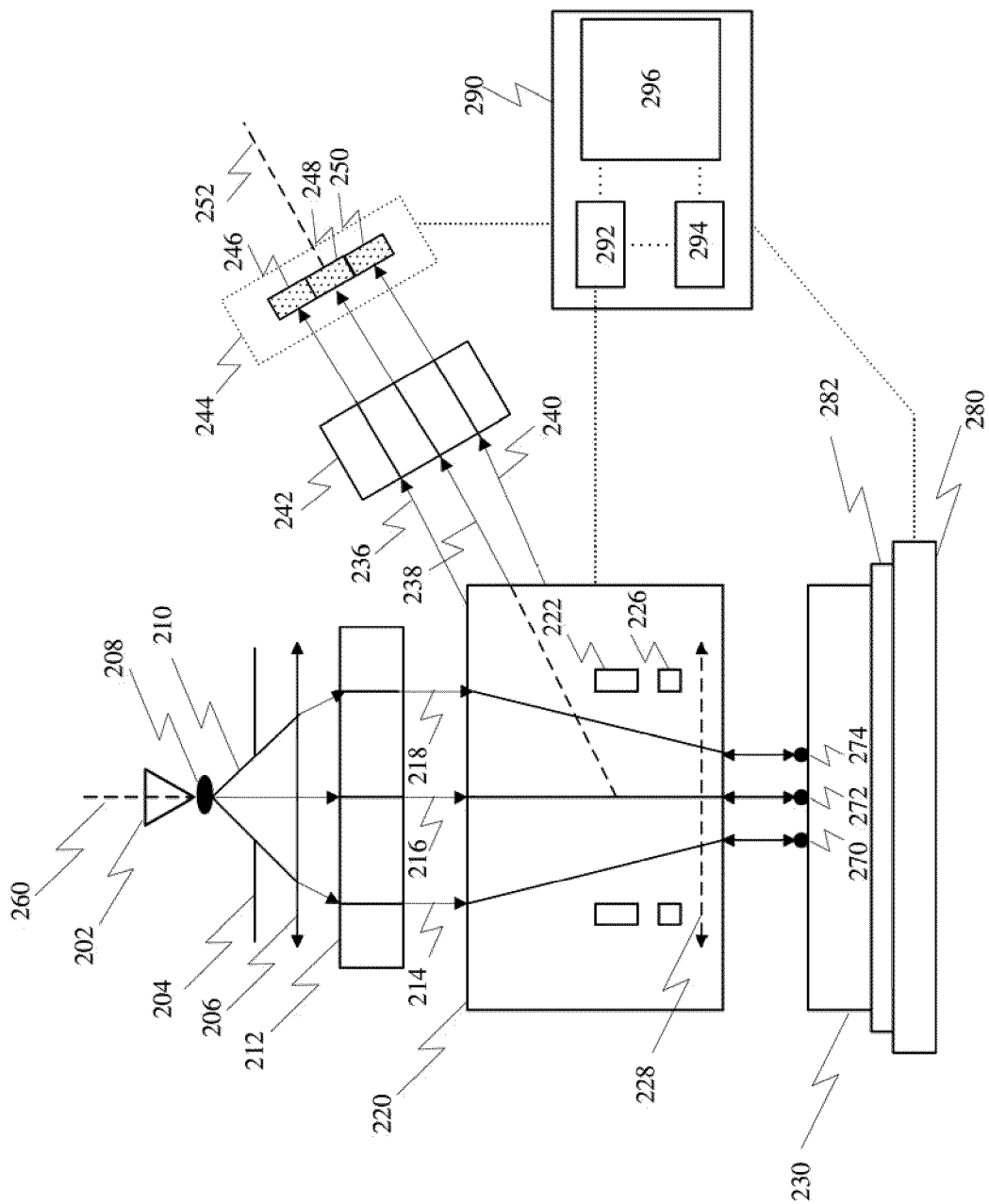
FIG. 2 is a schematic diagram illustrating an exemplary multi-beam beam tool, consistent with embodiments of the present disclosure that can be a part of the exemplary charged-particle beam inspection system of FIG. 1.

FIG. 2 illustrates a schematic diagram of an exemplary multi-beam beam tool 104 (also referred to herein as apparatus 104) and an image processing system 290 that may be configured for use in EBI system 100 (FIG. 1), consistent with embodiments of the present disclosure.

Beam tool 104 comprises a charged-particle source 202, a gun aperture 204, a condenser lens 206, a primary charged-particle beam 210 emitted from charged-particle source 202, a source conversion unit 212, a plurality of beamlets 214, 216, and 218 of primary charged-particle beam 210, a primary projection optical system 220, a motorized wafer stage 280, a wafer holder 282, multiple secondary charged-particle beams 236, 238, and 240, a secondary optical system 242, and a charged-particle detection device 244. Primary projection optical system 220 can comprise a beam separator 222, a deflection scanning unit 226, and an objective lens 228. Charged-particle detection device 244 can comprise detection sub-regions 246, 248, and 250.

Charged-particle source 202, gun aperture 204, condenser lens 206, source conversion unit 212, beam separator 222, deflection scanning unit 226, and objective lens 228 can be aligned with a primary optical axis 260 of apparatus 104. Secondary optical system 242 and charged-particle detection device 244 can be aligned with a secondary optical axis 252 of apparatus 104.

Charged-particle source 202 can emit one or more charged particles, such as electrons, protons, ions, muons, or any other particle carrying electric charges. In some embodiments, charged-particle source 202 may be an electron source. For example, charged-particle source 202 may include a cathode, an extractor, or an anode, wherein primary electrons can be emitted from the cathode and extracted or accelerated to form primary charged-particle beam 210 (in this case, a primary electron beam) with a crossover (virtual or real) 208. For ease of explanation without causing ambiguity, electrons are used as examples in some of the descriptions herein. However, it should be noted that any charged particle may be used in any embodiment of this disclosure, not limited to electrons. Primary charged-particle beam 210 can be visualized as being emitted from crossover 208. Gun aperture 204 can block off peripheral charged particles of primary charged-particle beam 210 to reduce Coulomb effect. The Coulomb effect may cause an increase in size of probe spots.

Source conversion unit 212 can comprise an array of image-forming elements and an array of beam-limit apertures. The array of image-forming elements can comprise an array of micro-deflectors or micro-lenses. The array of image-forming elements can form a plurality of parallel images (virtual or real) of crossover 208 with a plurality of beamlets 214, 216, and 218 of primary charged-particle beam 210. The array of beam-limit apertures can limit the plurality of beamlets 214, 216, and 218. While three beamlets 214, 216, and 218 are shown in FIG. 2, embodiments of the present disclosure are not so limited. For example, in some embodiments, the apparatus 104 may be configured to generate a first number of beamlets. In some embodiments, the first number of beamlets may be in a range from 1 to 1000. In some embodiments, the first number of beamlets may be in a range from 200-500. In an exemplary embodiment, an apparatus 104 may generate 400 beamlets.

Condenser lens 206 can focus primary charged-particle beam 210. The electric currents of beamlets 214, 216, and 218 downstream of source conversion unit 212 can be varied by adjusting the focusing power of condenser lens 206 or by changing the radial sizes of the corresponding beam-limit apertures within the array of beam-limit apertures. Objective lens 228 can focus beamlets 214, 216, and 218 onto a wafer 230 for imaging, and can form a plurality of probe spots 270, 272, and 274 on a surface of wafer 230.

Beam separator 222 can be a beam separator of Wien filter type generating an electrostatic dipole field and a magnetic dipole field. In some embodiments, if they are applied, the force exerted by the electrostatic dipole field on a charged particle (e.g., an electron) of beamlets 214, 216, and 218 can be substantially equal in magnitude and opposite in a direction to the force exerted on the charged particle by magnetic dipole field. Beamlets 214, 216, and 218 can, therefore, pass straight through beam separator 222 with zero deflection angle. However, the total dispersion of beamlets 214, 216, and 218 generated by beam separator 222 can also be non-zero. Beam separator 222 can separate secondary charged-particle beams 236, 238, and 240 from beamlets 214, 216, and 218 and direct secondary charged-particle beams 236, 238, and 240 towards secondary optical system 242.

Deflection scanning unit 226 can deflect beamlets 214, 216, and 218 to scan probe spots 270, 272, and 274 over a surface area of wafer 230. In response to the incidence of beamlets 214, 216, and 218 at probe spots 270, 272, and 274, secondary charged-particle beams 236, 238, and 240 may be emitted from wafer 230. Secondary charged-particle beams 236, 238, and 240 may comprise charged particles (e.g., electrons) with a distribution of energies. For example, secondary charged-particle beams 236, 238, and 240 may be secondary electron beams including secondary electrons (energies ≤50 eV) and backscattered electrons (energies between 50 eV and landing energies of beamlets 214, 216, and 218). Secondary optical system 242 can focus secondary charged-particle beams 236, 238, and 240 onto detection sub-regions 246, 248, and 250 of charged-particle detection device 244. Detection sub-regions 246, 248, and 250 may be configured to detect corresponding secondary charged-particle beams 236, 238, and 240 and generate corresponding signals (e.g., voltage, current, or the like) used to reconstruct an SCPM image of structures on or underneath the surface area of wafer 230.

The generated signals may represent intensities of secondary charged-particle beams 236, 238, and 240 and may be provided to image processing system 290 that is in communication with charged-particle detection device 244, primary projection optical system 220, and motorized wafer stage 280. The movement speed of motorized wafer stage 280 may be synchronized and coordinated with the beam deflections controlled by deflection scanning unit 226, such that the movement of the scan probe spots (e.g., scan probe spots 270, 272, and 274) may orderly cover regions of interests on the wafer 230. The parameters of such synchronization and coordination may be adjusted to adapt to different materials of wafer 230. For example, different materials of wafer 230 may have different resistance-capacitance characteristics that may cause different signal sensitivities to the movement of the scan probe spots.

The intensity of secondary charged-particle beams 236, 238, and 240 may vary according to the external or internal structure of wafer 230, and thus may indicate whether wafer 230 includes defects. Moreover, as discussed above, beamlets 214, 216, and 218 may be projected onto different locations of the top surface of wafer 230, or different sides of local structures of wafer 230, to generate secondary charged-particle beams 236, 238, and 240 that may have different intensities. Therefore, by mapping the intensity of secondary charged-particle beams 236, 238, and 240 with the areas of wafer 230, image processing system 290 may reconstruct an image that reflects the characteristics of internal or external structures of wafer 230.

In some embodiments, image processing system 290 may include an image acquirer 292, a storage 294, and a controller 296. Image acquirer 292 may comprise one or more processors. For example, image acquirer 292 may comprise a computer, server, mainframe host, terminals, personal computer, any kind of mobile computing devices, or the like, or a combination thereof. Image acquirer 292 may be communicatively coupled to charged-particle detection device 244 of beam tool 104 through a medium such as an electric conductor, optical fiber cable, portable storage media, IR, Bluetooth, internet, wireless network, wireless radio, or a combination thereof. In some embodiments, image acquirer 292 may receive a signal from charged-particle detection device 244 and may construct an image. Image acquirer 292 may thus acquire SCPM images of wafer 230. Image acquirer 292 may also perform various post-processing functions, such as generating contours, superimposing indicators on an acquired image, or the like. Image acquirer 292 may be configured to perform adjustments of brightness and contrast of acquired images. In some embodiments, storage 294 may be a storage medium such as a hard disk, flash drive, cloud storage, random access memory (RAM), other types of computer-readable memory, or the like. Storage 294 may be coupled with image acquirer 292 and may be used for saving scanned raw image data as original images, and post-processed images. Image acquirer 292 and storage 294 may be connected to controller 296. In some embodiments, image acquirer 292, storage 294, and controller 296 may be integrated together as one control unit.

In some embodiments, image acquirer 292 may acquire one or more SCPM images of a wafer based on an imaging signal received from charged-particle detection device 244. An imaging signal may correspond to a scanning operation for conducting charged particle imaging. An acquired image may be a single image comprising a plurality of imaging areas. The single image may be stored in storage 294. The single image may be an original image that may be divided into a plurality of regions. Each of the regions may comprise one imaging area containing a feature of wafer 230. The acquired images may comprise multiple images of a single imaging area of wafer 230 sampled multiple times over a time sequence. The multiple images may be stored in storage 294. In some embodiments, image processing system 290 may be configured to perform image processing steps with the multiple images of the same location of wafer 230.

In some embodiments, image processing system 290 may include measurement circuits (e.g., analog-to-digital converters) to obtain a distribution of the detected secondary charged particles (e.g., secondary electrons). The charged-particle distribution data collected during a detection time window, in combination with corresponding scan path data of beamlets 214, 216, and 218 incident on the wafer surface, can be used to reconstruct images of the wafer structures under inspection. The reconstructed images can be used to reveal various features of the internal or external structures of wafer 230, and thereby can be used to reveal any defects that may exist in the wafer.

In some embodiments, the charged particles may be electrons. When electrons of primary charged-particle beam 210 are projected onto a surface of wafer 230 (e.g., probe spots 270, 272, and 274), the electrons of primary charged-particle beam 210 may penetrate the surface of wafer 230 for a certain depth, interacting with particles of wafer 230. Some electrons of primary charged-particle beam 210 may elastically interact with (e.g., in the form of elastic scattering or collision) the materials of wafer 230 and may be reflected or recoiled out of the surface of wafer 230. An elastic interaction conserves the total kinetic energies of the bodies (e.g., electrons of primary charged-particle beam 210) of the interaction, in which the kinetic energy of the interacting bodies does not convert to other forms of energy (e.g., heat, electromagnetic energy, or the like). Such reflected electrons generated from elastic interaction may be referred to as backscattered electrons (BSEs). Some electrons of primary charged-particle beam 210 may inelastically interact with (e.g., in the form of inelastic scattering or collision) the materials of wafer 230. An inelastic interaction does not conserve the total kinetic energies of the bodies of the interaction, in which some or all of the kinetic energy of the interacting bodies convert to other forms of energy. For example, through the inelastic interaction, the kinetic energy of some electrons of primary charged-particle beam 210 may cause electron excitation and transition of atoms of the materials. Such inelastic interaction may also generate electrons exiting the surface of wafer 230, which may be referred to as secondary electrons (SEs). Yield or emission rates of BSEs and SEs depend on, e.g., the material under inspection and the landing energy of the electrons of primary charged-particle beam 210 landing on the surface of the material, among others. The energy of the electrons of primary charged-particle beam 210 may be imparted in part by its acceleration voltage (e.g., the acceleration voltage between the anode and cathode of charged-particle source 202 in FIG. 2). The quantity of BSEs and SEs may be more or fewer (or even the same) than the injected electrons of primary charged-particle beam 210.

The images generated by SEM may be used for defect inspection. For example, a generated image capturing a test device region of a wafer may be compared with a reference image capturing the same test device region. The reference image may be predetermined (e.g., by simulation) and include no known defect. If a difference between the generated image and the reference image exceeds a tolerance level, a potential defect may be identified. For another example, the SEM may scan multiple regions of the wafer, each region including a test device region designed as the same, and generate multiple images capturing those test device regions as manufactured. The multiple images may be compared with each other. If a difference between the multiple images exceeds a tolerance level, a potential defect may be identified.

Figure 3A:
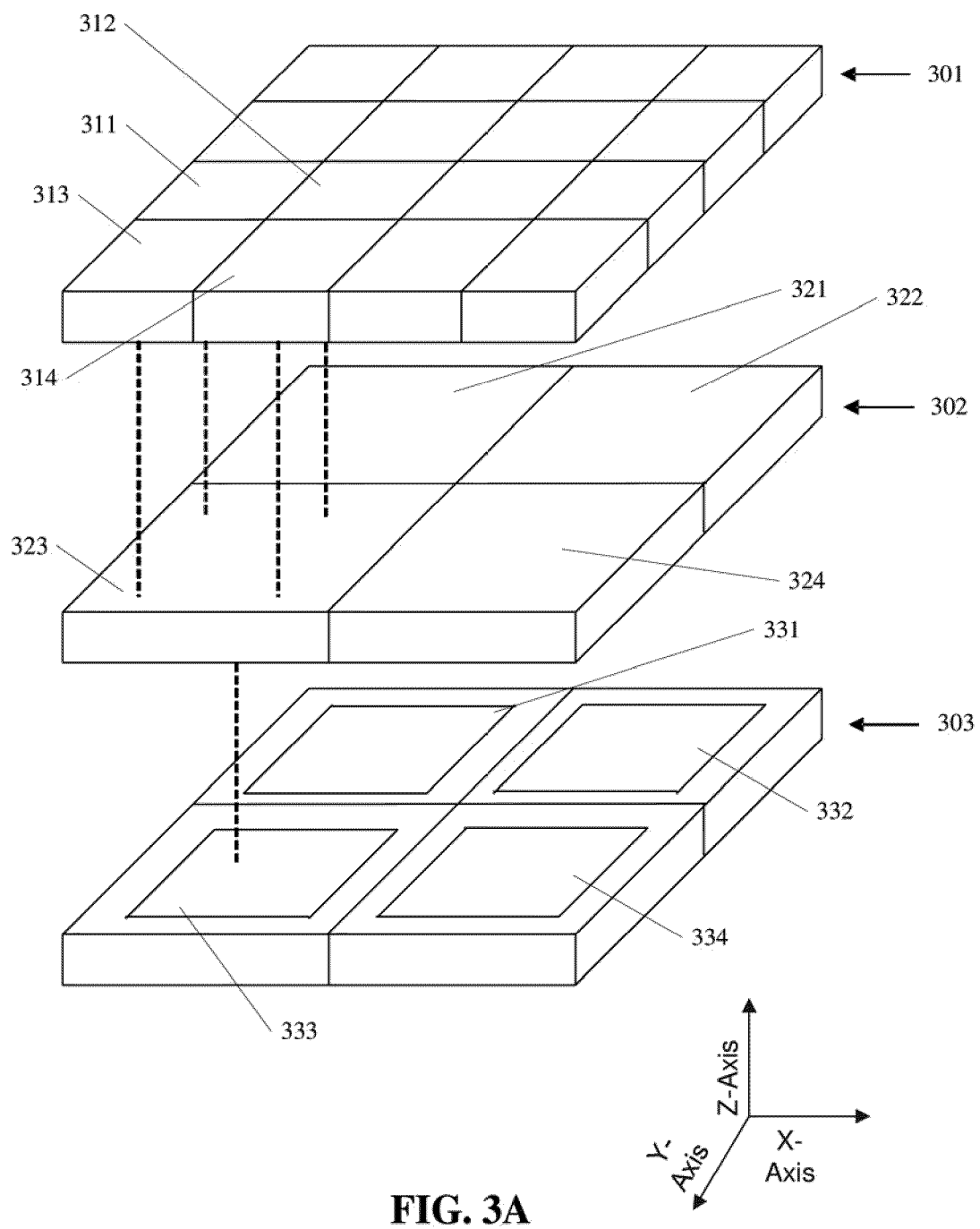
FIG. 3A is a schematic representation of an exemplary structure of a detector, consistent with embodiments of the present disclosure.

FIG. 3A illustrates a schematic representation of an exemplary structure of a detector 300A, consistent with embodiments of the present disclosure. Detector 300A may be provided as charged-particle detection device 244. In FIG. 3A, detector 300A includes a sensor layer 301, a section layer 302, and a readout layer 303. Sensor layer 301 may include a sensor die made up of multiple sensing elements, including sensing elements 311, 312, 313, and 314. In some embodiments, the multiple sensing elements may be provided in an array of sensing elements, each of which may have a uniform size, shape, and arrangement. Detector 300A may have an arrangement with respect to a coordinate axis reference frame. Sensor layer 301 may be arranged along an x-y plane. Sensing elements in sensor layer 301 may be arrayed in x-axis and y-axis directions. The x-axis direction may also herein be referred to as a "horizontal" direction. The y-axis direction may also herein be referred to as a "vertical" direction. Detector 300A may have a layer structure in which sensor layer 301, section layer 302, and section layer are stacked in a z-axis direction. The z-axis direction may also herein be referred to as a "thickness" direction. The z-axis direction may be aligned with a direction of incidence of charged particles that are directed toward detector 300A.

Section layer 302 may include multiple sections, including sections 321, 322, 323, and 324. The sections may include interconnections (e.g., wiring paths) configured to communicatively couple the multiple sensing elements. The sections may also include switching elements that may control the communicative couplings between the sensing elements. The sections may further include connection mechanisms (e.g., wiring paths and switching elements) between the sensing elements and on or more common nodes in the section layer. For example, as shown in FIG. 3A, section 323 may be configured to communicatively couple to outputs of sensing elements 311, 312, 313, and 314, as shown by the four dashed lines between sensor layer 301 and section layer 302. In some embodiments, section 323 may be configured to output combined signals gathered from sensing elements 311, 312, 313, and 314 as a common output. In some embodiments, a section (e.g., section 323) may be communicatively coupled to sensing elements (e.g., sensing elements 311, 312, 313, and 314) placed directly above the section. For example, section 323 may have a grid of terminals configured to connect with the outputs of sensing elements 311, 312, 313, and 314. In some embodiments, sections 321, 322, 323, and 324 may be provided in an array structure such that they have a uniform size and shape, and a uniform arrangement. Sections 321, 322, 323, and 324 may be square shaped, for instance. In some embodiments, an isolation area may be provided between adjacent sections to electrically insulate them from one another. In some embodiments, sections may be arranged in an offset pattern, such as a tile layout.

Readout layer 303 may include signal processing circuits for processing outputs of the sensing elements. In some embodiments, signal processing circuits may be provided, which may correspond with each of the sections of section layer 302. In some embodiments, multiple separate signal processing circuitry sections may be provided, including signal processing circuitry sections 331, 332, 333, and 334. In some embodiments, the signal processing circuitry sections may be provided in an array of sections having a uniform size and shape, and a uniform arrangement. In some embodiments, the signal processing circuitry sections may be configured to connect with an output from corresponding sections of section layer 302. For example, as shown in FIG. 3A, signal processing circuitry section 333 may be configured to communicatively couple to an output of section 323, as shown by the dashed line between section layer 302 and readout layer 303.

In some embodiments, readout layer 303 may include input and output terminals. Output(s) of readout layer 303 may be connected to a component for reading and interpreting the output of detector 300A. For example, readout layer 303 may be directly connected to a digital multiplexer, digital logic block, controller, computer, or the like.

The sizes of sections and the number of sensing elements associated with a section may be varied. For example, while FIG. 3A illustrates four sensing elements in one section, embodiments of the disclosure are not so limited.

While FIG. 3A illustrates sensor layer 301, section layer 302, and readout layer 303 as multiple discrete layers, it is noted that sensor layer 301, section layer 302, and readout layer 303 need not be provided as separate substrates. For example, a wiring path of section layer 302 may be provided in a sensor die including the multiple sensing elements, or may be provided outside of the sensor die. Wiring paths may be patterned on sensor layer 301. Additionally, section layer 302 may be combined with readout layer 303. For example, a semiconductor die may be provided that includes wiring paths of section layer 302 and signal processing circuits of readout layer 303. Thus, structures and functionalities of the various layers may be combined or divided.

In some embodiments, a detector may be provided in a two-die configuration. However, embodiments of the present disclosure are not so limited. For example, functions of a sensor layer, section layer, and readout layer may be implemented in one die or in a package that may contain one or more dies.

In some embodiments, arrangements of sensor layer 301, section layer 302, and readout layer 303 may correspond with one another in a stacked relationship. For example, section layer 302 may be mounted directly on top of readout layer 303, and sensor layer 301 may be mounted directly on top of section layer 302. The layers may be stacked such that sections within section layer 302 are aligned with signal processing circuitry sections (e.g., sections 331, 332, 333, and 334) of readout layer 303. Furthermore, the layers may be stacked such that one or more sensing elements within sensor layer 301 are aligned with a section in section layer 302. In some embodiments, sensing elements to be associated with a section may be contained within the section. For example, in a plan view of detector 300A, sensing elements (e.g., sensing elements 311, 312, 313, and 314) of a section (e.g., section 323) may fit within the boundaries of the section. Furthermore, individual sections of section layer 302 may overlap with signal processing circuitry sections of readout layer 303. In this manner, predefined areas may be established for associating sensing elements with sections and signal processing circuitry.

Figure 3B:
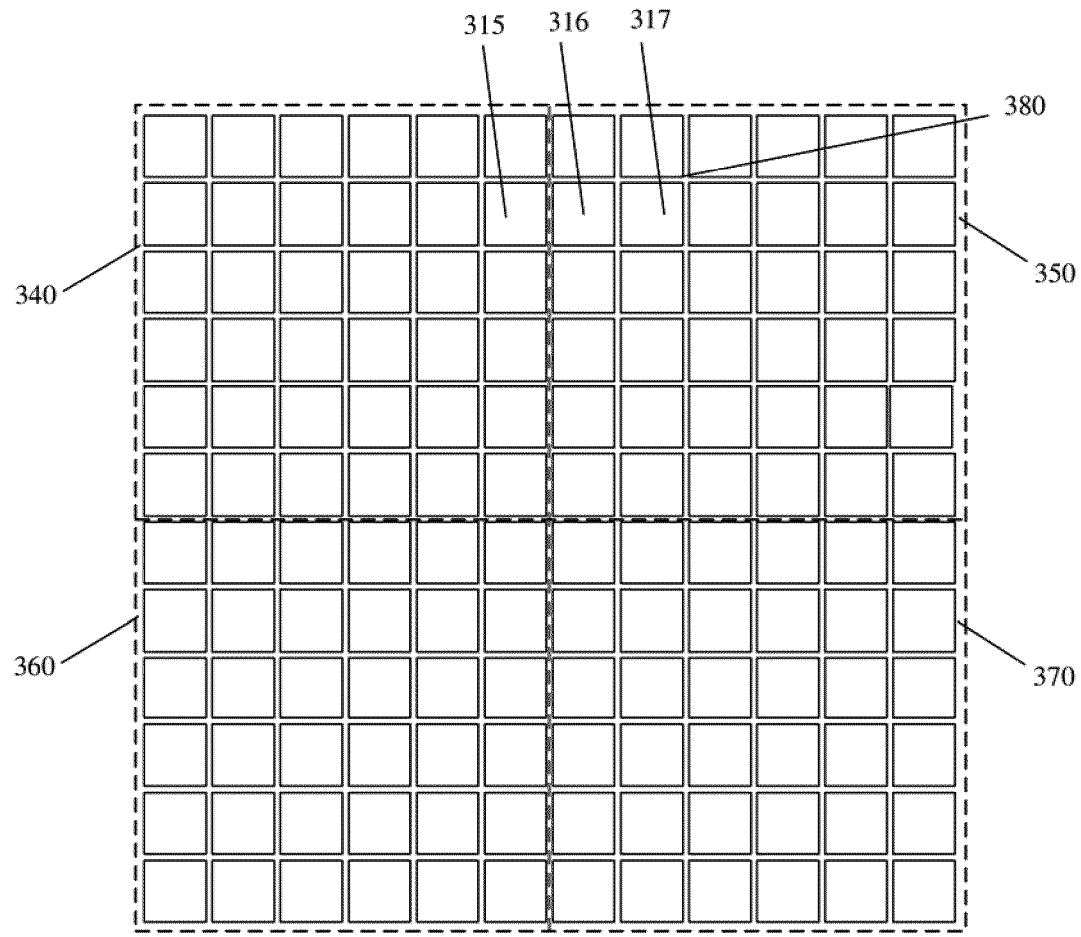
FIG. 3B is a diagram illustrating an exemplary surface of a detector array, consistent with embodiments of the present disclosure.

FIG. 3B illustrates an exemplary structure of a sensor surface 300B that may form a surface of charged-particle detection device 244, consistent with embodiments of the present disclosure. Sensor surface 300B may be provided with multiple sections of sensing elements, including sections 340, 350, 360, and 370, which are represented by the dashed lines. For example, sensor surface 300B may be the surface of sensor layer 301 in FIG. 3A. Each section may be capable of receiving at least a part of a beam spot emitted from a particular location from wafer 230, such as one of secondary charged-particle beams 236, 238, and 240 as shown in FIG. 2.

Sensor surface 300B may include an array of sensing elements, including sensing elements 315, 316, and 317. In some embodiments, each of sections 340, 350, 360, and 370 may contain one or more sensing elements. For example, section 340 may contain a first plurality of sensing elements, and section 350 may contain a second plurality of sensing elements, and so on. The first plurality of sensing elements and the second plurality of sensing elements may be mutually exclusive. In some embodiments, a sensing element may be a diode or any element similar to a diode that can convert incident energy into a measurable signal. For example, the sensing elements may include a PIN diode, an avalanche diode, an electron multiplier tube (EMT), or other components.

In FIG. 3B, an area 380 may be provided between adjacent sensing elements. Area 380 may be an isolation area to isolate the sides or corners of neighboring sensing elements from one another. In some embodiments, area 380 may include an insulating material that is different from that of the sensing elements of sensor surface 300B. In some embodiments, area 380 may be provided as a square. In some embodiments, area 380 may not be provided between adjacent sides of sensing elements.

In some embodiments, a field programmable detector array may be provided with sensing elements having switching regions integrated between the sensing elements. For example, detectors may be provided such as some of those examples discussed in PCT Application No. PCT/EP2018/074833, filed on Sep. 14, 2018, the content of which is herein incorporated by reference in its entirety. In some embodiments, a switching region may be provided between sensing elements so that some or more of the sensing elements may be grouped when covered by the same charged-particle beam spot. Circuits for controlling the switching regions may be included in the signal processing circuits of the readout layer (e.g., readout layer 303 in FIG. 3A). As used throughout the present disclosure, the expression "a set of sensing elements" shall mean a group of sensing elements of a first quantity. A first set of sensing elements among the set of sensing elements may refer to a subset of sensing elements within the set. A second set of sensing elements may refer to another subset of sensing elements within the set. The first and second sets may or may not be mutually exclusive. A "group" of sensing elements may refer to sensing elements that are associated with one beam spot projected on a detector surface (e.g., within the boundary of the beam spot). First and second sets of sensing elements may refer to different groups of sensing elements that are associated with different beam spots. The sets of sensing elements need not be restricted to particular "sections" of a detector.

Figure 4:
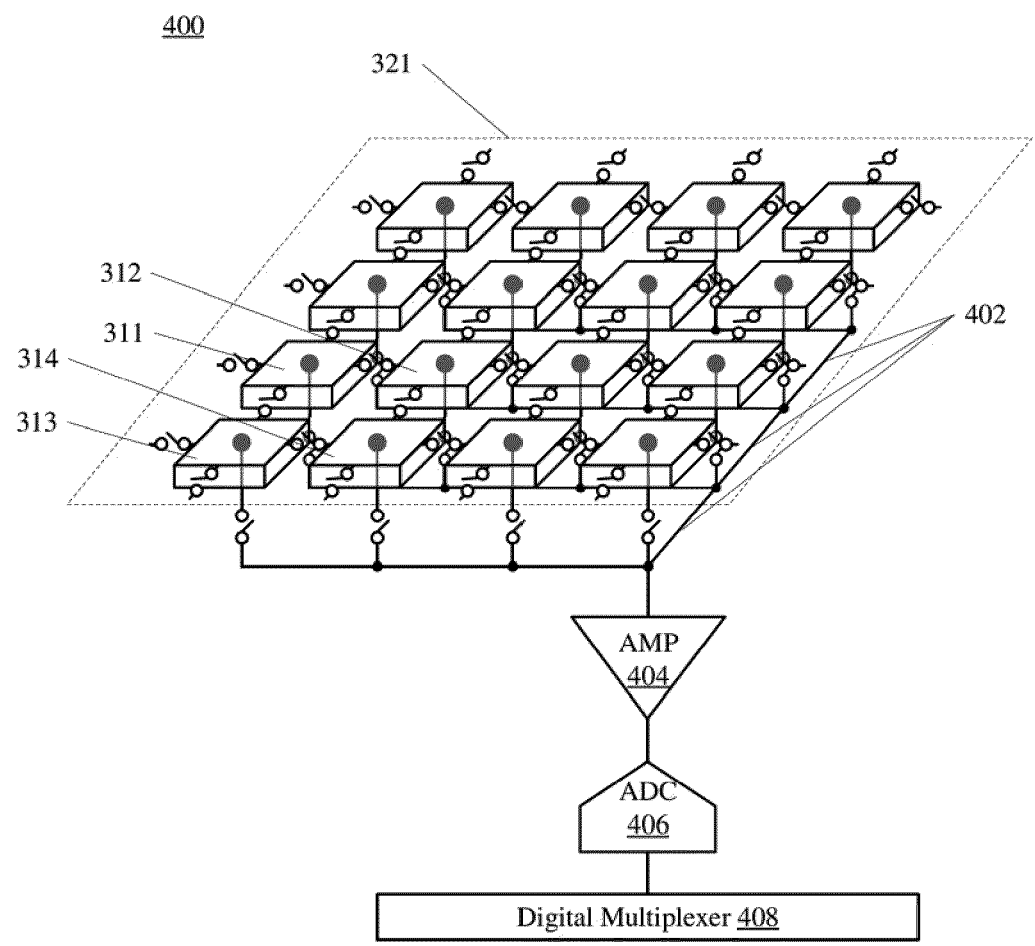
FIG. 4 is a diagram illustrating an exemplary detector array with switching elements, consistent with embodiments of the present disclosure.

FIG. 4 is a diagram illustrating an exemplary detector array 400 with switching elements, consistent with embodiments of the present disclosure. Detector array 400 may be an example embodiment of detector 300A in FIG. 3A. For example, detector array 400 may include a sensor layer (e.g., similar to sensor layer 301 in FIG. 3A), a section layer (e.g., similar to section layer 302 in FIG. 3A), and a readout layer (e.g., similar to readout layer 303 in FIG. 3A). The sensor layer of detector array 400 may include multiple sensing elements, including sensing elements 311, 312, 313, and 314. In some embodiments, each of the sensing elements of detector array 400 may have a uniform size, shape, and arrangement. The sensing elements of detector array 400 may generate an electric current signal commensurate with the charged particles (e.g., exiting electrons) received in the active areas of the sensing elements. The "active areas" herein may refer to areas of the sensing elements having radiation sensitivity above a predetermined threshold value.

The section layer of detector array 400 may include a base substrate (e.g., a semiconductor substrate, not shown in FIG. 4) including one or more wiring paths 402. Wiring paths 402 may be configured to communicatively couple the sensing elements of detector array 400. As shown in FIG. 4, detector array 400 includes a section 321 having 4×4 sensing elements, including sensing elements 311, 312, 313, and 314. In FIG. 4, the section layer of detector array 400 may include inter-element switching elements between any two adjacent sensing elements. The section layer of detector array 400 may also include inter-element switching elements communicatively coupled to edges of neighboring sensing elements. Wiring paths 402 may be configured to communicatively couple to outputs of sensing elements (e.g., sensing elements 311, 312, 313, and 314) in section 321. For example, wiring paths 402 may have a grid of terminals (shown as round black dots at the centers of the sensing elements) configured to connect with the outputs of sensing elements 311, 312, 313, and 314. In some embodiments, wiring paths 402 may be provided in the section layer of detector array 400. In FIG. 4, wiring paths 402 are communicatively coupled to the above sensing elements (e.g., sensing elements 311, 312, 313, and 314). In FIG. 4, element-bus switching elements may be provided between the outputs of the sensing elements and wiring paths 402. In some embodiments, the element-bus switching elements may be provided in the section layer of detector array 400.

In some embodiments, wiring paths 402 may include lines of conductive material printed on the base substrate, flexible wires, bonding wires, or the like. In some embodiments, switching elements may be provided so that outputs of individual sensing elements can be connected or disconnected with the common output of section 321. In some embodiments, the section layer of detector array 400 may further include corresponding circuits for controlling the switching elements. In some embodiments, switching elements may be provided in a separate switch-element matrix that may itself contain circuits for controlling the switching elements.

The readout layer of detector array 400 may include signal conditioning circuits for processing outputs of the sensing elements. In some embodiments, the signal conditioning circuits may convert the generated current signal into a voltage that may represent the intensity of a received beam spot, or may amplify the generated current signal into an amplified current signal. The signal conditioning circuit may include, for example, an amplifier 404 and one or more analog switching elements (not shown in FIG. 4). The amplifier 404 may be a high speed transimpedance amplifier, a current amplifier, or the like. In FIG. 4, amplifier 404 may be communicatively coupled to the common output of section 321 for amplifying the output signals of the sensing elements of section 321. In some embodiments, amplifier 404 may be a single-stage or a multi-stage amplifier. For example, if amplifier 404 is a multi-stage amplifier, it may include a pre-amplifier and a post-amplifier, or include a front-end stage and a post stage, or the like. In some embodiments, amplifier 404 may be a variable gain amplifier, such as a variable gain transimpedance amplifier (VG-TIA), a variable gain charge transfer amplifier (VGCTA), or the like. The conditioning circuit may be coupled to a signal path that may include, for example, an analog-to-digital converter (ADC) 406. In FIG. 4, ADC 406 may be communicatively coupled to the output of the conditioning circuit (e.g., including amplifier 404) to convert the analog output signals of the sensing elements of section 321 to digital signals. The readout layer of detector array 400 may also include other circuits for other functions. For example, the readout layer of detector array 400 may include switch-element actuating circuits that may control the switching elements between the sensing elements. For ease of explanation without causing ambiguity, the signal path between the sensing elements and ADC 406 may be referred to as an "analog signal path." For example, the analog signal path in FIG. 4 includes the above-described signal conditioning circuit (e.g., including amplifier 404). The input of the analog signal path is communicatively coupled to the sensing elements, and the output of the analog signal path is communicatively coupled to ADC 406.

In some embodiments, ADC 406 may include output terminals communicatively coupled to a component (e.g., a component inside or outside the readout layer of detector array 400) for reading and interpreting the digital signal converted by ADC 406. In FIG. 4, ADC 406 is communicatively coupled to a digital multiplexer 408. In some embodiments, digital multiplexer 408 may be arranged in the readout layer of detector array 400. Digital multiplexer 408 may receive multiple input signals and convert them as an output signal. The output signal of digital multiplexer 408 may be converted back to the multiple input signals. The output signal of digital multiplexer 408 may be further transmitted to a data processing stage (e.g., image processing system 290 in FIG. 2).

Figure 5:
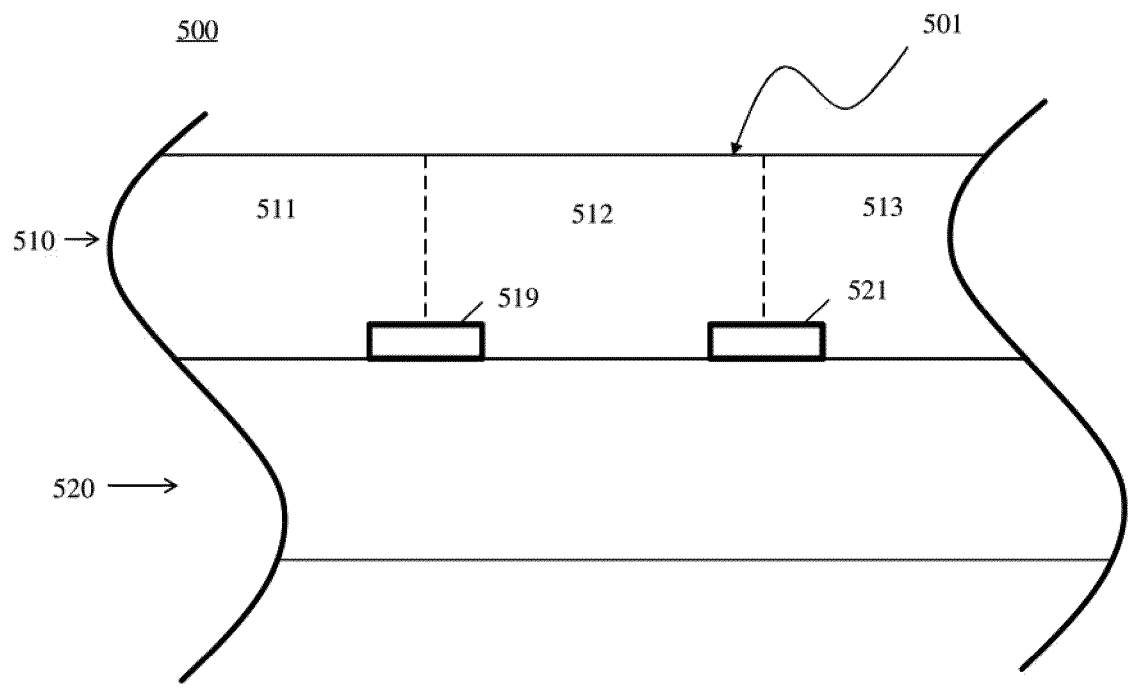
FIG. 5 is a diagram illustrating a cross-sectional view of a layer structure of a detector, consistent with embodiments of the present disclosure.

FIG. 5 is a diagram illustrating a cross-sectional view of a layer structure of a detector 500, consistent with embodiments of the present disclosure. Detector 500 may be provided as charged-particle detection device 244 in a charged-particle beam tool 104 as shown in FIG. 2. Detector 500 may be configured to have multiple layers stacked in a thickness direction, the thickness direction being substantially parallel to an incidence direction of a charged-particle beam. In some embodiments, detector 500 may be provided such as some of those examples discussed in PCT Application No. PCT/EP2018/074834, filed on Sep. 14, 2018, the content of which is herein incorporated by reference in its entirety.

In FIG. 5, detector 500 may include a sensor layer 510 and a circuit layer 520. In some embodiments, sensor layer 510 may represent sensor layer 301 in FIG. 3A, and circuit layer 520 may represent section layer 302 and readout layer 303 in FIG. 3A. For example, circuit layer 520 may include interconnects (e.g., metal lines), and various electronic circuit components. As another example, circuit layer 520 may include a processing system. Circuit layer 520 may also be configured to receive the output current detected in sensor layer 510. In some embodiments, sensor layer 510 may represent sensor layer 301 and section layer 302 in FIG. 3A, and circuit layer 520 may represent readout layer 303 in FIG. 3A. In some embodiments, detector 500 may include layers in addition to sensor layer 301, section layer 302, and readout layer 303.

In some embodiments, sensor layer 510 may be provided with a sensor surface 501 for receiving incident charged particles. Sensing elements, including sensing elements 511, 512, and 513 (differentiated by dashed lines), may be provided in sensor layer 510. For example, sensor surface 501 may be similar to sensor surface 300B in FIG. 3B. In FIG. 5, switching elements, including switching elements 519 and 521, may be provided between adjacent sensing elements in a horizontal direction in the cross-sectional view. Switching elements 519 and 521 may be embedded in sensor layer 510. In some embodiments, sensing elements 511, 512, and 513 may be among the sensing elements (e.g., sensing elements 311, 312, 313, and 314) of detector array 400 in FIG. 4, and switching elements 519 and 521 may be among the switching elements between the sensing elements of detector array 400 in FIG. 4.

In some embodiments, sensing elements 511, 512, and 513 may be separated by an isolation area (indicated by the dashed lines) extending in the thickness direction. For example, sides of sensing elements 511, 512, and 513 that are parallel to the thickness direction may be isolated from each other by the isolation areas (e.g., area 380 in FIG. 3B).

In some embodiments, sensor layer 510 may be configured as one or more diodes where sensing elements 511, 512, and 513 are similar to sensing elements 315, 316, and 317 of FIG. 3B. Switching elements 519 and 521 may be configured as transistors (e.g., MOSFETs). Each of sensing elements 511, 512, 513 may include outputs for making electrical connections to circuit layer 520. For example, the outputs may be integrated with switching elements 519 and 521, or may be provided separately. In some embodiments, the outputs may be integrated in a bottom layer of sensor layer 510 (e.g., a metal layer).

Although FIG. 5 depicts sensing elements 511, 512, and 513 as discrete units when viewed in cross-section, such divisions may not actually be physical. For example, the sensing elements of detector 500 may be formed by a semiconductor device constituting a PIN diode device that can be manufactured as a substrate with multiple layers including a P-type region, an intrinsic region, and an N-type region. In such an example, sensing elements 511, 512, 513 may be contiguous in cross-sectional view. In some embodiments, the switching elements (e.g., switching elements 519 and 521) may be integrated with the sensing elements.

In some embodiments, switching elements may be integrated within the sensor layer, integrated within other layers, or may be provided partially or fully in existing layers. In some embodiments, for example, the sensor layer may contain wells, trenches, or other structures, wherein the switching elements are formed in those structures.

In some embodiments, the switching elements (e.g., switching elements 519 and 521) of detector 500 may be provided outside of sensor layer 510. For example, the switching elements may be embedded in circuit layer 520 (not shown in FIG. 5). In some embodiments, the switching elements (e.g., switching elements 519 and 521) of detector 500 may be formed in a separate die (e.g., a switch die). For example, the switch die (not shown in FIG. 5) may be sandwiched between and be communicatively connected to sensor layer 510 and circuit layer 520.

Figure 6:
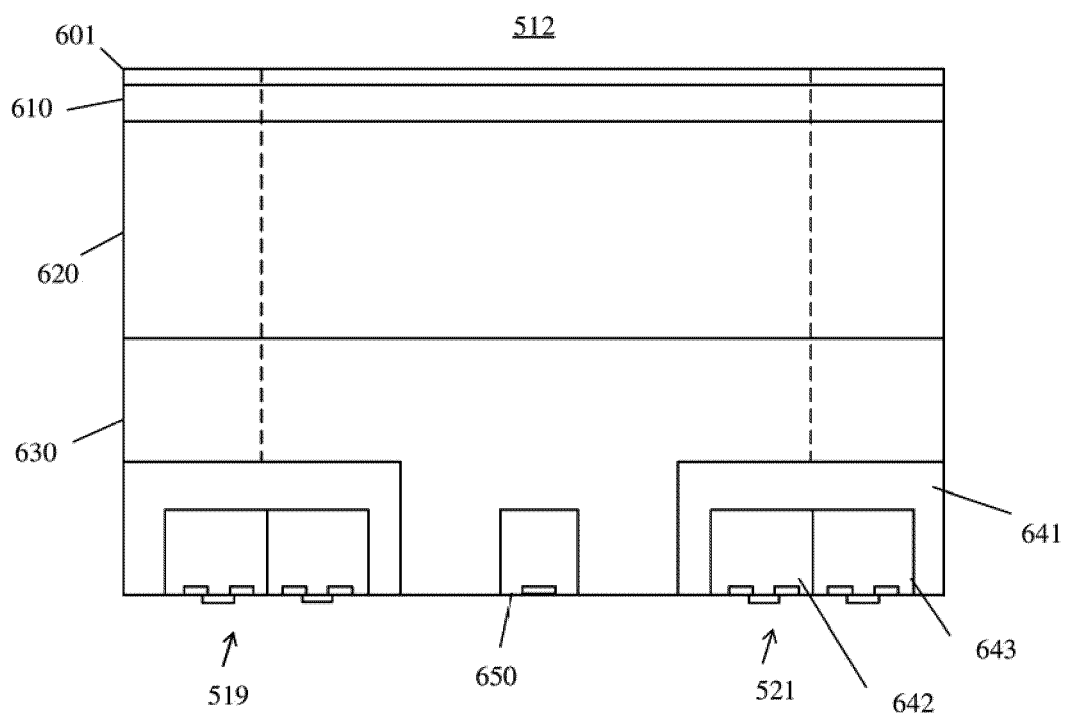
FIG. 6 is a diagram illustrating a cross-sectional view of a sensing element of a detector, consistent with embodiments of the present disclosure.

FIG. 6 is a diagram illustrating a cross-sectional view of sensing element 512 of detector 500, consistent with embodiments of the present disclosure. In FIG. 6, sensing element 512 may include a P-well and an N-well for forming switching elements and other active or passive elements that may be communicatively coupled to other components of sensor layer 510 or circuit layer 520. Although FIG. 6 only shows one full sensing element 512, it is understood that sensor layer 510 may be made up of multiple sensing elements similar to sensing element 512 (e.g., sensing elements 511 and 513), which may be contiguous in cross-sectional view.

In some embodiments, sensing element 512 may include a diode device having a surface layer 601, a P-type region 610, a P-epitaxial region 620, an N-type region 630, and other components. Surface layer 601 may form a detection surface (e.g., an active area) of a detector that receives incident charged particles. For example, surface layer 601 may be a metal layer (e.g., formed by aluminum or other conductive materials). On an opposite side from surface layer 601, there may be provided an electrode 650 as a charge collector. Electrode 650 may be configured to output a current signal representing the number of charged particles received in the active area of sensing element 512.

In some embodiments, as shown in FIG. 6, switching elements 519 and 521 may be formed by metal oxide semiconductor (MOS) devices. For example, multiple MOS devices may be formed in a back side of N-type region 630 in FIG. 6, and the back side of N-type region 630 may be in contact with sensor layer 510 in FIG. 5. As an example of a MOS device, there may be provided a deep P-well 641, an N-well 642, and a P-well 643. In some embodiments, the MOS devices may be fabricated by etching, patterning, and other processes and techniques. It will be understood that various other devices may be used, such as bipolar semiconductor devices, etc., and devices may be fabricated by various processes.

In operation of sensing element 512, when charged particles (e.g., secondary charged-particle beams 236, 238, and 240 in FIG. 2) impinge on surface layer 601, the body of sensing element 512, including, e.g., a depletion region, may be flooded with charge carriers generated from the impinged charged particles. Such a depletion region may extend through at least a portion of the volume of the sensing element. For example, the charged particles may be electrons, and the impinged electrons may create and energize electron-hole pairs in a depletion region of the sensing element. The energized electrons among the electron-hole pairs may have further energy such that they may also generate new electron-hole pairs. Electrons generated from the impinged charged particles may contribute to signal generated in each sensing element.

With reference to FIG. 6, a depletion region in sensing element 512 may include an electric field between P-type region 610 and N-type region 630, and the electrons and the holes may be attracted by P-type region 610 and N-type region 630, respectively. When the electrons reach P-type region 610 or when the holes reach N-type region 630, a detection signal may be generated. Thus, sensing element 512 may generate an output signal, such as current, when a charged particle beam is incident on sensing element 512. Multiple sensing elements may be connected, and a group of sensing elements may be used to detect intensity of a charged particle beam spot. When a charged particle beam spot covers multiple adjacent sensing elements (e.g., sensing elements 511, 512, and 513), the sensing elements may be grouped together ("merged") for collecting current. For example, the sensing elements may be merged by turning on switching elements (e.g., switching elements 519 and 521) between them. Signals from sensing elements in a group may be collected and sent to a signal conditioning circuit connected to the group. The number of sensing elements in a group may be an arbitrary number related to the size and shape of the beam spot. The number may be 1 or greater than 1.

In some embodiments, a detector may be configured so that individual sensing elements may communicate with external components via, for example, signal or data lines and address signals. A detector may be configured to actuate switching elements so that two or more sensing elements may be merged, and their output current or voltage may be combined. As can be seen in FIGS. 5-6, with the switch-element design between the sensing elements, the sensing elements may be provided without physical isolation areas (e.g., area 380 in FIG. 3B). Thus, when sensing element 512 is activated, all of the area under surface layer 601 may become active. When no physical isolation area is provided between adjacent sensing elements, dead area between them may be minimized or eliminated.

Figure 7:
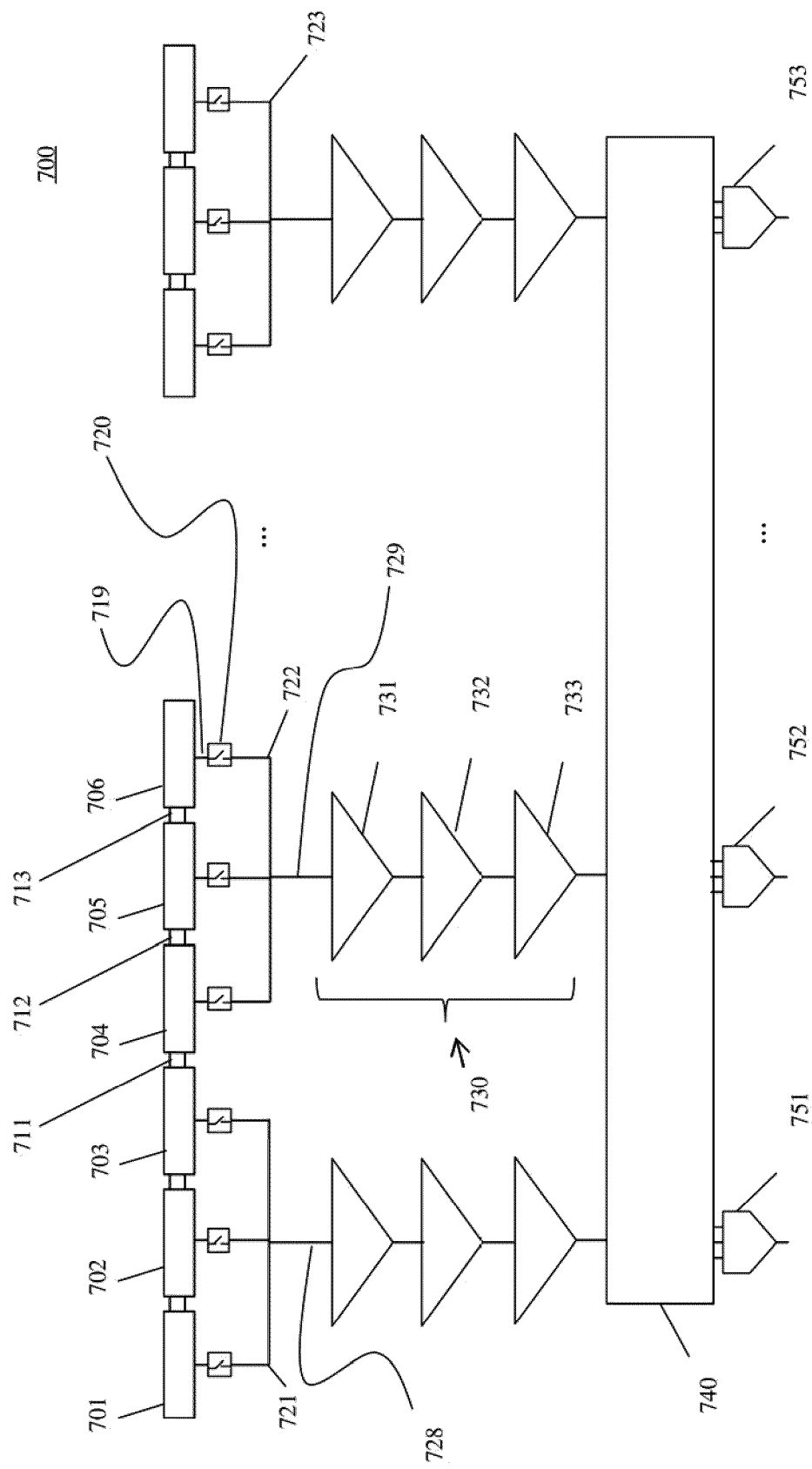
FIG. 7 is a diagram representing an exemplary section arrangement of a detector, consistent with embodiments of the present disclosure.

FIG. 7 is a diagram representing an exemplary section arrangement of a detector 700, consistent with embodiments of the present disclosure. For example, detector 700 may be an embodiment of detector 300A in FIG. 3A, detector array 400 in FIG. 4, or detector 500 in FIG. 5. As shown in FIG. 7, detector 700 may include multiple sensing elements, including sensing elements 701, 702, 703, 704, 705, and 706. In some embodiments, the multiple sensing elements may be part of a sensor layer that may form a detection surface (e.g., sensor surface 300B in FIG. 3B) of charged-particle detection device 244 in FIG. 2. The sensor layer may include switching elements between adjacent sensing elements (e.g., similar to switching elements 519 and 521 in FIG. 6), including inter-element switching elements 711, 712, and 713. In some embodiments, when being turned on, the switching elements may be configured to group two or more adjacent sensing elements together.

In FIG. 7, detector 700 may include multiple sections (e.g., similar to sections 321, 322, 323, and 324 in FIG. 3A). Each of the sections may include one or more sensing elements, and wiring paths (e g, similar to wiring paths 402 in FIG. 4) between the sensing elements, and a common output. In some embodiments, the wiring paths may include a common wire or a shared signal path. For example, as shown in FIG. 7, wiring paths 721 may be communicatively connected to sensing elements 701, 702, and 703, and to a common output 728. Wiring paths 721, sensing elements 701-703, and common output 728 may belong to a first section. Wiring paths 722 may be communicatively connected to sensing elements 704, 705, and 706, and to a common output 729. Wiring paths 722, sensing elements 704-706, and common output 729 may belong to a second section. An output (e.g., output 719) of a sensing element (e.g., sensing element 706) may be communicatively coupled to corresponding wiring paths (e.g., wiring paths 722) via an element-bus switching element (e.g., element-bus switching element 720). In some embodiments, element-bus switching element 720 may be implemented using techniques similar to switching elements 519 and 521 as described in FIG. 6. In some embodiments, when sensing element 706 is inactive, element-bus switching element 720 may be disconnected to reduce noise, parasitic capacitance, or other technical effects from sensing element 706.

In FIG. 7, the sections (e.g., the first section including sensing elements 701-703 or the second section including sensing elements 704-706) may be configured to output electrical signals to signal processing circuits and further circuit elements. For example, wiring paths 722 may output electrical signals to signal processing circuitry 730 via common output 729.

Signal processing circuitry 730 may include one or more signal processing circuits for processing electrical signals output by wiring paths 722. For example, signal processing circuitry 730 may include a pre-amplifier 731, a post-amplifier 732, and a data converter 733. For example, pre-amplifier 731 may be a transimpedance amplifier (TIA), a charge transfer amplifier (CTA), a current amplifier, or the like. Post-amplifier 732 may be a variable gain amplifier (VGA) or the like. Data converter 733 may be an analog-to-digital converter (ADC), which may convert an analog voltage or an analog current to a digital value. In some embodiments, pre-amplifier 731 and post-amplifier 732 may be combined as a single amplifier (e.g., amplifier 404 in FIG. 4), and data converter 733 may include ADC 406 in FIG. 4.

Detector 700 may include a digital switch 740. In some embodiments, digital switch 740 may include a switch-element matrix. In some embodiments, digital switch 740 may include a multiplexer (e.g., digital multiplexer 408 in FIG. 4). For example, the multiplexer may be configured to receive a first number of inputs and generate a second number of outputs, in which the first number and the second number may be the same or different. The first number may correspond to parameters (e.g., a total number of sections) of detector 700, and the second number may correspond to parameters (e.g., number of beamlets generated from charged-particle source 202 in FIG. 2) of beam tool 104 of FIGS. 1-2. Digital switch 740 may communicate with external components via data line(s) and address signal(s). In some embodiments, digital switch 740 may control data read/write. Digital switch 740 may also include circuitry for controlling the inter-element switching elements (e.g., inter-element switching elements 711, 712, and 713). In FIG. 7, digital switch 740 may generate output signals via multiple data channels, including data channels 751, 752, and 753. In some embodiments, the data channels of digital switch 740 may be further connected to other components (e.g., relays or the like). Thus, multiple sections of detector 700 may act as independent data channels for detector signals.

It is noted that various components may be inserted at various stages in the representation of FIG. 7. In some embodiments, one or more of the above components of detector 700 may be omitted. In some embodiments, other circuits may be provided for other functions. For example, switch-element actuating circuits (not shown in FIG. 7) may be provided to control inter-element switching elements (e.g., inter-element switching elements 711, 712, and 713) for connecting the sensing elements. In some embodiments, an analog output line (not shown in FIG. 7) may be provided, which can be read by an analog path. For example, the analog output line may be parallel to data converter 733 for receiving output of post-amplifier 732. For another example, the analog output line may replace data converter 733.

Figure 8:
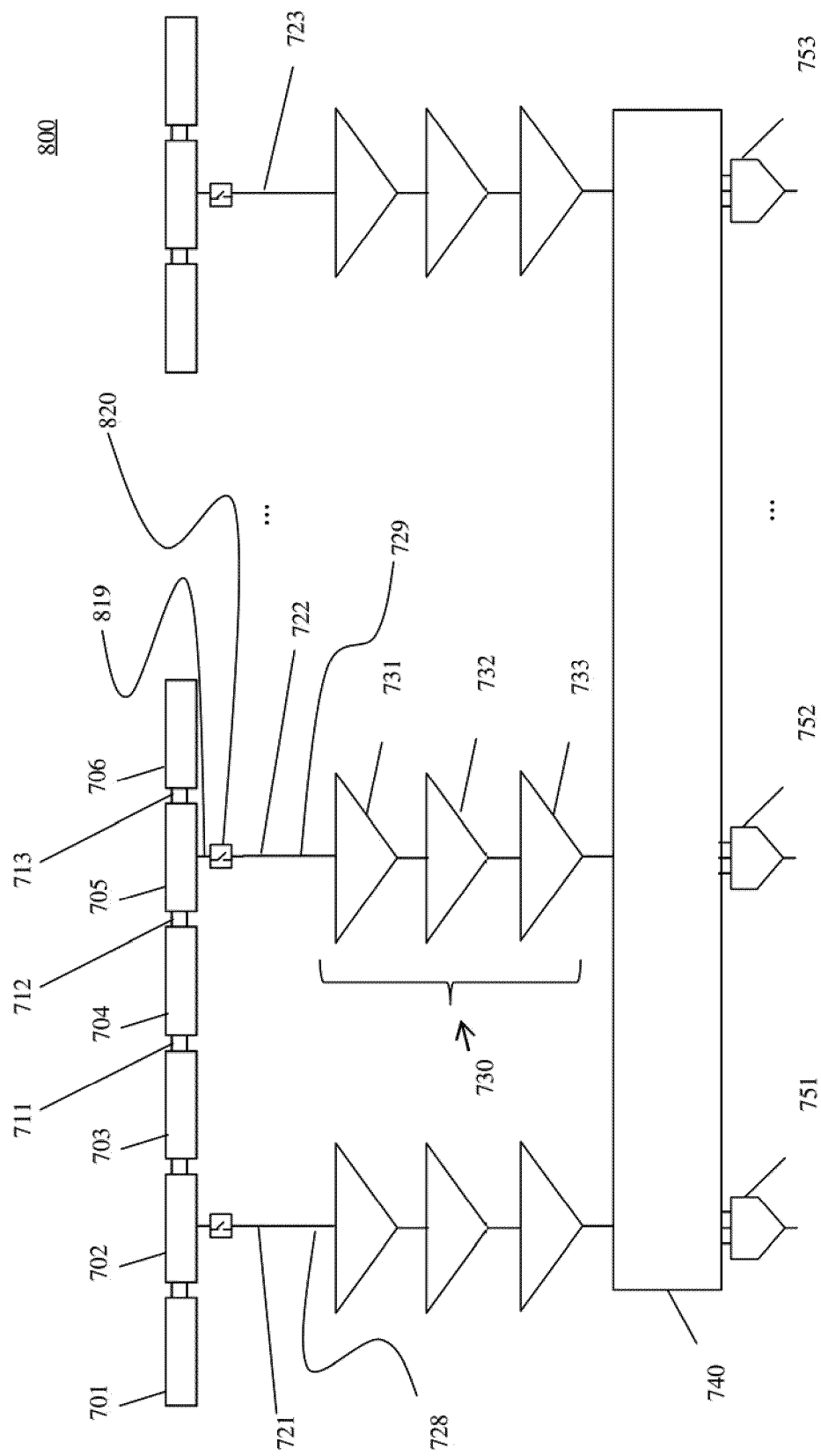
FIG. 8 is a diagram representing another exemplary section arrangement of a detector, consistent with embodiments of the present disclosure.

FIG. 8 is a diagram representing another exemplary section arrangement of detector 800, consistent with embodiments of the present disclosure. Detector 800 may be similar to detector 700 except that sensing elements (e.g., sensing elements 704, 705, and 706) associated with a section may be communicatively coupled to associated wiring paths (e.g., wiring paths 722) via a common wiring path (e.g., common wiring path 819) and a common switching element (e.g., common switching element 820). In some embodiments, common switching element 820 may be implemented using techniques similar to switching elements 519 and 521 as described in FIG. 6. For example, as shown in FIG. 8, if a charged-particle beam is incident on sensing elements 704, 705, and 706, sensing elements 704, 705, and 706 may generate detection signals. Sensing element 705 may directly output its detection signal to common wiring path 819. Sensing elements 704 and 706 may route their detection signals to sensing element 705 through inter-element switching elements 712 and 713, respectively, which may be further routed to common wiring path 819 via sensing element 705. Such a design may simplify manufacturing of a detector. As a comparison, a design that uses multiple wiring paths and switching elements between the sensing elements and sections (e.g., the design of detector 700 in FIG. 7) may provide configuration flexibility to group sensing elements because an output of a section is not fixed at any specific sensing element (e.g., sensing element 705 in FIG. 8) of that section. In addition, designs such as that of detector 700 in FIG. 7 may enhance simplicity in reading the output of individual sensing elements. To acquire the beam projection of secondary electron beams, it may be advantageous to read out the output of each sensing element so that the image of the projection pattern may be acquired.

Figure 9:
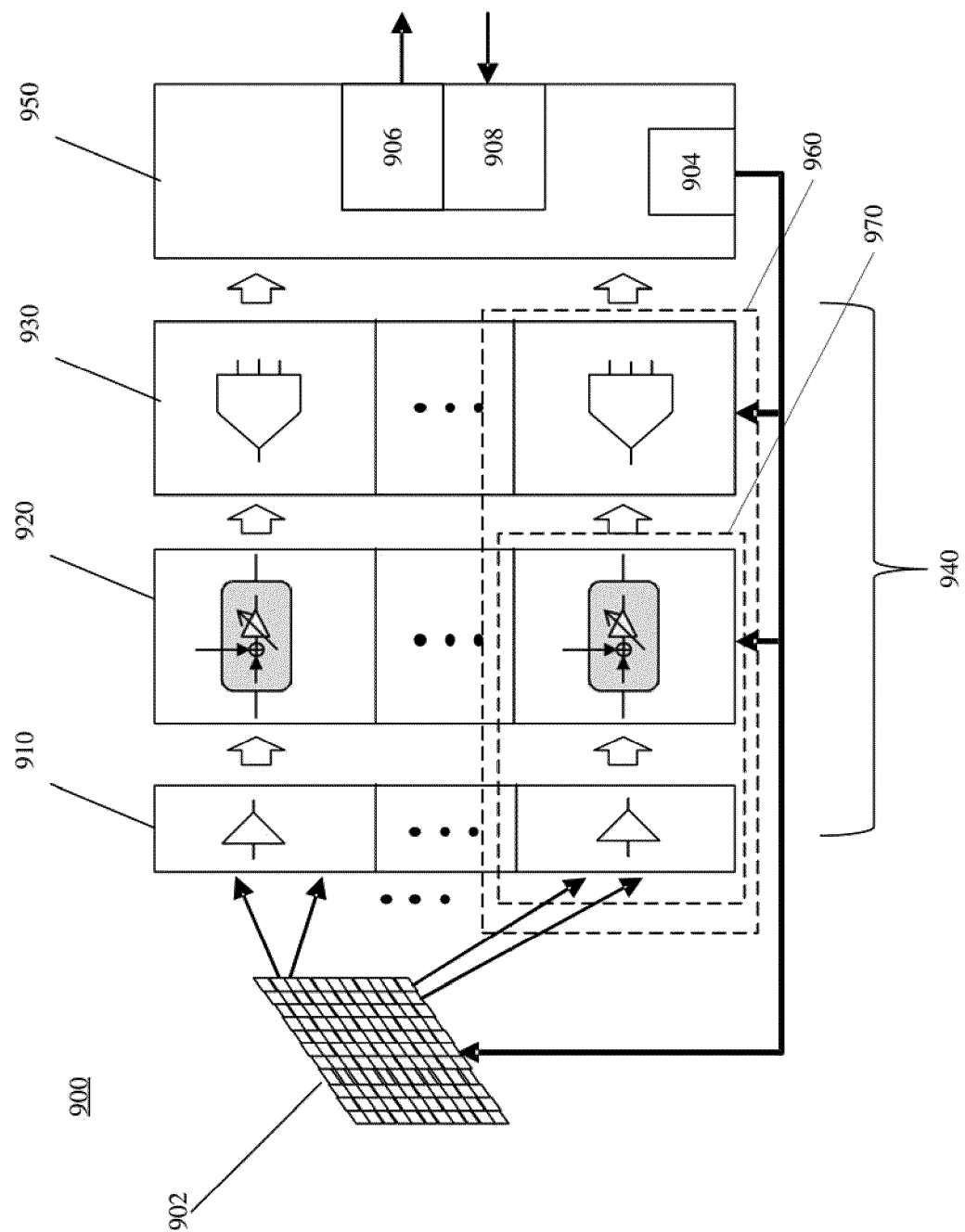
FIG. 9 is a diagram representing a detection system, consistent with embodiments of the present disclosure.

FIG. 9 is a diagram representing a detection system 900, consistent with embodiments of the present disclosure. In some embodiments, detection system 900 may be an embodiment of detection device 244 in FIG. 2. Detection system 900 may include sensing elements 902 (e.g, similar to the sensing elements as described in FIGS. 3A-8) and processing circuits 940 (e.g., similar to signal processing circuitry 730 in FIGS. 7-8). Processing circuits 940 may be communicatively coupled to a digital interface 950 (e.g., similar to digital switch 740 in FIGS. 7-8). Sensing elements 902 may form a sensor surface (e.g., sensor surface 300B of FIG. 3B), and may be segmented into sections (e.g., similar to the sections as described in FIGS. 3A-3B or FIGS. 7-8). Processing circuits 940 may include a first processing circuit array 910 (e.g., including pre-amplifier 731 in FIGS. 7-8) for processing outputs of sensing elements 902, a second processing circuit array 920 (e.g., including post-amplifier 732 in FIGS. 7-8) for providing gains and offset controls, and an ADC array 930 (e.g., including data converter 733 in FIGS. 7-8) for converting analog signals to digital signals. The first processing circuit array 910 and the second processing circuit array 920 may form signal conditioning circuits in processing circuits 940. Each section of processing circuits 940 may be communicatively coupled to a section of sensing elements 902, which may be orderly, communicatively coupled to a unit of first processing circuit array 910, a unit of second processing circuit array 920, and a unit of ADC array 930, forming a signal path (e.g., signal path 960). Such a signal path may receive output signals from the section of sensing elements 902 and generate a charged-particle detection current representing the intensity of at least a portion of a charged-particle beam spot formed on the section of sensing elements 902. The charged-particle detection data may be output to digital interface 950. In FIG. 9, signal path 960 includes an analog signal path 970, which includes the unit of first processing circuit array 910 and the unit of second processing circuit array 920.

Digital interface 950 may include a controller 904. Controller 904 may communicate with ADC array 930, second processing circuit array 920, and sensing elements 902. Digital interface 950 can also send and receive communications from a deflection and image control unit (not shown in FIG. 9) via, for example, a transceiver. The transceiver may include a transmitter 906 and receiver 908. In some embodiments, controller 904 may control the image signal process of detection system 900.

Several challenges exist in further improving the performance, capability, and adaptability of the detectors as described with reference to FIGS. 3A-9. Typically, those challenges may be related to one or more of the processing bandwidth that represents how many signals (e.g., analog signals or digital signals) the detector can process in parallel, the digital signal bandwidth that represents the top speed of data communication and the processing power of a digital system, the analog signal bandwidth that represents the detection capability of the detector and fineness of the inspection results, or the pixel rate that represents how fast the detector can process digital signals.

The analog signal bandwidth of the detector may be limited by parasitic parameters. For example, when a beam (e.g., secondary charged-particle beam 236, 238, or 240 in FIG. 2) impinging on a sensor surface (e.g., sensor surface 300B in FIG. 3B) of a detection device (e.g., detection device 244) has an extra-large spot size, a large number of sensing elements (e.g., the sensing elements as described in FIGS. 3A-8) of the detection device may be involved to detect the beam. In some cases, if the beam impinges on multiple sections of the sensor surface, sensing elements of those sections (e.g., the sections as described in FIGS. 3A-3B or FIGS. 7-8) may be involved to detect the beam. As another example, when sensing elements are hardwired together in the detection device, even when a beam impinges on only one sensing element of the sensor surface, all sensing elements hardwired together may be activated for detection. However, the more components being involved in detecting a beam, the more parasitic parameters (e.g., stray capacitance) that may be incurred in the signal conditioning circuits, which may dramatically reduce analog signal bandwidth of the analog signal paths (e.g., analog signal path 970 in FIG. 9) of the detection device. In some cases, when multiple sensing elements are involved for detection, the stray capacitance associated with the interconnections (e.g., switching elements) between sensing elements and input of the signal conditioning circuits may also be large, which may reduce the analog signal bandwidth of the amplifiers. Moreover, such dramatic reduction of the analog signal bandwidth may degrade imaging performance. For example, a blurred image may be produced, and a detector may not be able to fulfill a requirement for high pixel rate.

The data processing bandwidth of the detector may be limited by the component capability or the circuit design of the detector in some applications. Many existing detection devices may have only one ADC in each signal path, which may fail to meet some demands in some applications. For example, some applications involve high-density beams, which may not need high pixel rates for data processing. In such cases, a detection device may need a large number of signal paths for a small region of the detection device. However, the signal paths of the detection device may be easily exhausted even if high-data-rate ADCs are not needed to detect the high-density beams. As another example, some applications involve large-spot beams, each of which may generate large amount of detection signals and may need high pixel rates for data processing. In those cases, a detection device may need high-data-rate ADCs for its signal paths and a high-bandwidth data channel. To provide a high pixel rate for each large-spot beam, the detection device may use multiple signal paths for the large-spot beam. However, the signal paths of the detection device may still be easily exhausted in such cases, and even if the signal paths are sufficient, the data processing bandwidth of the data channel may still be easily exhausted due to the large data amount. As another example, some applications involve low-density beams but each beam requires high pixel rate for detection. In those cases, a detection device may need high-pixel-rate ADCs, which may cause higher costs in design and manufacturing. In some applications, some or all of the above-described challenges may co-exist. Existing designs of detection devices may lack adaptability to address the above challenges.

The pixel rate of the detector may be limited by many factors, including the analog signal bandwidth and the specifications of the components of the detector. For example, the ADCs in the readout circuits may have a maximum sampling rate that cannot support the needed pixel rate. Upgrading the limiting components to more advanced components may incur significant costs in research, development, and manufacturing. Therefore, low-cost solutions to improve the pixel rate of the detector are long strived for.

The performance adaptability of the detector may be limited by one-directional optimization. The design of the detector (e.g., sensor layer 301, section layer 302, and readout layer 303 in FIG. 3A) may be optimized for some applications, but such optimization may deteriorate the performance of the detector in some other applications.

Figure 10:
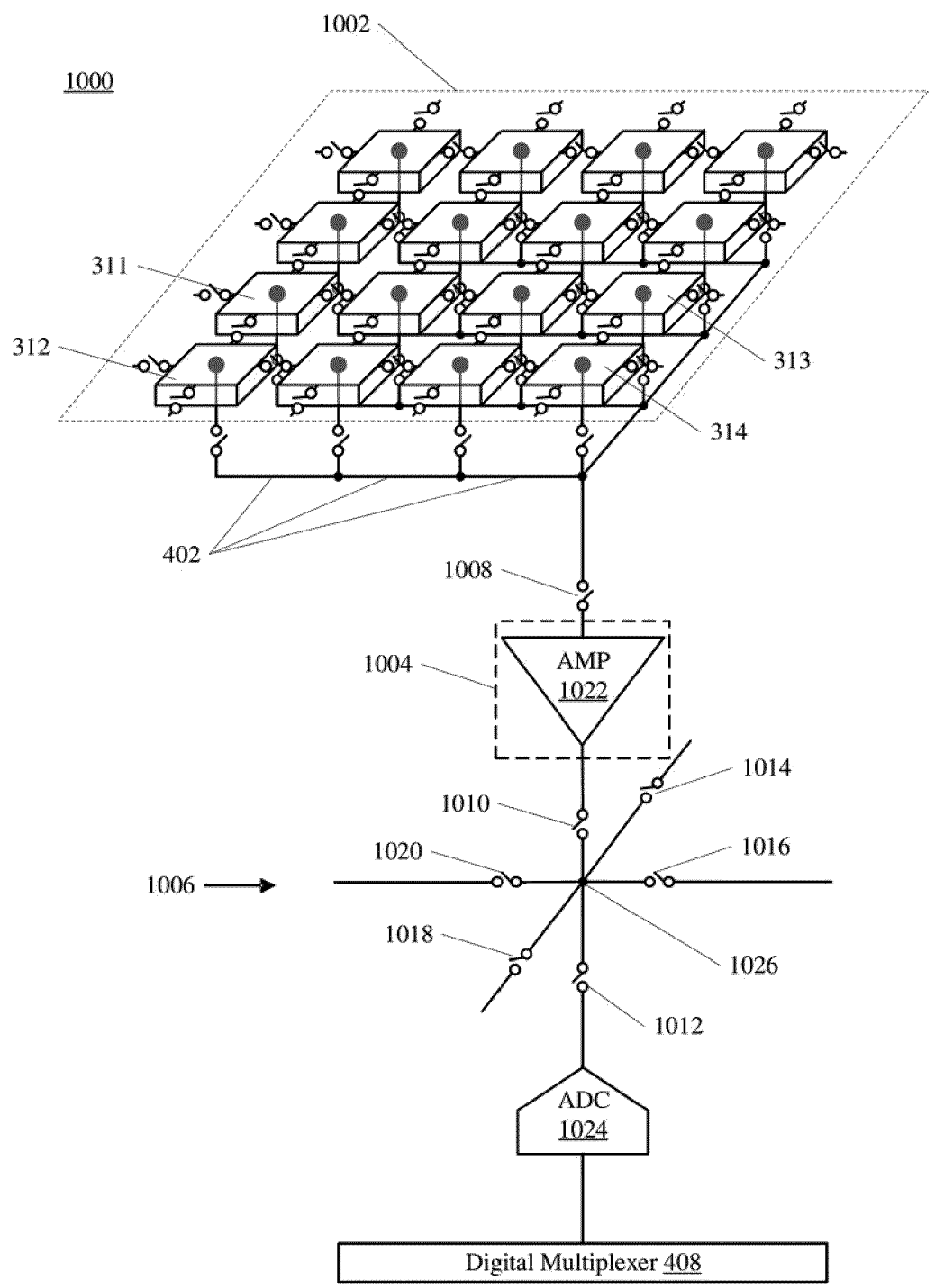
FIG. 10 is a diagram illustrating a detector array having an exemplary architecture, consistent with embodiments of the present disclosure.

An exemplary architecture of a detector array is provided in this disclosure which may help to alleviate some or all of the above-mentioned problems. FIG. 10 is a diagram illustrating a detector array 1000 with an exemplary architecture, consistent with embodiments of the present disclosure. The architecture of FIG. 10 may be used in either a single-beam inspection tool or a multibeam inspection tool (e.g., beam tool 104 in FIG. 2). Detector array 1000 may include some similar components as detector array 400 in FIG. 4, including section 321, sensing elements 311, 312, 313, and 314, wiring paths 402, and digital multiplexer 408. Similar to FIG. 4, detector array 1000 may include multiple sections, including section 1002 in FIG. 10. Section 1002 may be similar to section 321 and includes 4×4 sensing elements, including sensing elements 311, 312, 313, and 314. Detector array 1000 also includes an analog signal path 1004 associated with section 1002, which starts from the output of section 1002 and ends at the input of an interconnection layer 1006. Analog signal path 1004 includes an amplifier 1022. In some embodiments, similar to analog signal path 970 in FIG. 9, analog signal path 1004 may include, additionally or alternatively, other components. As shown in FIG. 10, section 1002 is associated with analog signal path 1004 (including amplifier 1022) and an ADC 1024, by which detection signals generated by sensing elements of section 1002 may be processed by analog signal path 1004 and ADC 1024, and be output to digital multiplexer 408. Digital multiplexer 408 may receive outputs of different ADCs associated with different sections of detector array 1000.

Detector array 1000 includes the interconnection layer 1006 that communicatively couples outputs of signal processing circuitry to each other. The signal processing circuitry may include analog signal paths (including analog signal path 1004). As shown in FIG. 10, interconnection layer 1006 includes interconnection switching elements communicatively coupled to outputs of analog signal paths of detector array 1000. For example, interconnection switching elements 1014, 1016, 1018, and 1020 may communicatively couple the outputs of adjacent analog signal paths (including analog signal path 1004).

In FIG. 10, a switching element 1008 may communicatively couple an output of section 1002 to an input of analog signal path 1004. A switching element 1010 may communicatively couple an output of analog signal path 1004 to an input (e.g., input/output point 1026 or "I/O point" 1026) of interconnection layer 1006. Switching elements 1008 and 1010 may be configured to be communicatively disconnected if analog signal path 1004 is not selected for use. For example, a charged-particle beam may impinge on some or all of the sensing elements of section 1002, but the detection signals of section 1002 may be redirected to another analog signal path corresponding to another section of detector array 1000. In such a case, analog signal path 1004 may be disconnected as a result of not being selected. In some embodiments, if no sensing element of section 1002 is impinged by any charged-particle and analog signal path 1004 is not selected for use (e.g., to process signal from other sections), besides communicatively disconnecting switching elements 1008 and 1010, amplifier 1022 may also be disabled to reduce power consumption. When switching elements 1008 and 1010 are communicatively disconnected, analog signal path 1004 (including amplifier 1022) may be effectively deactivated from detector array 1000.

In FIG. 10, a switching element 1012 may communicatively couple an output (e.g., I/O point 1026) of interconnection layer 1006 to an input of ADC 1024. In some embodiments, the output of interconnection layer 1006 may also be an input. For example, I/O point 1026 may function as both an input (communicatively coupled to the output of analog signal path 1004) and an output (communicatively coupled to the input of ADC 1024) of interconnection layer 1006. In some embodiments, the output of analog signal path 1004 may be equivalent to I/O point 1026. In some embodiments, the input of ADC 1024 may be equivalent to I/O point 1026. In some embodiments, I/O point 1026 may be implemented as separate components (not shown in FIG. 10). When switching element 1012 is communicatively disconnected, ADC 1024 may be effectively deactivated from section 1002 and any other section (not shown in FIG. 10) that is communicatively coupled to ADC 1024 via interconnection switching elements 1014, 1016, 1018, or 1020. In some embodiments, switching element 1012 may be configured to be communicatively disconnected if ADC 1024 is not selected for use. For example, signals output from analog signal path 1004 may be redirected to another ADC corresponding to another analog signal path in detector array 1000. In some embodiments, if no sensing element of section 1002 is impinged by any charged-particle and neither analog signal path 1004 nor ADC 1024 is selected for use (e.g., to process signal from other sections), besides communicatively disconnecting switching element 1012, ADC 1024 may also be disabled to reduce power consumption.

In some embodiments, detector array 1000 may route charged-particle detection signals in various ways depending on various factors, such as a size of a beam spot, a shape of the beam spot, or a pixel rate needed to be achieved, or the like. Detector array 1000 may route the detection signals by controlling connecting and disconnecting switching elements between sensing elements, switching elements 1008, 1010, 1012, and interconnection switching elements 1014, 1016, 1018, 1020. For example, detector array 1000 may route (e.g., through switching elements between sensing elements) signals output by section 1002 to another analog signal path other than analog signal path 1004. In another example, detector array 1000 may route signals from another section other than section 1002 to analog signal path 1004 through switching element 1008. In another example, detector array 1000 may route (e.g., through interconnection switching elements 1014, 1016, 1018, or 1020) signals output by analog signal path 1004 to another ADC other than ADC 1024. In another example, detector array 1000 may route (e.g., via switching element 1012) signals from another analog signal path other than analog signal path 1004 to ADC 1024. In some embodiments, if section 1002 generates no detection signals and neither analog signal path 1004 nor ADC 1024 is selected for use, and if an analog signal path or an ADC of an adjacent section is selected for use, an interconnection switching element (e.g., interconnection switching element 1014, 1016, 1018, or 1020) between section 1002 and the adjacent section may be communicatively disconnected, which may help to reduce crosstalk and parasitic parameters incurred by amplifier 1022 and ADC 1024 if they are powered on.

In some embodiments, if a sensing element (e.g., sensing element 311) of section 1002 is not in use and is not included in any sensing element group for detection of any secondary electron beam, it may be communicatively decoupled from wiring paths 402 for reducing parasitic parameters (e.g., stray capacitance), which may further help to improve performance of detector array 1000. For example, sensing element 311 may be disconnected from wiring paths 402 by communicatively disconnecting a switching element between sensing element 311 and wiring paths 402. When sensing element 311 is disconnected from wiring paths 402, all the switching elements between sensing element 311 and its neighboring sensing elements may also be communicatively disconnected.

In some embodiments, interconnection layer 1006, interconnection switching elements 1014, 1016, 1018, and 1020, and switching elements 1008, 1010, and 1012 may be included in a readout layer (e.g., similar to readout layer 303 in FIG. 3A) of detector array 1000. In some embodiments, interconnection switching elements 1014-1020 and switching elements 1008, 1010, 1012 may be implemented using techniques similar to switching elements 519 and 521 as described in FIG. 6.

In some embodiments, components such as the amplifiers (e.g., amplifier 1022) in the analog signal paths of detector array 1000, or the ADCs (e.g., ADC 1024) at the end of the signal path of detector array 1000 may be configured to work in a current mode, in which the inputs and outputs of the amplifiers and ADCs are electric currents. In some embodiments, the components (e.g., amplifier 1022 or ADC 1024) may be configured to work in a charge mode, in which the inputs and outputs of the amplifiers and ADCs are charge signals. Both amplifier 1022 and ADC 1024 may operate in current or charge mode, or in a hybrid mode. The hybrid mode may be a mixed mode of current mode and charge mode. In hybrid mode, the inputs and outputs of the amplifiers and ADCs may be configured to work in either of current mode or charge mode.

Compared with amplifiers working in voltage mode, amplifiers working under the charge mode or current mode may have decreased input impedance and increased output impedance. The decreased input impedance may lower the sensitivity of the amplifiers to surrounding interference (e.g., interference from adjacent digital components) and lower the sensitivity of the amplifiers to parasitic parameters (e.g., stray capacitance). Such benefits may also be achieved in other components besides amplifiers, such as ADCs. With the decreased input impedance, a component may have a high analog signal bandwidth even if some stray capacitance is present at its input and may enable hardware-based analog signal processing, in which the hardware involves interconnections between different signal paths (e.g., interconnection layer 1006). The increased output impedance may facilitate adding output signals from different analog signal paths. For example, the output signals from different analog signal paths may be added by communicatively connecting the outputs of the analog signal paths at a common point. The current or charge mode design for amplifiers and ADCs may lower the difficulty of designing and implementing hardware-based analog signal processing.

Figure 11:
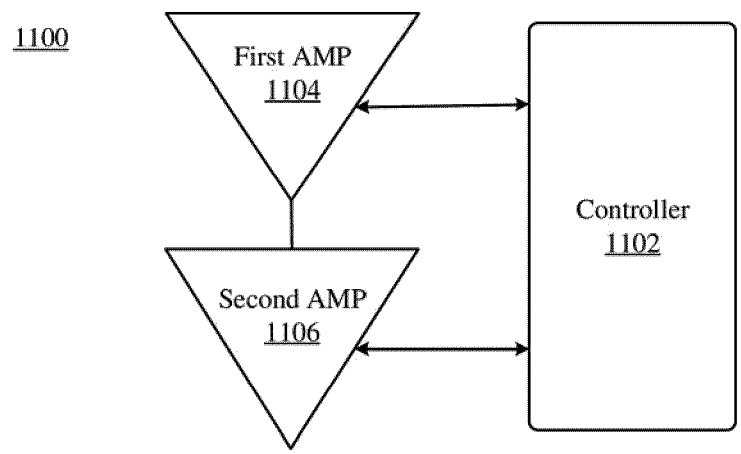
FIG. 11 is a diagram illustrating an exemplary amplifier working in a current mode, consistent with embodiments of the present disclosure.

FIG. 11 is a diagram illustrating an exemplary amplifier 1100 working in a current mode, consistent with embodiments of the present disclosure. In some embodiments, amplifier 1100 may be amplifier 1022 in detector array 1000. Amplifier 1100 includes a controller 1102, a first amplifier 1104, and a second amplifier 1106. First amplifier 1104 and second amplifier 1106 may be communicatively coupled in series, in which an output of first amplifier 1104 may be communicatively coupled to an input of second amplifier 1106. An input of first amplifier 1104 may receive a current signal generated by sensing elements (e.g., sensing elements in section 1002 in FIG. 10). An output of second amplifier 1106 may transmit an amplified current signal to an ADC (e.g., ADC 1024 in FIG. 10). Controller 1102 may be communicatively coupled to and control the operation of first amplifier 1104 and second amplifier 1106. In some embodiments, first amplifier 1104 may be a charge-transfer amplifier (CTA), a transimpedance amplifier (TIA), or a combination of CTA and TIA (CTIA) that can operate in either TIA or CTA mode. In some embodiments, second amplifier 1106 may be a transconductance amplifier (TCA). It should be noted that although amplifier 1100 is shown to include two amplification stages (i.e., first amplifier 1104 and second amplifier 1106) in FIG. 11, it may be implemented to have only one amplification stage or multiple amplification stages. For example, if amplifier 1100 is a single-stage amplifier, it may include a current amplifier, the input and output of which may be both electric currents. In another example, if amplifier 1100 is a multi-stage amplifier, it may include more amplifiers besides first amplifier 1104 and second amplifier 1106. This disclosure does not limit the embodiments of amplifier 1100 to the above-described examples. In some embodiments, the amplifiers may include a dual-mode charge-transfer and transimpedance amplifier. The amplifiers may also include a transconductance amplifier. Amplifiers may be configured to receive a current signal and output an electric-charge signal, or vice versa.

Figure 12:
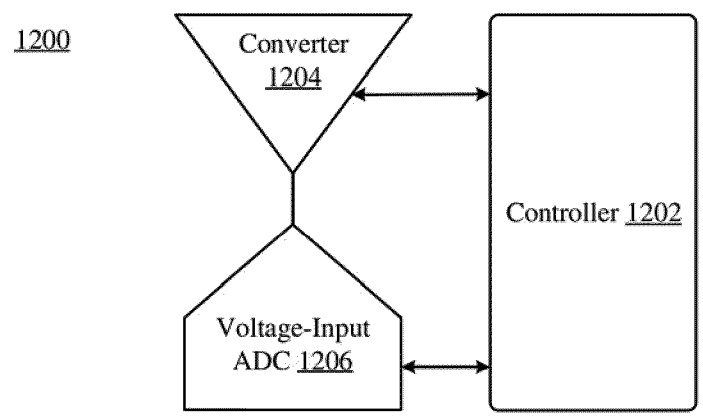
FIG. 12 is a diagram illustrating an exemplary analog-to-digital converter working in a current mode, consistent with embodiments of the present disclosure.

FIG. 12 is a diagram illustrating an exemplary ADC 1200 working in a current or charge mode, consistent with embodiments of the present disclosure. ADC 1200 may be ADC 1024 in detector array 1000 of FIG. 10. In the current or charge mode, the input of ADC 1200 may be current or charge signals, and the output of ADC 1200 may be either current or voltage signals. ADC 1200 includes a controller 1202, a converter 1204, and a voltage-input ADC 1206. Converter 1204 may be a current-to-voltage (I-V) converter or a charge-to-voltage (C-V converter, etc. Converter 1204 and voltage-input ADC 1206 may be communicatively coupled in series, in which an output of converter 1204 may be communicatively coupled to an input of voltage-input ADC 1206. An input of converter 1204 may receive a current signal output by amplifier 1100. An output of voltage-input ADC 1206 may transmit a digital signal to other processing circuitry (e.g., digital multiplexer 408 in FIG. 10). Controller 1202 may be communicatively coupled to and control the operation of converter 1204 and voltage-input ADC 1206. It should be noted although ADC 1200 is shown to include two stages (i.e., converter 1204 and voltage-input ADC 1206) in FIG. 12, it may be implemented to have only one stage and is still capable of operating in the current or charge mode. For example, if ADC 1200 is a single-stage ADC, it may be a charge-redistribution ADC or a charge-sharing ADC. This disclosure does not limit the embodiments of ADC 1200 to the above-described examples.

Figure 13:
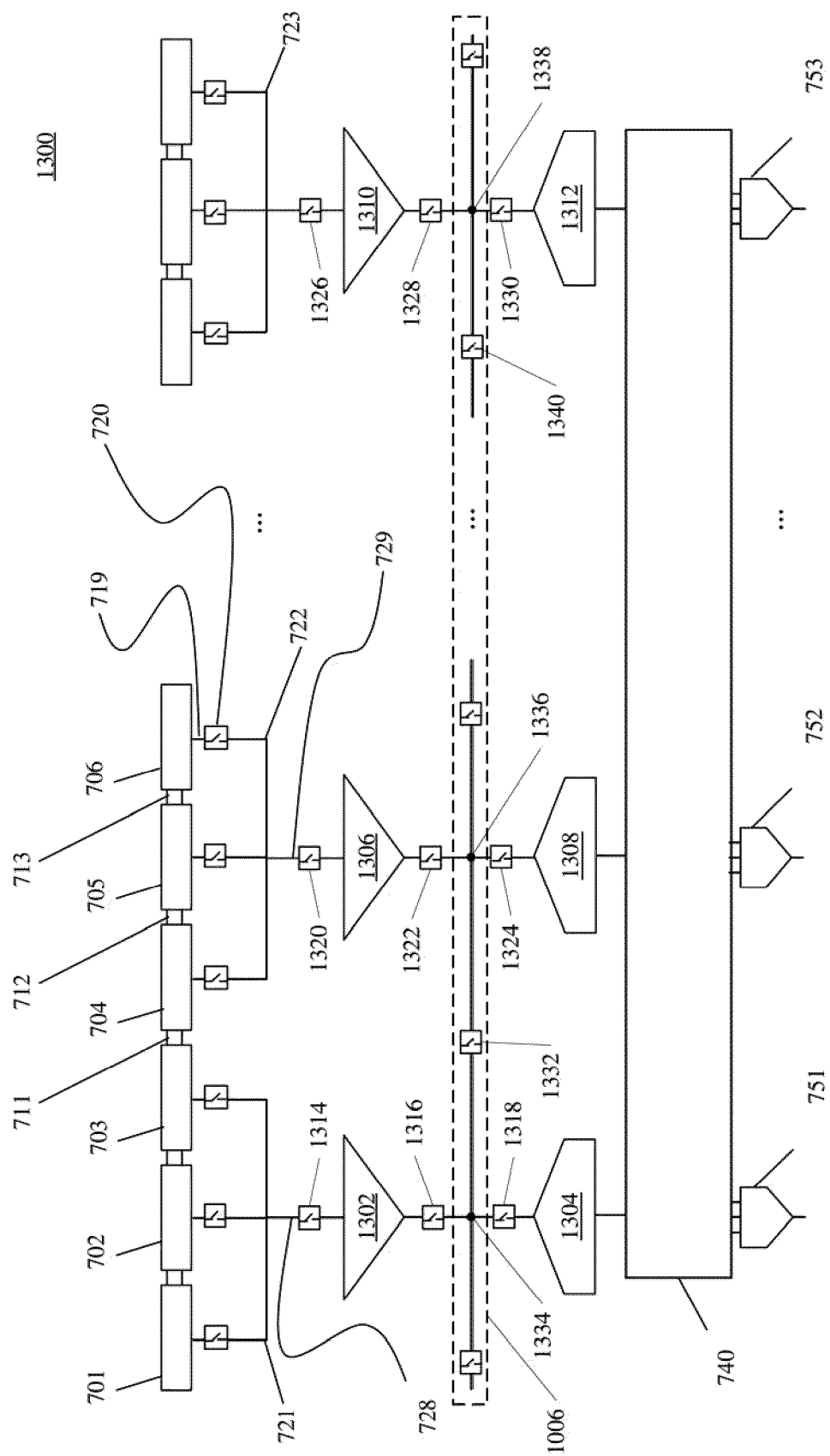
FIG. 13 is a diagram representing an exemplary section arrangement of a detector having the exemplary architecture of FIG. 10, consistent with embodiments of the present disclosure.

FIG. 13 is a diagram representing an exemplary section arrangement of a detector 1300 having the exemplary architecture of FIG. 10, consistent with embodiments of the present disclosure. Detector 1300 may have components similar to detector 700 of FIG. 7, including sensing elements 701, 702, 703, 704, 705, and 706, inter-element switching elements 711, 712, and 713, output 719, element-bus switching element 720, wiring paths 721, 722, and 723, common outputs 728 and 729, digital switch 740, and data channels 751, 752, and 753. In some embodiments, digital switch 740 may include digital multiplexer 408 as shown in FIG. 10.

In FIG. 13, similar to detector array 1000, amplifiers (including amplifiers 1302, 1306, and 1310) of detector 1300 may be communicatively coupled to sections via switching elements (e.g., switching elements 1314, 1320, and 1326). In some embodiments, the amplifiers may be similar to amplifier 1022 in FIG. 10 or amplifier 1100 in FIG. 11. The switching elements may be similar to switching element 1008 in FIG. 10.

In FIG. 13, detector 1300 includes ADCs (including ADCs 1304, 1308, and 1312) and interconnection layer 1006 (represented by the dashed line box) that is arranged between the amplifiers and the ADCs. The ADCs may be similar to ADC 1024 in FIG. 10 or ADC 1200 in FIG. 12. The amplifiers may be communicatively coupled to interconnection layer 1006 via switching elements (including switching elements 1316, 1322, and 1328), which may be similar to switching element 1010 in FIG. 10. Interconnection layer 1006 may be communicatively coupled to the ADCs via switching elements (including switching elements 1318, 1324, and 1330), which may be similar to switching element 1012 in FIG. 10. In some embodiments, switching elements 1314-1332 and 1340 may be implemented using techniques similar to switching elements 519 and 521 as described in FIG. 6.

In FIG. 13, interconnection layer 1006 may include multiple outputs, including an I/O point 1334, an I/O point 1336, and an I/O point 1338. In some embodiments, I/O points 1334, 1336, and 1338 may be similar to I/O point 1026 in FIG. 10. In some embodiments, each of the amplifiers (e.g., including amplifiers 1302, 1306, and 1310) of detector 1300 may be communicatively coupled to an input (e.g., I/O points 1334, 1336, and 1338, respectively) of interconnection layer 1006 via a switching element (e.g., switching element 1316, 1322, and 1328, respectively). In some embodiments, each of the ADCs (e.g., including ADCs 1304, 1308, and 1312) of detector 1300 may be communicatively coupled to an output (e.g., I/O points 1334, 1336, and 1338, respectively) of interconnection layer 1006 via a switching element (e.g., switching element 1318, 1324, and 1330, respectively).

In FIG. 13, interconnection layer 1006 includes interconnection switching elements (e.g., interconnection switching element 1332) communicatively coupled to outputs of the amplifiers, which may be similar to interconnection switching elements 1014, 1016, 1018, and 1020 in FIG. 10. In some embodiments, the interconnection switching elements in interconnection layer 1006 may be implemented using techniques similar to switching elements 519 and 521 as described in FIG. 6.

In some embodiments, for increasing the pixel rate, the ADCs of detector 1300 may be configured to work in an interleaving mode. Generally, when ADCs work in the interleaving mode, two or more ADCs may be communicatively coupled to a clocking circuit. The clocks of the ADCs may be set to have a predetermined relationship. When operating, the ADCs may alternately sample ("interleave") an input signal and generate a combined output signal. The pixel rate of the combined output signal may be higher than a pixel rate achieved by each individual ADC. For example, when m (m being an integer) ADCs are configured to work in the interleaving mode, in which each ADC has a pixel rate of n (n being a number) pixels per second, the combined pixel rate of the m ADCs may be m×n pixels per second.

For example, a clocking circuit (not shown in FIG. 13) and a control circuit (not shown in FIG. 13) may be provided in digital switch 740. A clock control circuit (e.g., may be part of controller 1202 in FIG. 12) may be provided in each ADC, including ADCs 1304, 1308, and 1312. The clock control circuit may be communicatively coupled to the clocking circuit and set different timing shifts for each ADC with reference to a clock signal generated by the clocking circuit. The inputs of the ADCs may be communicatively coupled to each other via the switching elements in interconnection layer 1006, and the control circuit may control them to work in the interleaving mode. In some embodiments, the amplifiers of detector 1300 working in the current mode may provide more flexibility to the ADCs to be configured to work the interleaving mode.

In some embodiments, for an application that requires a pixel rate higher than a pixel rate supported by the maximum sampling rate of the ADCs of detector 1300, the ADCs may be configured to work in the interleaving mode. For example, ADCs 1304 and 1308 may have the same maximum sampling rate. When wiring paths 721 are activated (e.g., due to a charged-particle beam impinging on sensing elements 701-703), switching elements 1314 and 1316 may be communicatively connected to enable the signal output by wiring paths 721 to be processed and amplified by amplifier 1302. Interconnection switching element 1332 and switching elements 1318 and 1324 may be coordinated to divert the amplified signal output by amplifier 1302 to ADCs 1304 and 1308 in an alternate manner. For example, the amplified signal output by amplifier 1302 may be diverted to ADC 1304 by communicatively connecting switching element 1318, and communicatively disconnecting interconnection switching element 1332 and switching element 1324. The amplified signal output by amplifier 1302 may be diverted to ADC 1308 by communicatively disconnecting switching element 1318, and communicatively connecting interconnection switching element 1332 and switching element 1324. The control circuit and clocking circuit may control the timing of such diversions and the timing of sampling for ADCs 1304 and 1308. The combined output signal of ADCs 1304 and 1308 may have an effective sampling rate twice that of the maximum sampling rate of any single ADC.

In should be noted that more than two ADCs of detector 1300 may be configured to work in the interleaving mode in a similar manner, and this disclosure does not limit the embodiments of the interleaving mode to the above examples. In some embodiments, the communicatively coupled ADCs of detector 1300 working in the interleaving mode may be either adjacent to each other or not adjacent to each other. For example, ADCs 1304, 1308, and 1312 may be configured to work in the interleaving mode, in which the interconnection switching elements of interconnection layer 1006 between them (e.g., including interconnection switching element 1332) and switching elements 1318, 1324, and 1330 may be coordinated to divert the amplified signal output by amplifier 1306 to ADCs 1304, 1308, and 1312 in an alternate manner. For example, the amplified signal output by amplifier 1306 may be diverted to ADC 1304 by communicatively connecting switching element 1318 and interconnection switching element 1332, and communicatively disconnecting switching element 1324, switching element 1330, and one or more interconnection switching elements between ADCs 1308 and 1312. The amplified signal output by amplifier 1306 may be diverted to ADC 1308 by communicatively connecting switching element 1324, and communicatively disconnecting switching element 1318, switching element 1330, interconnection switching element 1332, and one or more interconnection switching elements between ADCs 1308 and 1312. The amplified signal output by amplifier 1306 may be diverted to ADC 1312 by communicatively connecting switching element 1330 and all interconnection switching elements between ADCs 1308 and 1312, and communicatively disconnecting switching element 1318, switching element 1324, and interconnection switching element 1332.

In some embodiments, when the beams impinging on detector 1300 have a large beam spot, multiple analog signal paths of detector 1300 may be configured to be communicatively coupled to a single ADC via interconnection layer 1006. For example, the analog signals from different analog signal paths may be summed or merged by hardware (e.g., at interconnection layer 1006) before being input to any ADC. The summed analog signal may be converted by a single ADC. Such a design may reduce the needed digital output bandwidth and increase configuration flexibility. In contrast, existing designs of detectors may lack the capability of hardware-based analog signal summing before signal digitizing (e.g., due to analog signal path having no capability of outputting its signals to ADCs in other signal paths), and may require multiple digital output channels or bandwidth to process signals from the same large beam spot. Compared with existing designs, the design of detector 1300 may provide a higher analog signal bandwidth without requiring additional digital output capacity or causing significant increase in sizes of readout circuits, because a single ADC may be sufficient to process an analog signal summed before its input with analog signals from multiple analog signal paths.

Figure 14:
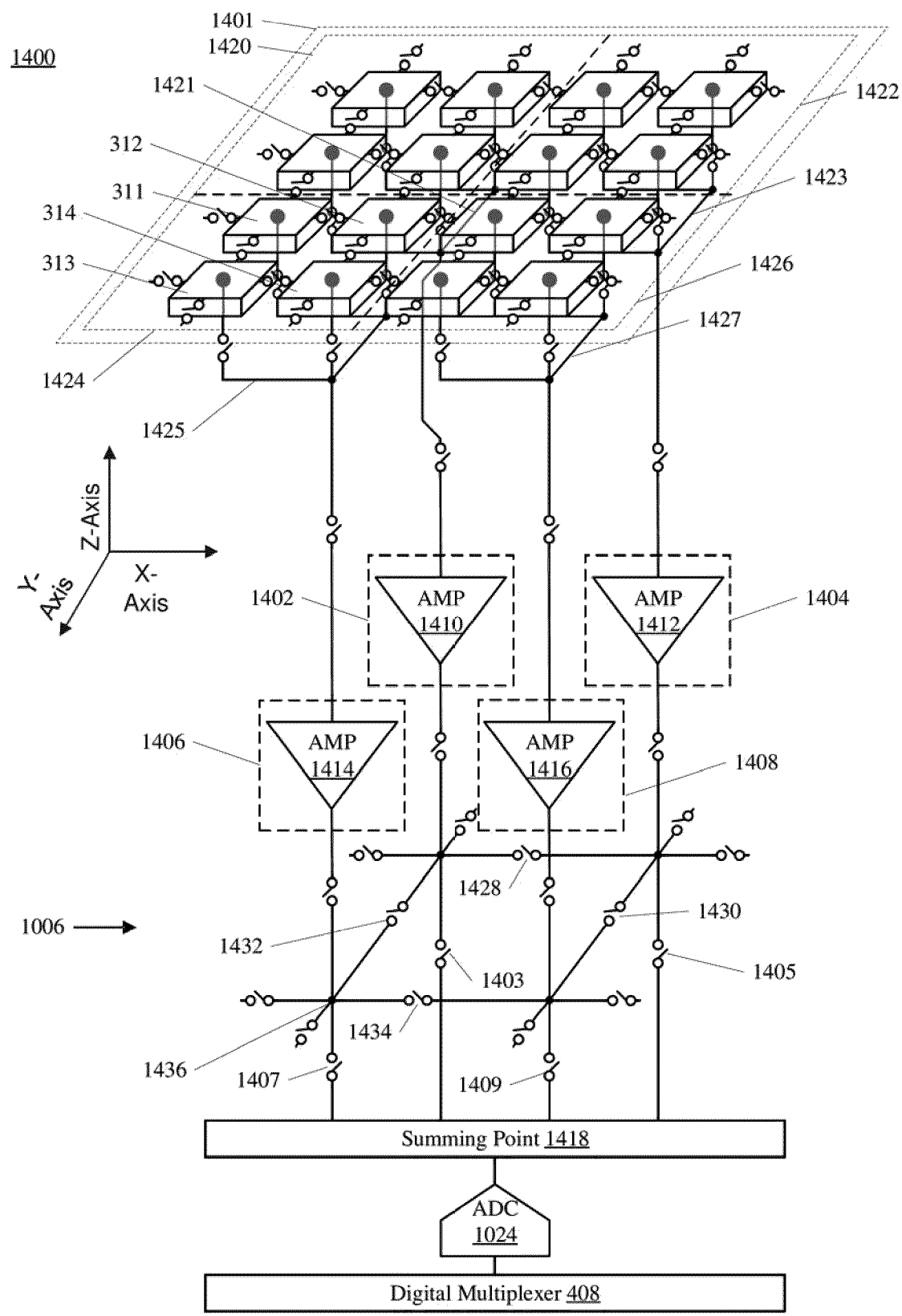
FIG. 14 is a diagram illustrating a detector array with another exemplary architecture, consistent with embodiments of the present disclosure.

FIG. 14 is a diagram illustrating a section 1401 of a detector array 1400 with an exemplary architecture, consistent with embodiments of the present disclosure. The architecture of FIG. 14 may be used in either a single-beam inspection tool or a multibeam inspection tool (e.g., beam tool 104 in FIG. 2). Section 1400 shares some similar components with section 1002 in FIG. 10, including sensing elements 311, 312, 313, and 314, ADC 1024, and digital multiplexer 408. In FIG. 14, section 1400 includes four subsections 1420, 1422, 1424, and 1426, each of which includes 2×2 sensing elements. Subsection 1424 includes sensing elements 311, 312, 313, and 314. Subsections 1420, 1422, 1424, and 1426 are communicatively coupled to wiring paths 1421, 1423, 1425, and 1427, respectively. FIG. 14 also shows four analog signal paths 1402, 1404, 1406, and 1408 communicatively coupled to wiring paths 1421, 1423, 1425, and 1427, respectively. Analog signal paths 1402, 1404, 1406, and 1408 may each be similar to analog signal path 1004 in FIG. 10 and include amplifiers 1410, 1412, 1414, and 1416, respectively. Each of analog signal paths 1402, 1404, 1406, and 1408 has an upstream switching element (e.g., similar to switching element 1008 in FIG. 10) between it and its wiring paths, and also has a downstream switching element (e.g., similar to switching element 1010 in FIG. 10) between it and interconnection layer 1006. As shown in FIG. 14, analog signal paths 1402, 1404, 1406, and 1408 are communicatively coupled to a summing point 1418 via interconnection layer 1006 with switching elements 1403, 1405, 1407, and 1409 (e.g., each being similar to switching element 1012 in FIG. 10) arranged between summing point 1418 and interconnection layer 1006. Summing point 1418 may be communicatively coupled to ADC 1024, which is further communicatively coupled to digital multiplexer 408. Summing point 1418 may operate as an analog multiplexer and may output a multiplexed analog signal to ADC 1024 to convert it to a digital signal. The digital signal may be output to digital multiplexer 408 for further processing.

In FIG. 14, subsections 1420, 1422, 1424, and 1426 are associated with analog signal paths 1402, 1404, 1406, and 1408, respectively. Analog signal paths 1402, 1404, 1406, and 1408 are associated with ADC 1024. In some embodiments, the numbers of the analog signal paths associated with one ADC may be arbitrary in section 1400. In some embodiments, different numbers of analog signal paths may be associated with one ADC in section 1400. Compared with analog signal path 1004 of detector array 1000 in FIG. 10, each of analog signal paths 1402, 1404, 1406, and 1408 in FIG. 14 may process signals detected from fewer sensing elements, which may increase the analog signal bandwidth and configuration flexibility. Section 1400 may route signals output by analog signal paths 1402, 1404, 1406, and 1408 to summing point 1418 in various ways by controlling opening and closing of interconnection switching elements 1428, 1430, 1432, and 1434 and switching elements 1403, 1405, 1407, and 1409.

In some embodiments, if signals output by analog signal paths 1402, 1404, 1406, and 1408 are from the same beam spot, those signals may be added (e.g., by hardware-based analog signal summing) at interconnection layer 1006 before being output to summing point 1418. For example, in such cases, interconnection switching elements 1428, 1430, and 1432 may be communicatively connected, switching elements 1403, 1405, and 1407 may be communicatively disconnected, and switching element 1409 may be communicatively connected, by which the signals output by analog signal paths 1402, 1404, 1406, and 1408 may be added at interconnection layer 1006 and output to summing point 1418 via switching element 1409.

In some embodiments, if signals output by analog signal paths 1402, 1404, 1406, and 1408 are all from different beam spots, those signals may be multiplexed to summing point 1418 without hardware-based analog signal summing. For example, in such cases, switching elements 1403, 1405, 1407, and 1409 may all be communicatively connected. If the highest sampling rate of ADC 1024 is sufficient to support the required pixel rate, interconnection switching elements 1428, 1430, 1432, and 1434 may all be communicatively disconnected, and the signals output by analog signal paths 1402, 1404, 1406, and 1408 may be multiplexed to summing point 1418 that may further output the multiplexed signal to ADC 1024 for signal digitization. If the highest sampling rate of ADC 1024 is insufficient to support the required pixel rate, the signals output by analog signal paths 1402, 1404, 1406, and 1408 may be output to multiple summing points (e.g., including summing point 1418 or others) via one or more interconnection switching elements in interconnection layer 1006, and the multiple summing points may output the signals to multiple ADCs (e.g., including ADC 1024 or others) for signal digitization. In such cases, the multiple ADCs may work in the interleaving mode.

In some embodiments, some of the signals output by analog signal paths 1402, 1404, 1406, and 1408 may be from the same beam spot, and some of the signals may be from different beam spots. In those cases, the signals from the same beam spot may be added at interconnection layer 1006 to generate a sum of analog signals, and the signals from different beam spots may be kept as individual signals (e.g., without performing hardware-based analog signal summing) at interconnection layer 1006. The sum analog signal and the individual signals may be multiplexed to summing point 1418 or multiple summing points as described above, depending on whether the highest sampling rate of ADC 1024 is sufficient to support the required pixel rate.

In some embodiments, the configuration flexibility and performance adaptability of the architecture as shown in FIG. 14 may be further increased by communicatively coupling multiple analog signal paths (e.g., including analog signal paths 1402, 1404, 1406, and 1408) to multiple summing points (e.g., including summing point 1418) via the switching elements of interconnection layer 1006. By doing so, section 1400 may be configured to have various ratios of analog signal paths to ADCs in a data channel for different applications. Depending on the applications and detector settings, the number of analog signal paths (e.g., the number of amplifiers) may be larger than, smaller than, or equal to the number of ADCs in the data channel. By doing so, the architecture as shown in FIG. 11, FIG. 13, and FIG. 14 may provide high configuration flexibility, high failure tolerance, and low power consumption for signal processing without incurring significant costs.

The high configuration flexibility may avoid the one-directional optimization problem. For example, several ADCs may be interleaved to process signals from multiple analog signal paths, such as for applications involving large-spot beams and requiring high pixel rates. In another example, one ADC may be assigned to one beam (e.g., requiring one analog signal path) for signal processing. In another example, one ADC may be shared by several beams (e.g., passing several analog signal paths) for signal processing, such as for applications involving high-density beams and not requiring high pixel rates. The high failure tolerance may increase robustness of the detection system. For example, if some of the amplifiers or ADCs of the detector malfunction, the malfunctioning components may be bypassed, and the signals supposed to be processed by them may be redirected to other components for processing. The low power consumption may be achieved by powering of (and communicatively disconnecting) unnecessary components (e.g., analog signal paths or ADCs) of the detector without affecting the performance as required by specific applications. It should be noted that the specific ratios of the amplifiers to ADCs and the specific manners of signal routing and processing may not be limited to the above-described examples, and embodiments of this disclosure may provide other implementations depending on specific applications.

Figure 15:
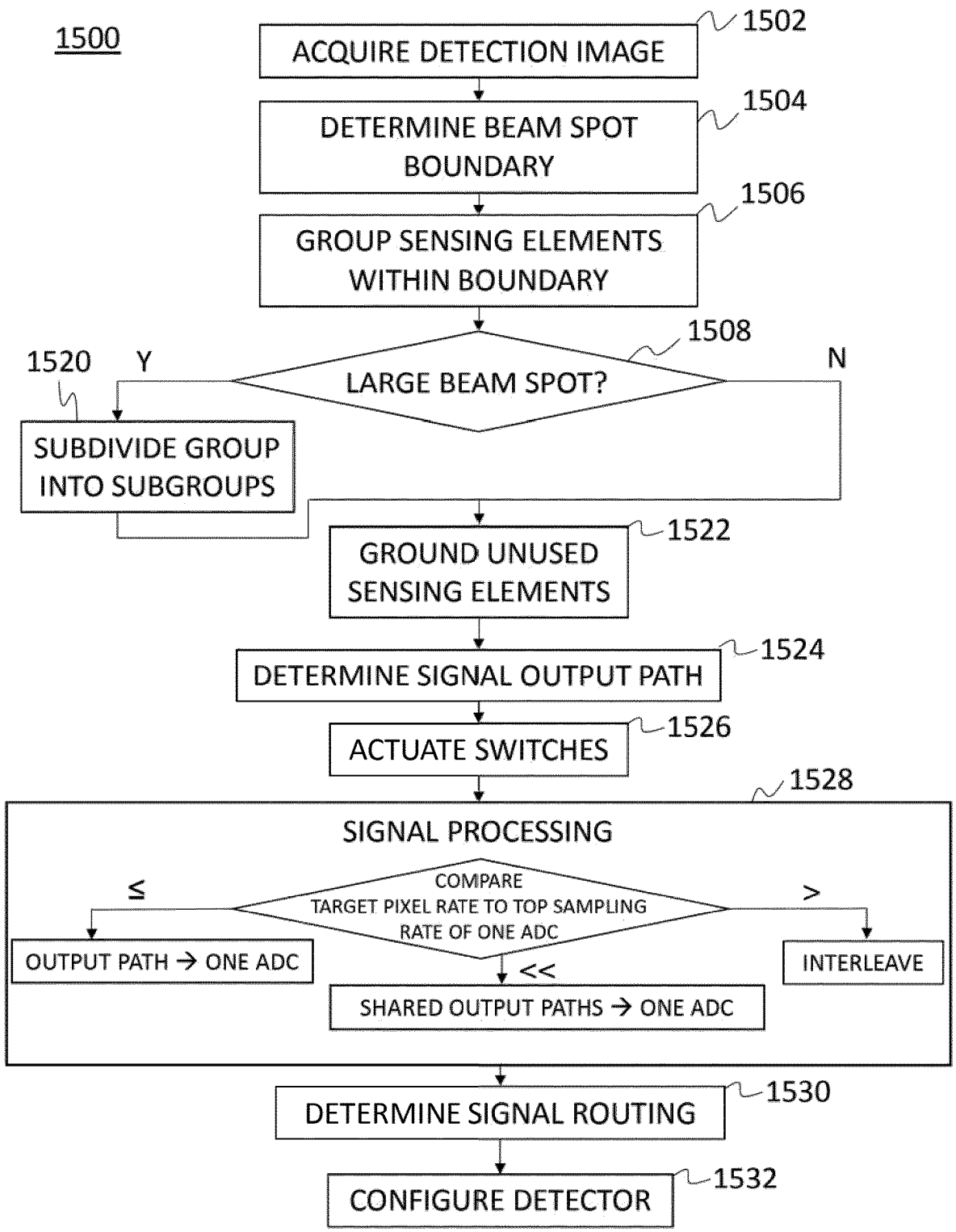
FIG. 15 is a flowchart of an exemplary method of detecting a charged-particle beam, consistent with embodiments of the present disclosure.

FIG. 15 is a flowchart of an exemplary method 1500 of detecting a charged-particle beam, consistent with embodiments of the present disclosure. Method 1500 may be performed by a controller of the charged-particle inspection system (e.g., controller 109 in FIG. 1 or controller 904 in FIG. 9). The controller may include circuitry (e.g., a memory and a processor) programmed to implement method 1500. For example, the controller may be an internal controller or an external controller (e.g., controller 109 in FIG. 1 or controller 904 in FIG. 9) coupled with the charged-particle inspection system. Method 1500 may be connected to the components, operations, and steps shown and described with relation to FIGS. 3A-14.

As shown in FIG. 15, method 1500 may begin with a step 1502 of acquiring a detection image. The detection image may be an image of a charged particle beam spot formed on a surface of a detector (e.g., a secondary electron beam spot). The detection image may include a secondary beam spot projection pattern on the detector surface. When multiple charged particle beams are incident on the detector, the detection image may include multiple beam spots. Step 1502 may include reading individual outputs of sensing elements that may be included in the detector. It may be determined in step 1502 that charged particles exiting a wafer are incident on the detector and thus image processing should begin. Step 1502 may include image acquisition processing that is performed at a relatively low speed as compared to a target pixel rate of a particular application.

Next, as shown in FIG. 15, method 1500 may proceed to a step 1504 of determining a boundary. The boundary may correspond to a boundary of a charged particle beam spot projected on the surface of the detector. The boundary may be determined from information gathered at step 1502. Step 1504 may include determining multiple boundaries that correspond to multiple beam spots. Boundaries may be used for assigning sensing elements to groups, as will be discussed below.

Next, as shown in FIG. 15, method 1500 may proceed to a step 1506 of grouping sensing elements together. Sensing elements within a boundary may be grouped together. Step 1506 may include actuating switches. Switches between sensing elements may be actuated such that, for example, two adjacent sensing elements that are within the same group are electrically connected.

Next, as shown in FIG. 15, method 1500 may proceed to a step 1508 of determining whether a beam spot is large. Step 1508 may be based on predetermined criteria. Step 1508 may include determining a size of a beam spot and comparing it to a threshold. Step 1508 may include determining whether a target analog bandwidth corresponding to a target pixel rate is achievable for a group of sensing elements. Determining whether the target analog bandwidth is achievable may be based on characteristics of the sensing elements and signal processing circuitry included in the group. A beam spot may be determined to be large when, for example, the beam spot has such a size that the target bandwidth for the application will not be achievable based on the number of sensing elements included in the group.

In response to determining that a beam spot is not large in step 1508, method 1500 may proceed to a step 1522 of grounding unused sensing elements, as will be discussed below. When the beam spot is determined not to be large, the beam spot may be treated as a single group and processed as such.

In response to determining that a beam spot is large in step 1508, method 1500 may proceed to a step 1520 of subdividing the group corresponding to the large beam spot into subgroups. Step 1520 may include determining a size of subgroups. The size of subgroups may be based on the target analog bandwidth. Subgroups may be treated as an individual group of sensing elements and may be associated with an analog signal path, as will be discussed below.

Figure 16A:
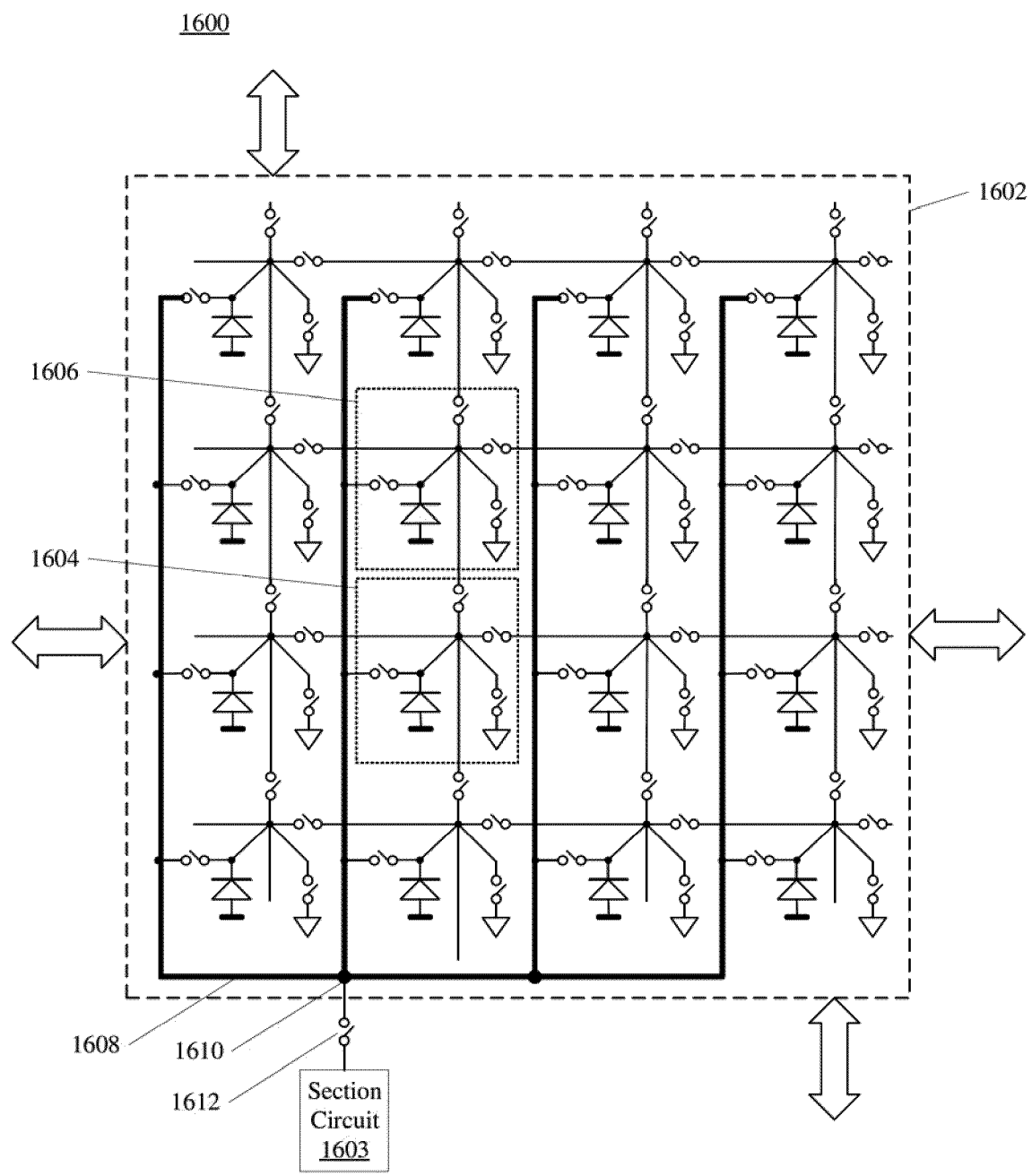
FIG. 16A is a diagram illustrating an exemplary switch network or switch matrix design for a detector array, consistent with embodiments of the present disclosure.
Figure 16B:
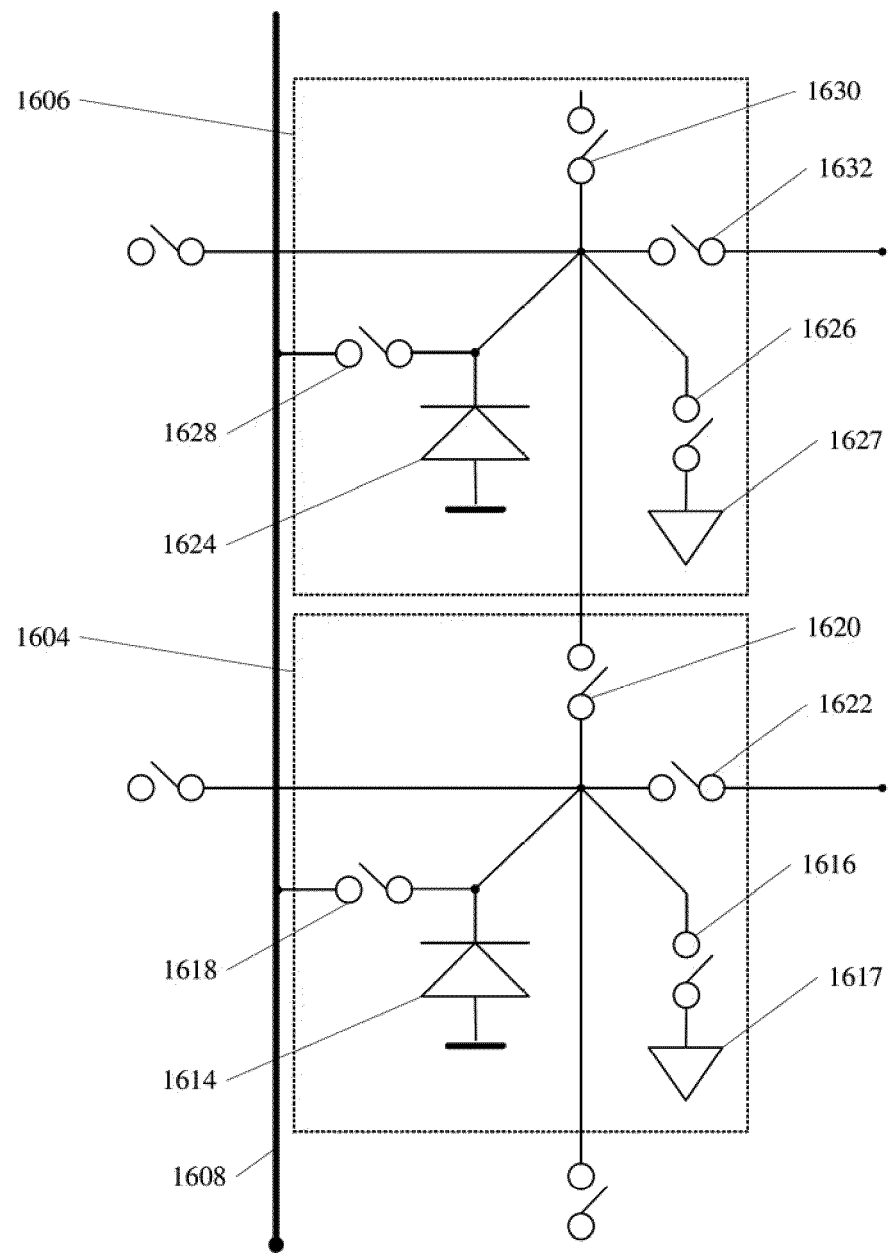
FIG. 16B is a diagram illustrating adjacent sensing elements of the detector array of FIG. 16A, consistent with embodiments of the present disclosure.

Next, as shown in FIG. 15, method 1500 may proceed from either step 1508 or step 1520 to a step 1522 of grounding unused sensing elements. Sensing elements that are not in use may be grounded using a grounding switch, or other means. The grounding switch may be provided in the sensing element level of circuitry. An example of a grounding switch is shown in FIGS. 16A-16B. Sensing elements may be determined to be unused based on whether or not they are included in the group or subgroup, for example. In some embodiments, unused sensing elements may be determined to be those not outputting a detection signal, or those determined to be excluded from the group or subgroup for certain reasons (e.g., to reduce cross talk).

Next, as shown in FIG. 15, method 1500 may proceed to a step 1524 of determining signal output path. Step 1524 may include determining a signal output path for each beam spot and its corresponding sensing element group or subgroups. The signal output path may be an analog signal path. In some embodiments, location of the output point for each group or subgroup may be determined to be in a region of the geometric center or mass center of each sensing element group or subgroup. Determining an output location based on mass center may involve using the intensity distribution of the beam spot within the group or subgroup.

Next, as shown in FIG. 15, method 1500 may proceed to a step 1526 of actuating switches to connect a group or subgroup of sensing elements to its signal output path. The signal output path assigned to a group or subgroup of sensing elements may be that determined in step 1524. Switches actuated in step 1526 may be switches provided at the outputs of sensing elements (e.g., as opposed to switches between adjacent sensing elements). Step 1526 may include connecting sensing elements to an analog signal path that has the shortest distance from the geometric or mass center of the group or subgroup. The input of the analog signal path may be connected to the group or subgroup of sensing elements through the output of the sensing at the geometric or mass center of the group or subgroup, or through the outputs of sensing elements near the geometric or mass center. Switches at the outputs of sensing elements may be closed and those sensing elements may be connected to a common wire in a section that the analog signal path belongs to. In some embodiments, the number of switches at the outputs of sensing elements may be 1 or more than 1. When the number of switches is more than 1, impedance from the group or subgroup of sensing elements to the input of the analog signal path may be reduced. This may result in improved analog signal bandwidth.

Next, as shown in FIG. 15, method 1500 may proceed to a step 1528 of signal processing. Step 1528 may include digitizing the signal of a beam spot by an ADC. The signal that is digitized by the ADC may be an amplified signal that has been amplified through the analog signal path of a group of sensing elements. When the beam spot is large (Y in step 1508), step 1528 may include adding together signals from subgroups of sensing elements. These signals may be added together by hardware, for example, in such a way that corresponding switches between outputs of analog signal paths are connected (e.g., in interconnection layer 1006 as shown in FIG. 10, FIG. 13, and FIG. 14). Step 1528 may include determining whether the target pixel rate is greater than the top sampling rate of one ADC. If the target pixel rate is not greater than the top sampling rate of one ADC, then one ADC may be assigned to each output signal path of a beam spot. If the target pixel rate is much less than the top sampling rate of one ADC, one ADC may be shared through an interconnection layer (e.g., interconnection layer 1006 as shown in FIG. 10, FIG. 13, and FIG. 14) by multiple analog signals. The target pixel rate may be much less than (<<) the top sampling rate of one ADC when, for example, they are at least an order of magnitude apart (e.g., the top sampling rate is 10 times or more greater than the target pixel rate). If the target pixel rate is higher than the top sampling rate of one ADC, then multiple ADCs may be interleaved through the interconnection layer and the multiple ADCs may be used to process the analog signals of one beam spot.

Next, as shown in FIG. 15, method 1500 may proceed to a step 1530 of determining signal routing. Signal routing for ADC outputs may be determined based on the location of the ADCs in the detector and the digital output channels used to transfer data from them.

Next, as shown in FIG. 15, method 1500 may proceed to a step 1532 of configuring the detector. The detector may be configured based on various other determinations performed in method 1500. For example, the detector may be configured to operate in normal beam intensity detection mode running at a pixel rate required by a particular application. The setting may be maintained until SEM imaging conditions are changed that may causes changes in secondary electron beam projection.

Modifications and variations of method 1500 will be apparent. For example, in FIG. 15, at step 1502, a controller may determine a sensing-element group, in which the sensing-element group may include a sensing element that is being projected by a beam spot of a charged-particle beam in a charged-particle detector (e.g., detector 1300 in FIG. 13 or detector array 1400 in FIG. 14). For example, the charged-particle beam may be any of secondary charged-particle beams 236, 238, and 240 in FIG. 2. The sensing element may be on a surface (e.g., sensor surface 300B in FIG. 3B) of the charged-particle detector, such as any of sensing elements 311-314 in FIG. 10, any of sensing elements 701-706 in FIG. 13, or any of sensing elements 311-314 in FIG. 14. The sensing-element group may represent a profile or a shape of the beam spot. For example, the boundary sensing elements in the sensing-element group may represent a boundary of the beam spot.

In some embodiments, the charged-particle detector may be a scanning electron microscope (SEM). In some embodiments, the charged-particle detector may be in a single-beam inspection apparatus (e.g., a single-beam SEM). In some embodiments, the charged-particle detector may be in a multi-beam inspection apparatus (e.g., beam tool 104 in FIG. 2). It should be noted that method 1500 may be implemented at either the single-beam inspection apparatus or the multi-beam inspection apparatus, and this disclosure does not impose any limit on such implementations.

In some embodiments, the sensing-element group may include a plurality of sensing elements. In those cases, the controller may receive output signals of the plurality of sensing elements of the charged-particle detector. The controller may collect information to, for example, detect or form a picture of a secondary charged-particle beam spot projected on the detector. The controller may read the output of each individual sensing element. Any switches between adjacent sensing elements (e.g., inter-element switching elements 711, 712, and 713 as shown in FIG. 13) may be in an open (e.g., disconnected) state. For example, if the charged-particle detector is detector 1300 in FIG. 13, the controller may receive an output signal of sensing element 706 through output 719. The controller may use collected information to determine a boundary of charged particle beam spots formed on the detector surface.

Determination of whether a beam spot is large, as in step 1508 of FIG. 15 may be based on a condition. The condition may be related to capabilities of signal processing circuitry in a detector. For example, a controller may determine that signal processing circuitry associated with a sensing-element group can or cannot handle a particular case (e.g., based on a target application). This may be related to a target analog signal bandwidth for an application. Bandwidth may be determined by characteristics of a sensing-element group, including its associated components. For example, the bandwidth for a sensing-element group may be determined by the size of the sensing-element group and the amplifier associated with it. A total analog signal bandwidth for processing an output signal of the sensing-element group under a predetermined pixel rate may or may not meet the requirements of an application.

For example, when the beam spot of a charged particle beam detected at step 1502 is large and covers a large number of sensing elements, the sensing elements may be grouped together in a sensing-element group, and analog signal bandwidth reduction may occur so that the signal processing circuitry of the sensing-element group cannot reach the required analog signal bandwidth of a desired application. As an example, a beam spot of a charged particle beam may cover the sensing elements of section 1401 (see FIG. 14), and may cover some sensing elements of other adjacent sections (not shown). The sensing elements in section 1401 may be grouped together, along with the covered sensing elements in other sections. The input of one of the analog signal paths associated with section 1401 may be communicatively coupled to the sensing-element group. In some embodiments, if a requirement for analog signal bandwidth corresponding to a target pixel rate for processing the output signals for the group cannot be reached, a controller may divide the group into smaller subgroups, each of which may be communicatively coupled to the input of an analog signal path in section 1401 or analog signal paths in other sections that may be (at least partially) covered by the beam spot. In this way, signals may be transmitted through different subgroups and different signal processing circuitries. The signals of the subgroups may be summed together to represent an overall signal of the original group.

FIG. 16A is a diagram illustrating an exemplary switch design for a detector array 1600, consistent with embodiments of the present disclosure. Detector array 1600 may be an example embodiment of detector 300A in FIG. 3A. For example, the switch design of detector array 1600 may be implemented in detector array 400, 1000, or 1400. The switch network or switch matrix design of FIG. 16A may be used in either a single-beam inspection tool or a multibeam inspection tool (e.g., beam tool 164 in FIG. 2).

In FIG. 16A, detector array 1600 may include multiple sections (e.g., similar to section 1002 in FIG. 10), including section 1602 (enclosed by a dash-line box). Section 1602 may be communicatively coupled to one or more other sections of detector array 1600. In FIG. 16A, section 1602 is communicatively coupled to four adjacent (or "neighboring") sections (not shown in FIG. 16A) in its four planar directions (shown by double-headed arrows). Two "adjacent" objects along a direction herein may refer to two objects that have no intervening object arranged therebetween along the direction. Such object may be, for example, a section or a sensing element.

Section 1602 includes 4×4 sensing elements (e.g., similar to any of sensing elements 312-314 in FIGS. 4, 10, and 14, any of sensing elements 511-513 in FIGS. 5-6, or any of sensing elements 701-706 in FIGS. 7, 8, and 13), including sensing elements 1604 and 1606 (enclosed by dot-line boxes). As shown in FIG. 16A, each sensing element of detector array 1600 may have the same structure and operate in the same way. In FIG. 16A, sensing elements 1604 and 1606 are adjacent in the vertical (e.g., y-axis) direction. Section 1602 further includes an output bus 1608 (shown as bold-black lines) that is a shared signal bus for receiving individual detection signals generated by the sensing elements (e.g., sensing element 1604 or 1606). Output bus 1608 may output the received signals independently via a bus output 1610 to a section signal path or read out circuit. As shown in FIG. 16A, output bus 1608 may output signals to a section circuit 1603. Section circuit 1603 may, for example, be included in any of sections 321-324 in FIG. 3A. A switching element 1612 may be arranged between bus output 1610 and section circuit 1603. In some embodiments, when no signal is output at bus output 1610, switching element 1612 may be set as communicatively disconnected (e.g., open) for reducing parasitic parameters in signal processing.

FIG. 16B is a diagram illustrating sensing elements 1604 and 1606 of section 1602 in FIG. 16A, consistent with embodiments of the present disclosure. Sensing elements of a detector array may generate signals in response to incidence of incoming charged particles. Thus, a sensing element may act as a diode in that it may convert incident energy into a measurable signal, and may do so in predetermined directions. A sensing element of a detector array may be conceptualized as including a diode or other electrical components. As shown in FIG. 16B, sensing element 1604 includes a diode 1614, a grounding switching element 1616, a grounding circuit 1617, an element-bus switching element 1618, and inter-element switching elements 1620 and 1622. Similarly, sensing element 1606 includes a diode 1624, a grounding switching element 1626, a grounding circuit 1627, an element-bus switching element 1628, and inter-element switching elements 1630 and 1632. For example, in sensing element 1604, diode 1614 may convert energy of incident charged particles into a measurable electrical signal (e.g., current). For example, diode 1614 may be a PIN diode, an avalanche diode, an electron multiplier tube (EMT), or the like. Grounding switching element 1616 may connect sensing element 1604 to grounding circuit 1617. A grounding circuit may be used to release charges from a sensing element that is not in use. In some situations, sensing elements that are not in use may still receive charged particles exiting a wafer, for example when a sensing element is disconnected to reduce cross talk, noise, or parasitic parameters. If a sensing element is used for charged particle beam detection, a grounding switch at the sensing-element-level-circuit of the sensing element (e.g., grounding switching element 1616) may be kept communicatively disconnected (e.g., open). If a sensing element is not in use, the grounding switch may be set as communicatively connected (e.g., closed). Element-bus switching element 1618 may communicatively couple diode 1614 to output bus 1608 for detection signal outputting. Inter-element switching elements 1620 and 1622 may communicatively couple sensing element 1604 to its adjacent sensing elements in horizontal (e.g., x-axis) and vertical (e.g., y-axis) directions, respectively. For example, when being communicatively connected (e.g., closed), inter-element switching element 1620 may communicatively couple sensing element 1604 to sensing element 1606. Similar components of sensing element 1606 may function in a similar way to corresponding components of sensing element 1604.

In some embodiments, the element-bus switching elements (e.g., element-bus switching element 1618) of sensing element 1604 may be independently controlled (e.g., by controller 904 in FIG. 9) for signal output. In certain situations, sensing elements may be in use or not in use. Sensing elements may be in or out of use regardless of whether they receive charged particles. Sensing elements may be selected to be in or out of use depending on certain criteria. The criteria may include, for example, whether a sensing element is in a group for beam detection. Whether a sensing element is in a group may be based on a secondary beam spot projection pattern on the detector surface (e.g., within a boundary of a secondary beam spot), or other requirements. Other such requirements may be based on, for example, collection rate of a beam spot, or cross talk between beams Sensing elements that are in use may generate a detection signal in response to receiving charged particles and may have their output coupled to output bus 1608 by way of a switch (e.g., element-bus switching element 1618). If multiple sensing elements (e.g., sensing elements 1604 and 1606) are in use, their respective element-bus switching elements may be controlled to connect their respective diodes to output bus 1608.

In some embodiments, multiple sensing elements may be respectively connected to output bus 1608 in a sequential order. For example, when both sensing elements 1604 and 1606 are in use, element-bus switching elements 1618 and 1628 may be connected and disconnected one by one. For example, when sensing element 1604 outputs its signal to output bus 1608, all other sensing elements (including sensing element 1606) in section 1602 may be communicatively disconnected from output bus 1608. When sensing element 1606 outputs its signal to output bus 1608, all other sensing elements (including sensing element 1604) in section 1602 may be communicatively disconnected from output bus 1608. In such a way, output bus 1608 may individually (e.g., sequentially) receive the detection signals from the sensing elements and individually (e.g., sequentially) output them to section circuit 1603 without causing significant interference therebetween. In some embodiments, multiple sensing elements may be connected to output bus 1608 in parallel. For example, when both sensing elements 1604 and 1606 are in use, element-bus switching elements 1618 and 1628 may be connected simultaneously.

A detector may have a plurality of operation modes. In a first mode, the detector may acquire a secondary beam spot projection pattern (e.g., an image of a beam spot on the detector surface). The first mode may be used for determining sensing element grouping. In a second mode, the detector may perform beam spot intensity detection. In the first mode, each of the sensing elements in the detector may be addressed one-by-one (e.g., sequentially) to achieve an electronic scan on the detector surface. However, in some embodiments, the first mode is not necessarily limited to only reading one sensing element on the detector surface at a time. For example, the detector may include a plurality of sections, and a sensing element from each section may be read simultaneously. In some embodiments, there may be one signal path associated with each section, and only one sensing element may be read at a time in a section, but read out may be conducted in parallel among different sections. Furthermore, in the first mode, read out of a beam spot projection pattern may include all of the sensing elements of the detector, or may include only a portion of the sensing elements that may be located in specific areas of interest. Detector array 1600 of FIG. 16A may be configured to operate in both first and second modes.

Figure 17A:
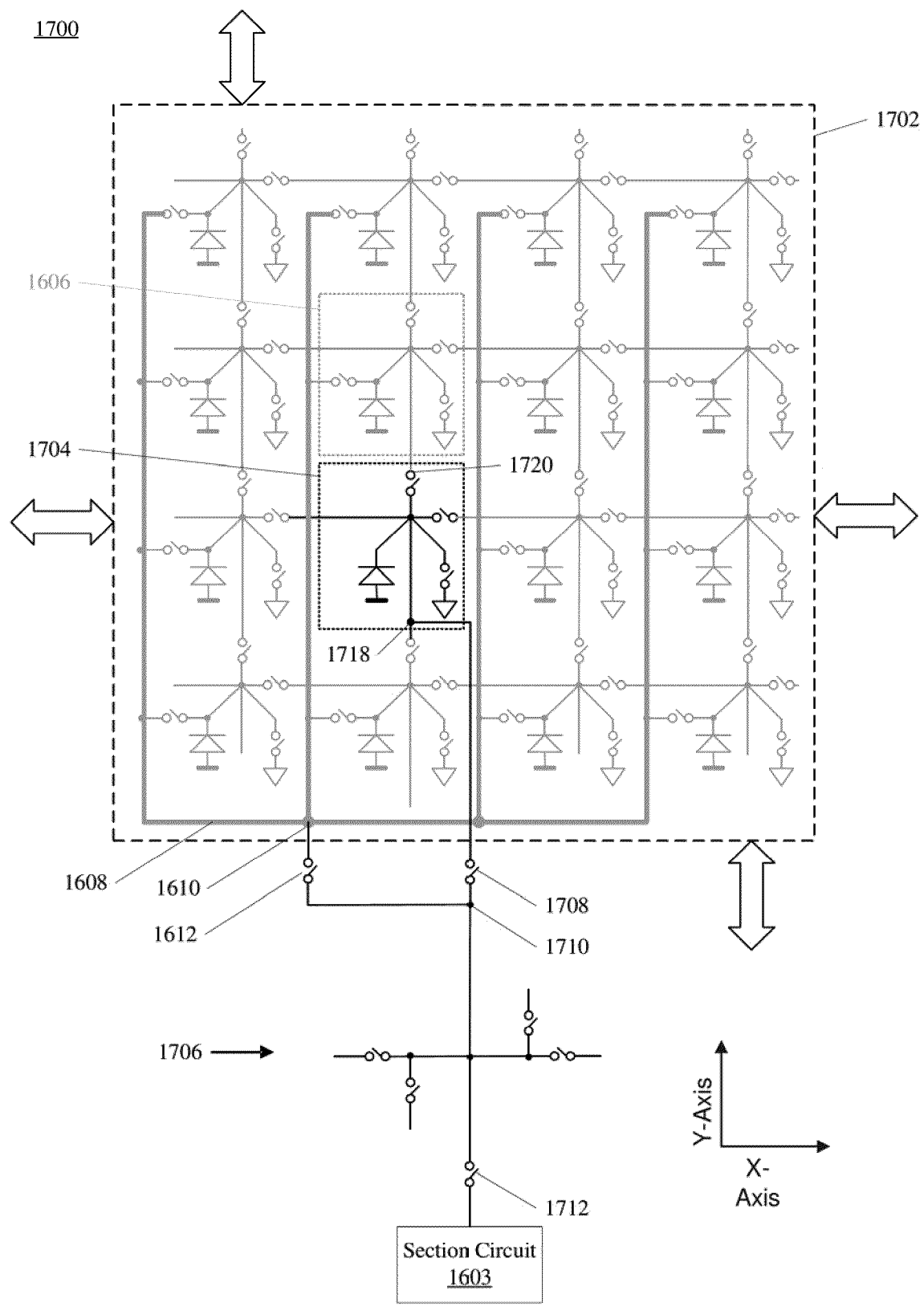
FIG. 17A is a diagram illustrating another exemplary switch network or switch matrix design for a detector array, consistent with embodiments of the present disclosure.
Figure 17B:
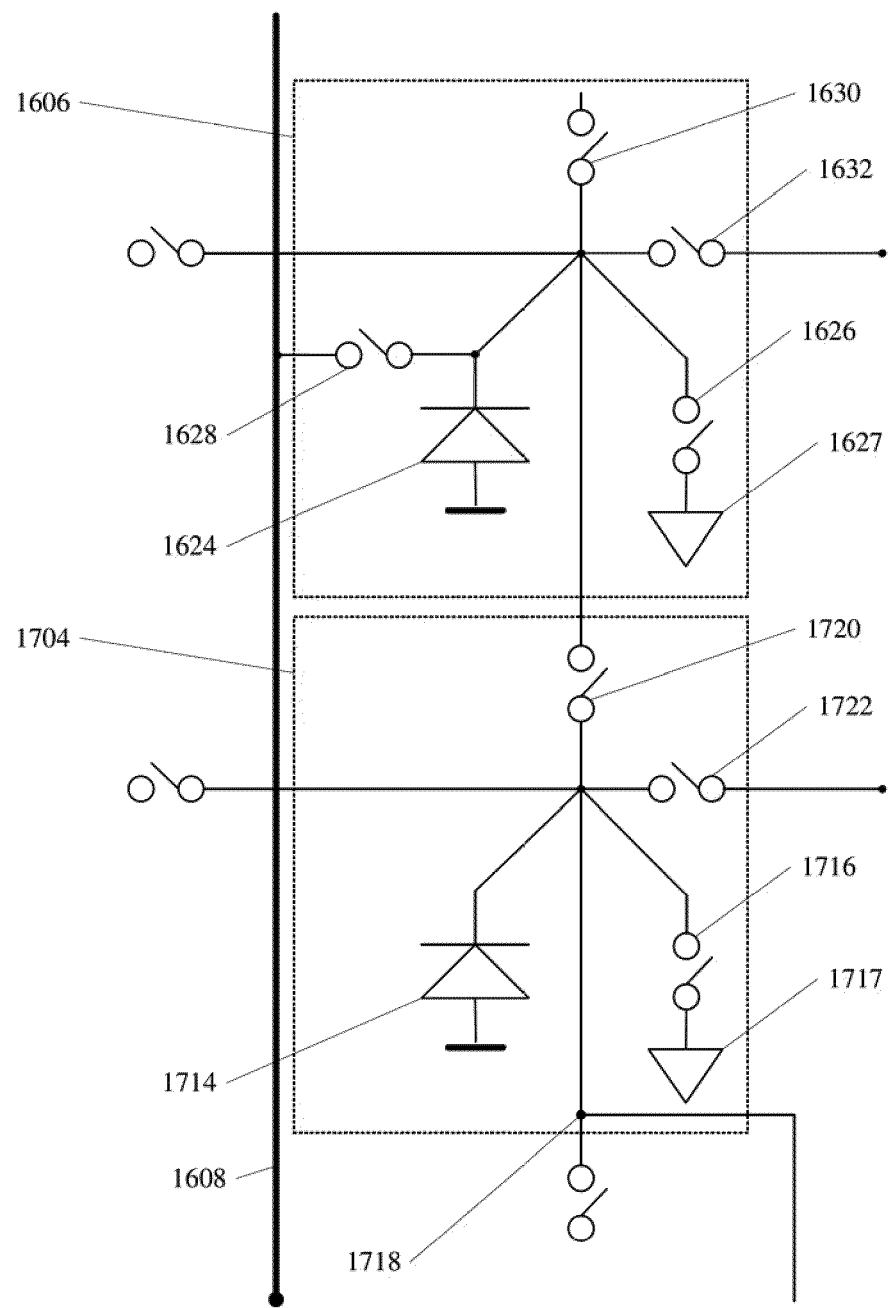
FIG. 17B is a diagram illustrating adjacent sensing elements of the detector array of FIG. 17A, consistent with embodiments of the present disclosure.

FIG. 17A is a diagram illustrating another exemplary switch design for a detector array 1700, consistent with embodiments of the present disclosure. Detector array 1700 may be a modification based on detector array 1600 of FIG. 16A. In FIG. 17A, detector array 1700 may include multiple sections, including a section 1702. Section 1702 may be similar to section 1602 of FIG. 16A but may include a sensing element 1704, and modified switching configurations. FIG. 17B is a diagram illustrating sensing elements 1704 and 1606 of section 1702 in FIG. 17A, consistent with embodiments of the present disclosure. In FIG. 17B, sensing element 1704 may have similar components as other sensing elements of section 1702. For example, similar to sensing element 1606, sensing element 1704 includes a diode 1714, a grounding switching element 1716, a grounding circuit 1717, and inter-element switching elements 1720 and 1722. However, sensing element 1704 does not include any element-bus switching element (unlike element-bus switching element 1628 in sensing element 1606). That is, sensing element 1704 is permanently disconnected from output bus 1608 and does not directly output detection signal to output bus 1608. Further, sensing element 1704 includes a common output 1718. Common output 1718 may function as a collective signal output for section 1702. Common output 1718 may be used to output signals from all or some of sensing elements in section 1702 or other sensing elements that may be grouped together with sensing elements in section 1702. For example, when section 1702 has multiple sensing elements in use (e.g., including sensing element 1606 and its adjacent sensing elements being in use), all inter-element switching elements (e.g., including inter-element switching element 1720) between those in-use sensing elements and sensing element 1704 may be communicatively connected such that all detection signals of those sensing elements may be routed to common output 1718 for signal output. Furthermore, for example, a group of sensing elements for detection of beam spot intensity may include sensing elements spanning across multiple sections. Sensing elements within a group may be connected (e.g., by way of inter-element switching elements) and the group may include a sensing element permanently disconnected from output bus 1608. For example, a group may include sensing elements from outside of section 1702 and may include sensing elements within section 1702, including sensing element 1704. In this case, common output 1718 may be used to output signal of the group. At common output 1718, all received signals may be added, combined, or merged before output. It should be noted that, sensing element 1704 may be arranged at any location of section 1702 (e.g., at any boundary location or any inner location), not limited to the location as shown in FIG. 17A. Additionally, a detector may be highly flexible such as to accommodate various arrangements of beam spot projection on the detector. For example, there may be a high probability that in each section that is used for beam spot intensity detection, only a portion of sensing elements in that section are included in a group. Or, a first set of sensing elements from a section may be included in a first group (e.g., associated with a first beam spot), and a second set of sensing elements from the section are included in a second group (e.g., associated with a different beam spot), etc.

Referring back to FIG. 17A, common output 1718 may be communicatively coupled to a junction 1710 via a switching element 1708. Bus output 1610 may be communicatively coupled to junction 1710 via switching element 1612. In some embodiments, junction 1710 may be arranged in a sensor layer (e.g., sensor layer 301 in FIG. 3A) that includes the sensing elements of section 1702.

Detector array 1700 may further include a switch network 1706 communicatively coupled to the sections, including section 1702. In FIG. 17A, switch network 1706 may be coupled to section 1702 via junction 1710 and may be coupled to a section signal path or read out circuit (e.g., section circuit 1603) via switching element 1712. Switch network 1706 may include multiple inter-section switching elements that may communicatively couple signal outputs of multiple sections. For example, switch network 1706 may include inter-section switching elements that couple junction 1710 (and section circuit 1603) to junctions of other sections (not shown in FIG. 17A or 17B).

In some embodiments, by controlling the opening and closing of switching elements 1612 and 1708, section 1702 may be set to operate in different modes. For example, when section 1702 is set to operate in a first mode, switching element 1612 may be closed, and switching element 1708 may be open. In such a case, bus output 1610 may be communicatively coupled to junction 1710, and common output 1718 may be communicatively decoupled from junction 1710, such that detection signals of sensing elements of section 1702 (except for sensing element 1704) may only be routed to junction 1710 via bus output 1610. The output signals may be further routed from junction 1710 to section circuit 1603 for signal processing via switching element 1712. In the first mode, detection signals of section 1702 may be controlled to be output to junction 1710 in a way similar to the signal output process of the first mode as described above for section 1602 in FIG. 16A, which will not be repeated here. In other words, in the first mode, section 1702 may operate in a similar way as the first mode of section 1602 (e.g., for reading out all of the sensing elements of the section to acquire a secondary beam spot projection pattern). The detection signals of sensing element 1704 of section 1702 may be routed to junction 1710 via common output 1718 and switching element 1708 when switching element 1612 is communicatively decoupled from junction 1710. Routing of signals from sensing element 1704 may be achieved by communicatively connecting switching element 1708. Thus, all sensing elements, including sensing element 1704 may be addressed in the first mode.

When operating in the first mode, signals of sensing elements may be output in series, and detector array 1700 may detect a beam-spot profile (e.g., size, shape, boundary, or the like) of an incident charged-particle beam. The detected beam-spot profile may be used for determining a grouping of sensing elements, or other purposes. For example, sensing elements within a boundary of a beam spot may be determined to be within the same group. Grouping of sensing elements may be useful in other processing steps, such as a second mode, where switching elements between adjacent sensing elements in the group may be closed so that outputs of the sensing elements may be read out together to determine beam spot intensity. In some embodiments, the first mode may be a precursor to the second mode. However, there may be various uses for information gathered from operation in the first mode. For example, the first mode may be used to detect and monitor the performance of a SEM system by acquiring secondary beam spot projection patterns.

In another example, when section 1702 is set to operate in the second mode, switching element 1612 may be open, and switching element 1708 may be closed. In such a case, common output 1718 may be communicatively coupled to junction 1710, and bus output 1610 may be communicatively decoupled from junction 1710, such that detection signals of sensing elements may only be routed to junction 1710 via common output 1718. The output signals may be further routed from junction 1710 to section circuit 1603 for signal processing via switching element 1712.

Figure 17C:
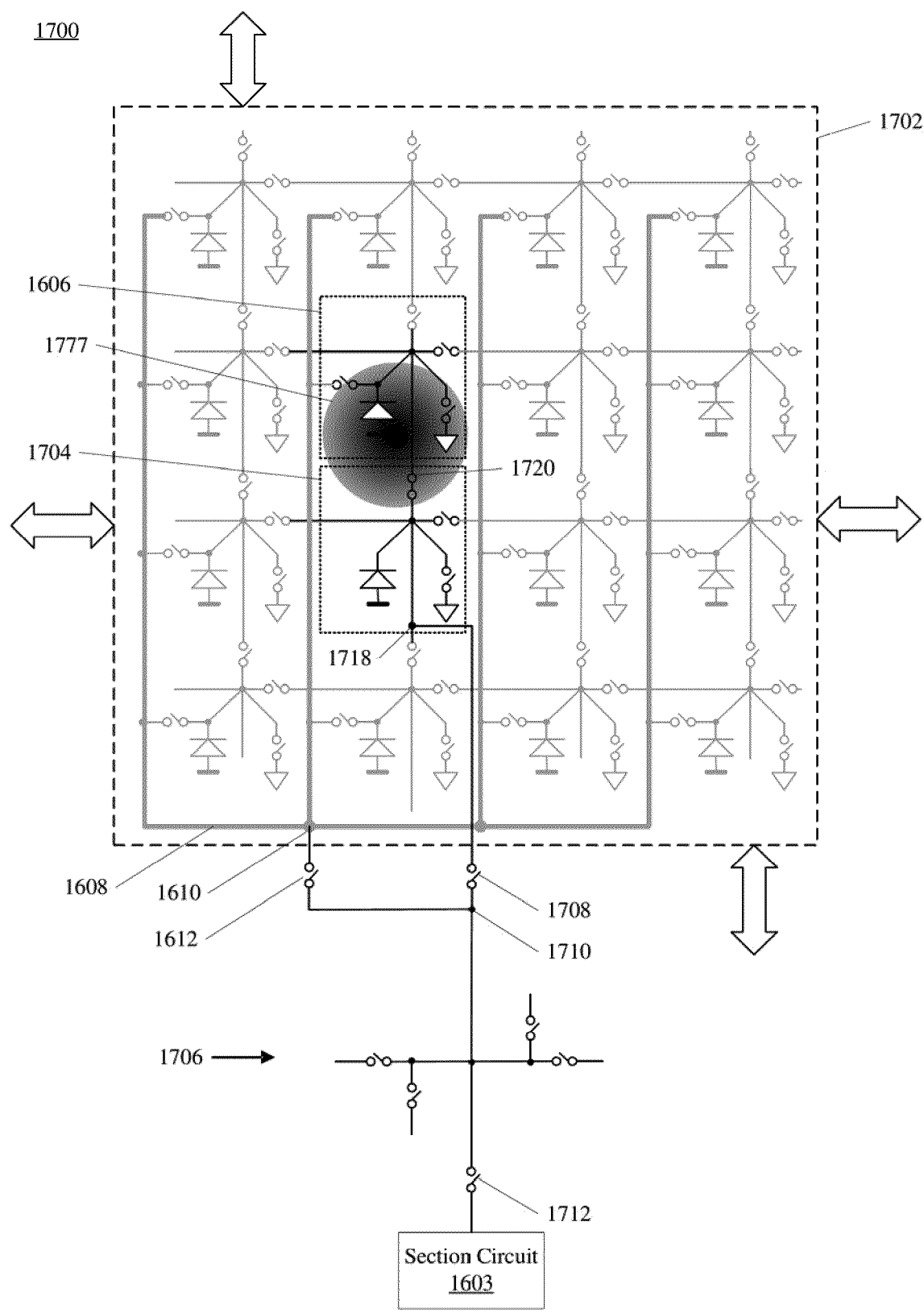
FIG. 17C is a diagram illustrating a beam spot on adjacent sensing elements of the detector array of FIG. 17A, consistent with embodiments of the present disclosure.

When operating in the second mode, inter-element switching elements between any sensing element within a group associated with a particular beam spot may be closed, such that all detection signals generated by in-use sensing elements in a group may be routed to a common output. For example, as shown in FIG. 17C, a beam of secondary charged particles may be incident on detector array 1700 such that secondary beam spot 1777 covers sensing elements 1606 and 1704. It may be determined (for example, in the first mode) that sensing elements 1606 and 1704 are within a boundary of secondary beam spot 1777, and sensing elements 1606 and 1704 may be in use in the second mode. When sensing elements 1606 and 1704 are grouped together, inter-element switching element 1720 may be closed to route the detection signal of sensing element 1606 to common output 1718. In another example, in the event of a relatively larger beam spot that may cover other sensing elements in addition to sensing elements 1606 and 1704, the inter-element switching element between those sensing elements and sensing elements 1606 and 1704 may also be closed. It is noted that when sensing element 1704 is in use, inter-element switching elements between it and other sensing elements may need to be closed for their signals to be added and routed through common output 1718. At common output 1718, all incoming detection signals may be output to junction 1710 through switching element 1708 as a common signal. The common signal may be a combination (e.g., with amplitudes added) of the incoming detection signals.

In some embodiments, when operating in the second mode, different common signals generated by different sections of detector array 1700 may be combined to be output to a single section circuit. This may occur when a beam spot formed on detector array 1700 covers sensing elements of multiple different sections, and thus a group of sensing elements may span the multiple different sections. Thus, multiple sections may be involved in detection of a single beam spot that covers a group of sensing elements. To improve performance (e.g., analog bandwidth), the common output of the multiple sections involved in detecting the beam spot may be used to route signals from the group. Outputs of the sensing elements of the group may be routed through the common outputs or junctions of respective sections. The outputs may be joined via an inter-section switch network, and may be routed to one section circuit. For example, section 1702 may output a first common signal to switch network 1706 through junction 1710. A second section (not shown in FIG. 17A or 17B) of detector array 1700 may also output a second common signal to switch network 1706 through a second junction (not shown in FIG. 17A). Similar to junction 1710, the second junction may be communicatively coupled to a second section circuit (not shown in FIG. 17A or 17B) via a second switching element. By closing one or more inter-section switching elements in switch network 1706 between junction 1710 and the second junction, the first common signal and the second common signal may be able to be combined (e.g., with amplitudes added) and output as a combined signal. For example, the combined signal may be generated by adding one or more common signals. If switching element 1712 is closed and the second switching element (between the second junction and the second section circuit) is open, the combined signal may be output to section circuit 1603. If switching element 1712 is open and the second switching element is closed, the combined signal may be output to the second section circuit. By adding switch network 1706, analog signal bandwidth may be increased.

When operating in the second mode, grouped sensing elements of detector array 1700 may be output in parallel. When a size of a beam spot of a charged-particle beam is large, the beam spot may cover multiple adjacent sensing elements. The multiple sensing elements of a group may be distributed in a single section (e.g., section 1702) or multiple adjacent sections (e.g., including section 1702 and other sections) of detector array 1700. The detection signals may be combined as a common signal (e.g., when the sensing elements are distributed in a single section) or a combined signal merged from multiple common signals (e.g., when the sensing elements are distributed in multiple sections). The common signal or the combined signal may be output to a single section circuit (e.g., section circuit 1603). By operating in the second mode, detector array 1700 may quickly output detection signals from a large number of sensing elements. As a result, beam spot intensity determination may be made with wide analog signal bandwidth.

In some embodiments, the first and second modes, as discussed above, may correspond with certain steps of method 1500 of FIG. 15. For example, the first mode may include steps 1502 and 1504. The second mode may include steps 1506 to 1532 shown in FIG. 15. The first mode may correspond to a beam spot boundary detection mode or beam projection imaging mode, and the second mode may correspond to a beam spot intensity detection mode.

It can be seen from the description of FIGS. 17A-17C that switch network 1706 may improve analog signal bandwidth and pixel rate for detector array 1700. For example, the pixel rate of detector array 1700 may be millions, billions, or even trillions of pixels per second. Further, by using switch network 1706, sensing elements covered by the same charged-particle beam and distributed in multiple sections may be flexibly configured to detect the charged-particle beam, no matter where the charged-particle beam impinges.

In some embodiments, the more sensing elements that are involved in detecting charged-particle beams, the more parasitic parameters may occur in signal processing circuits (e.g., section circuit 1603). By using switching elements 1612, 1708, and 1712, parasitic parameters (e.g., parasitic resistance or parasitic capacitance) seen by the input section of a section circuit may also be reduced. For example, when section 1702 operates in the first mode, the inter-element switching elements (e.g., including inter-element switching elements 1720 and 1722) may be open while a detection signal is output from bus output 1610 to section circuit 1603. When detector array 1700 operates in the second mode, the element-bus switching elements (e.g., element-bus switching element 1628 in FIG. 17B) may be open while a common signal is output from common output 1718 to section circuit 1603. By opening switching element 1612 in the second mode, parasitic capacitance seen by section circuit 1603 may be reduced. Signals may be routed from common output 1718 to section circuit 1603. By adding switch network 1706, common outputs from sections having sensing elements that are in the same group may be connected, and parasitic resistance in the signal path to the input of the section circuit may be reduced. Further, by opening some switches in switch network 1706, sections that that are not in use (e.g., outputting no detection signal, or being disconnected for some other reason) may be communicatively disconnected from signal processing circuits (e.g., including section circuit 1603), which may reduce parasitic capacitance seen by the signal processing circuit.

In some embodiments, further improvements to detectors, such as detector array 1700, may be possible. For example, section 1702 may use a large number of switches, which may incur excessive parasitic parameters (e.g., equivalent series resistance or parasitic capacitance) seen by the signal processing circuit. Moreover, the inter-element switches (e.g., inter-element switching elements 1720 and 1722) are arranged only in the x-axis and y-axis directions of section 1702. As a result, when a signal travels from one of diagonally adjacent sensing elements to another, it passes two inter-element switching elements, which may incur more parasitic parameters (e.g., equivalent series resistance) than in the case where a signal travels from one of horizontally or vertically adjacent sensing elements to another.

Figure 18A:
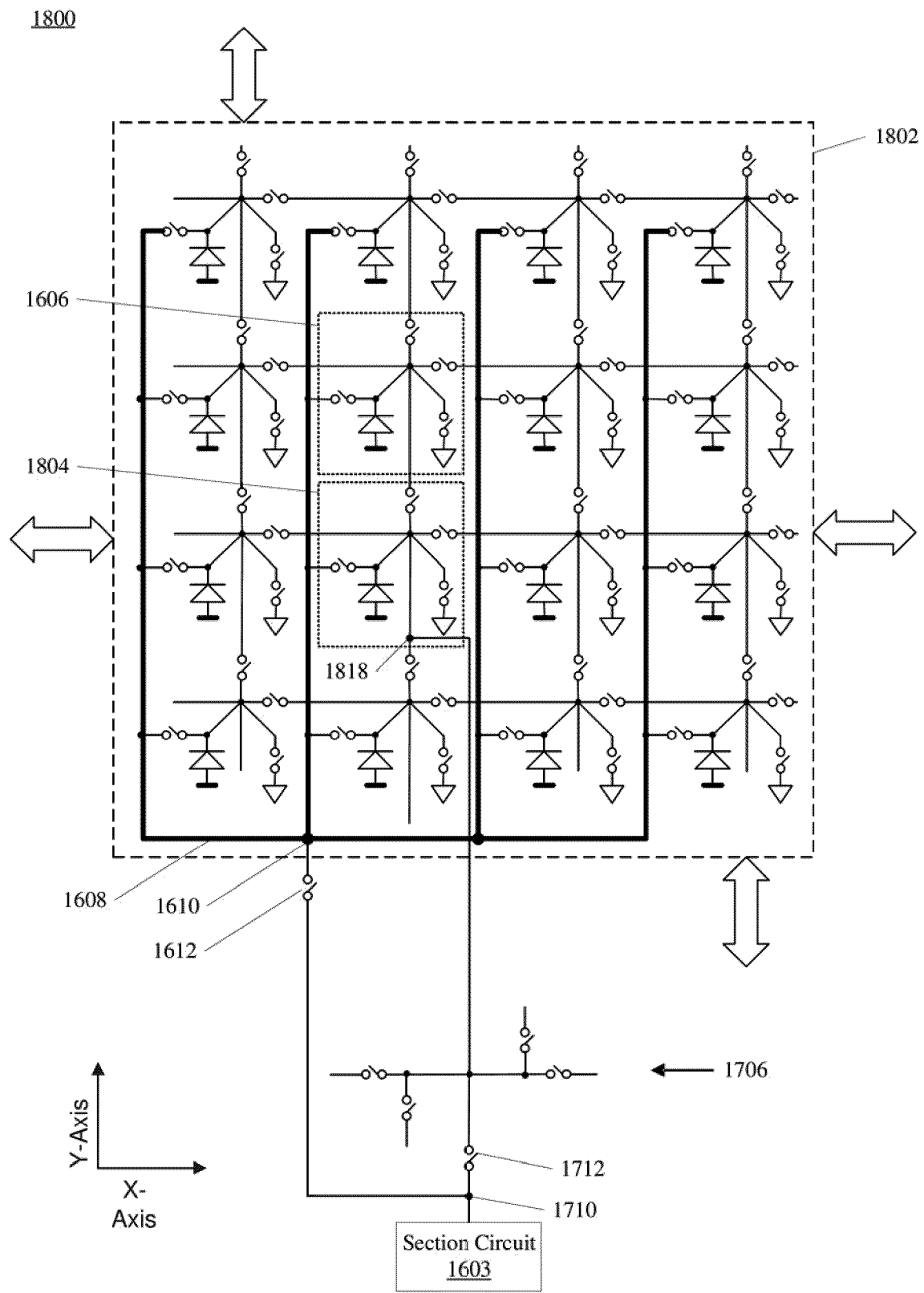
FIG. 18A is a diagram illustrating an exemplary enhanced switch network or switch matrix design for a detector array, consistent with embodiments of the present disclosure.
Figure 18B:
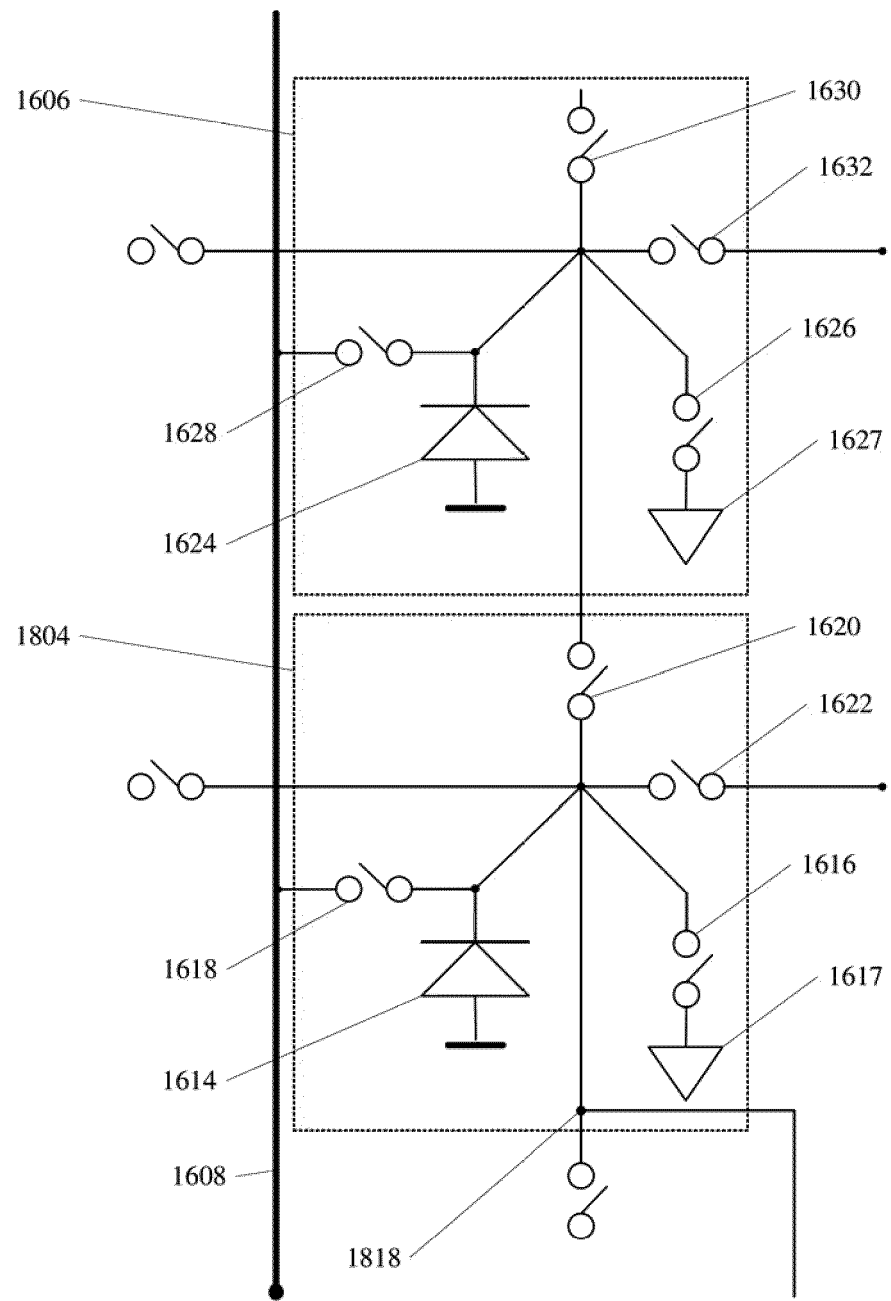
FIG. 18B is a diagram illustrating adjacent sensing elements of the detector array of FIG. 18A, consistent with embodiments of the present disclosure.

In some embodiments of the disclosure, there is provided a design of a detector array that may achieve higher analog signal bandwidth, higher pixel rate, and higher configuration flexibility. FIG. 18A is a diagram illustrating an exemplary enhanced switch design for a detector array 1800, consistent with embodiments of the present disclosure. Detector array 1800 may be a modification based on detector array 1600 of FIG. 16A or detector array 1700 of FIG. 17A. In FIG. 18A, detector array 1800 may include multiple sections, including a section 1802. Section 1802 may be similar to section 1602 of FIG. 16A but may include a sensing element 1804, and modified switching configurations. FIG. 18B is a diagram illustrating sensing elements 1804 and 1606 of section 1802 of detector array 1800, consistent with embodiments of the present disclosure. In FIG. 18B, sensing element 1804 may have similar components and a similar electronic connection scheme as other sensing elements (e.g., sensing element 1606) of section 1802. For example, similar to sensing element 1606 (or sensing element 1604 in FIG. 16B), sensing element 1804 includes diode 1614, grounding switching element 1616, grounding circuit 1617, element-bus switching element 1618, and inter-element switching elements 1620 and 1622. Further, sensing element 1804 includes a common output 1818. Common output 1818 may function similarly to common output 1718 in FIG. 17B. Different from sensing element 1704, sensing element 1804 includes element-bus switching element 1618 that may communicatively couple diode 1614 to output bus 1608. That is, sensing element 1804 can directly output its detection signal to output bus 1608 (e.g., when detector array 1800 operates in the first mode, similar to that described above with respect to FIGS. 17A-17C). By using element-bus switching element 1618 in sensing element 1804, all sensing elements of section 1802 may have a uniform configuration. Simplification of fabrication of a detector array may be achieved by providing a uniform arrangement of sensing elements.

Compared with section 1702 in FIG. 17A, section 1802 may still include output bus 1608 and bus output 1610. Compared with detector array 1700 in FIG. 17A, section 1802 may include switching element 1620, switch network 1706, junction 1710, and switching element 1712. However, switching element 1708 of detector array 1700 between common output 1718 and switch network 1706 is not included in detector array 1800. Thus, the number of switching elements between common output 1818 and section circuit 1603 in detector array 1800 is smaller than the number of switching elements between common output 1718 and section circuit 1603 in detector array 1700. By reducing the number of switching elements between common output 1818 and section circuit 1603, parasitic parameters (e.g., equivalent series resistance) incurred in section circuit 1603 may be reduced. In some cases, the parasitic parameters incurred in signal processing circuits of detector array 1800 may be reduced by 50% compared with detector array 1700. Such a design may improve analog signal bandwidth of detector array 1800.

Further, compared with detector array 1700 in FIG. 17A, junction 1710 in detector array 1800 is arranged to be downstream from switch network 1706. That is, in FIG. 18A, switch network 1706 is arranged between common output 1818 and switching element 1712. Meanwhile, a signal output may be output by bus output 1610 directly to section circuit 1603 only via switching element 1612. That is, the signal need not pass through switch network 1706 as may be the case in FIG. 17A. Also, switching element 1612 can still control the outputting of signals from bus output 1610 and section circuit 1603, and switching element 1712 can still control the outputting of a common signal from common output 1818 to section circuit 1603. Further, similar to detector array 1700, when detector array 1800 operates in the second mode, switching element 1712 can still control the outputting of a combined signal merged from multiple common signals from switch network 1706 to section circuit 1603. For detector array 1800, when switching element 1612 is closed and switching element 1712 is open, detector array 1800 may operate in the first mode. When switching element 1612 is open and switching element 1712 is closed, detector array 1800 may operate in the second mode. By such a design, configuration flexibility of detector array 1800 may be maintained.

In some embodiments, common output 1818 may be included (e.g., integrated) in sensing element 1804. In some embodiments, common output 1818 may be a signal pickup point arranged within sensing element 1804) of section 1802. Common output 1818 may include a wiring that is connected to sensing element 1804.

In some embodiments, output bus 1608 may be arranged between the sensing elements of detector array 1800. For example, output bus 1608 may include wirings not integrated in individual sensing elements of section 1802.

In some embodiments, section circuit 1603 of detector array 1800 may be included in a section layer (e.g., section layer 302 in FIG. 3A). In some embodiments, the section layer may further include at least one of junction 1710, switch network 1706, switching element 1612, or switching element 1712.

Figure 19A:
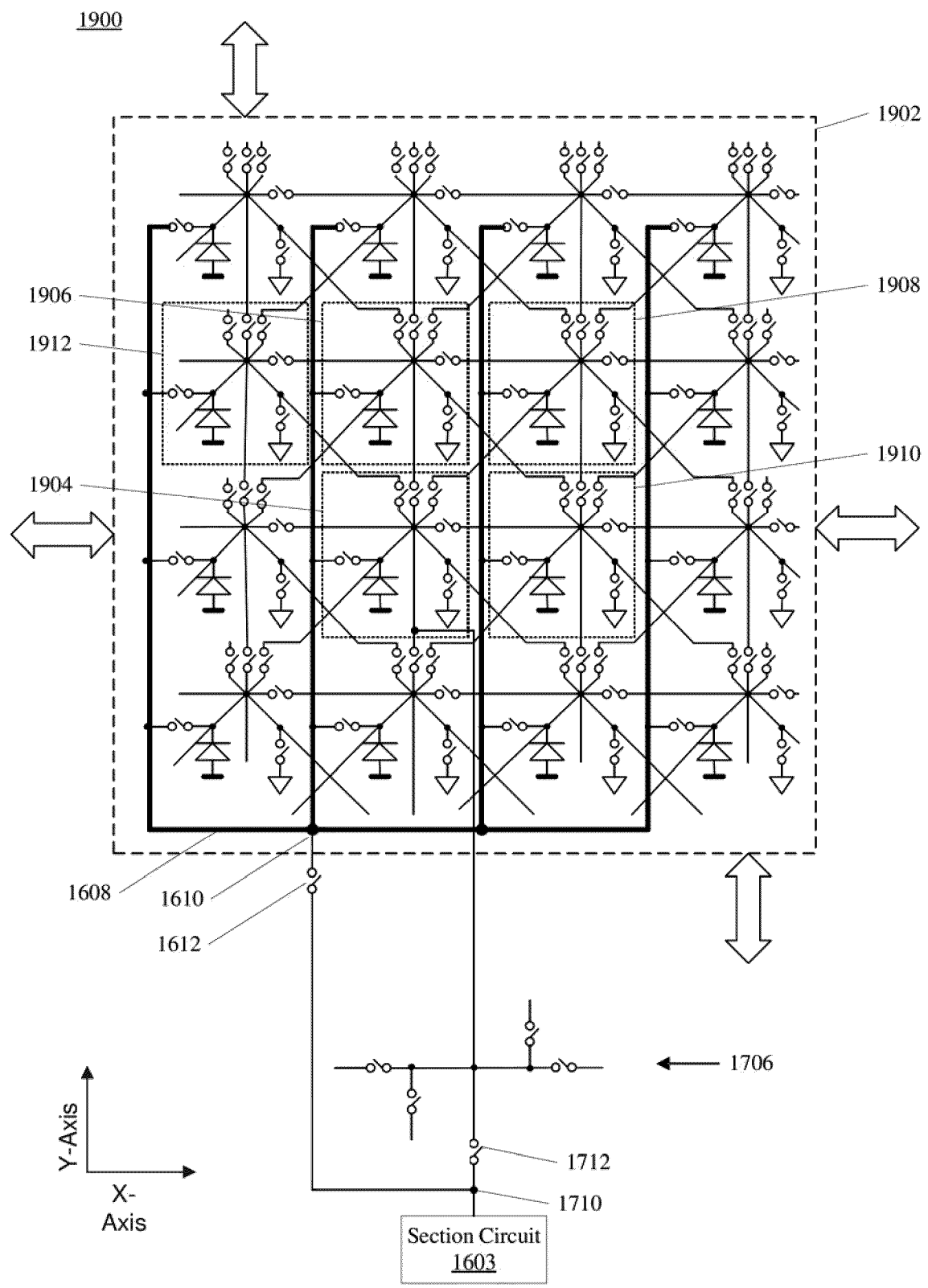
FIG. 19A is a diagram illustrating another exemplary enhanced switch network or switch matrix design for a detector array, consistent with embodiments of the present disclosure.

In some embodiments, diagonal inter-element switching elements may be arranged between diagonally adjacent sensing elements in detector array 1800 for reducing parasitic parameters (e.g., equivalent series resistance) incurred when a detection signal travels from one of two diagonally adjacent sensing elements to another. FIG. 19A is a diagram illustrating another exemplary enhanced switch design for a detector array 1900, consistent with embodiments of the present disclosure. Detector array 1900 may be a modification based on detector array 1800 of FIG. 18A. In FIG. 19A, detector array 1900 may include multiple sections, including section 1902. Section 1902 includes multiple sensing elements, including sensing elements 1904, 1906, 1908, 1910, and 1912. In FIG. 19A, the sensing elements of section 1902 are arranged as a matrix. The sensing elements of section 1902 may have similar components as the sensing elements of section 1802 of FIG. 18A. However, the sensing elements of section 1902 may have a different electric connection scheme from the sensing elements of section 1802.

Figure 19B:
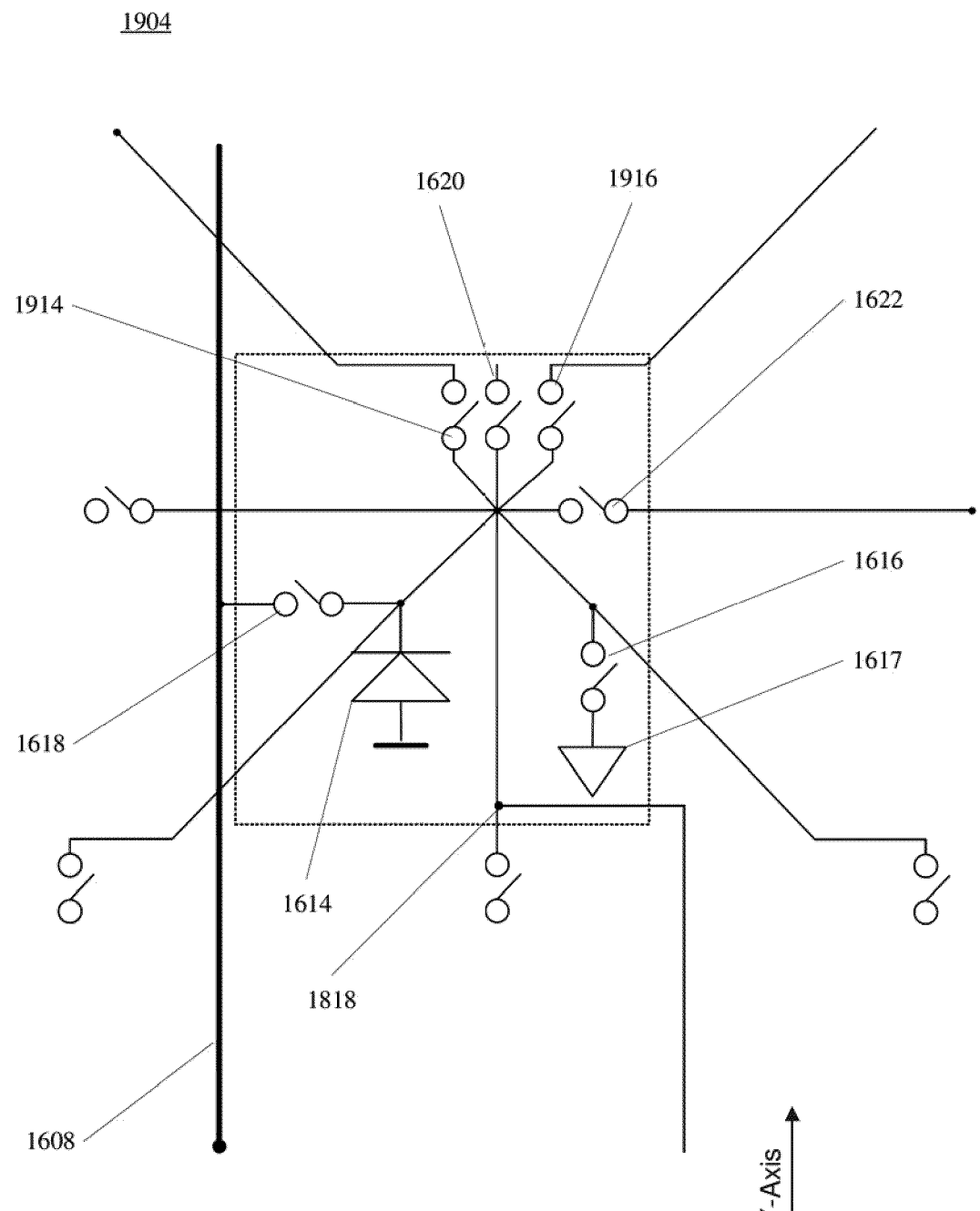
FIG. 19B is a diagram illustrating a sensing element in the detector array of FIG. 19A, consistent with embodiments of the present disclosure.

Compared with section 1802, each sensing element of section 1902 may include two additional inter-element switching elements in diagonal directions. The diagonal directions may be between the x-axis and y-axis directions (e.g., inclined at an angle of 45 degrees thereto). FIG. 19B is a diagram illustrating sensing element 1904 of section 1902 of detector array 1900, consistent with embodiments of the present disclosure. In FIG. 19B, similar to sensing element 1804 of FIG. 18B, sensing element 1904 includes diode 1614, grounding switching element 1616, grounding circuit 1617, element-bus switching element 1618, and inter-element switching elements 1620 and 1622. As shown in FIG. 19B, inter-element switching elements 1620 and 1622 of sensing element 1904 may communicatively couple sensing element 1904 to an adjacent sensing element in the y-axis direction and x-axis direction, respectively. As shown in FIG. 19B, sensing element 1904 may further include inter-element switching elements 1914 and 1916. As shown in FIG. 19A & FIG. 19B, inter-element switching elements 1914 and 1916 may communicatively couple sensing element 1904 to adjacent sensing elements 1912 and 1908 in a first diagonal direction (e.g., top-left to bottom-right) and a second diagonal direction (e.g., top-right to bottom-left), respectively.

All sensing elements of section 1902 may have a similar connection scheme as sensing element 1904. In other words, each sensing element of section 1902 may include four inter-element switching elements to communicatively couple the sensing element to its eight adjacent sensing elements in the matrix, and there may be only one single inter-element switching element between any two sensing elements. Compared with section 1802 of FIG. 18A, when detection signals of sensing elements 1908 and 1912 are to travel to sensing element 1904 (e.g., when sensing elements 1908 and 1912 are grouped together and being used in the second mode), additional connections may be formed, and there may be additional paths to connect sensing element 1904 to adjacent sensing elements. Signals may be able to travel in a diagonal direction, and overall resistance and inductance may be reduced. Between sensing elements 1912 and sensing element 1904, for example, signals may travel not only through switching element 1914, but also through other switching elements connecting a route between sensing element 1904 and an output path (e.g., signals may also travel between sensing element 1912 and sensing element 1904 through switching element 1620 via sensing element 1906). By such a connection scheme, the parasitic parameters incurred in section circuit 1603 of detector array 1900 may be reduced (such as resistance and inductance), and the analog signal bandwidth and pixel rate of detector array 1900 may be further increased. Additionally, adding diagonal switches may increase configuration flexibility of detector array 1900. In comparative examples, to connect two sensing elements diagonally adjacent from each other, it may be necessary to use at least one additional sensing element adjacent to both. Diagonal switches may eliminate such a requirement.

Although a uniform matrix arrangement of sensing elements has been shown and described, it will be understood that various geometries may also be used. For example, sensing elements may be arranged in an offset pattern, such as a tile layout. Furthermore, sensing elements themselves may have various shapes and sizes.

Figure 20:
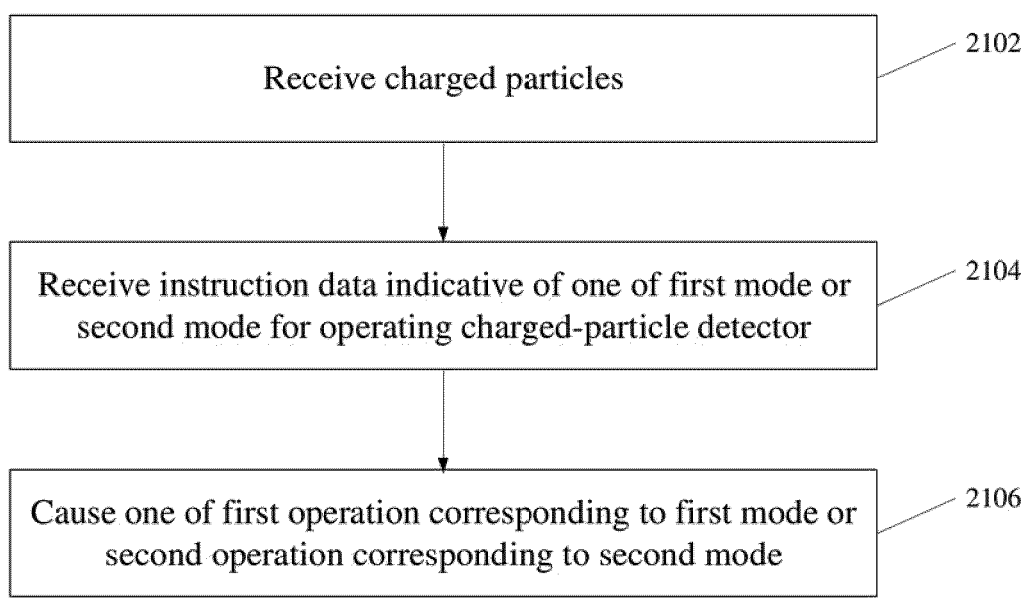
FIG. 20 is a flowchart of an exemplary method of generating a charged-particle detection signal, consistent with embodiments of the present disclosure.

FIG. 20 is a flowchart of an exemplary method 2100 of detecting a charged-particle beam, consistent with embodiments of the present disclosure. Method 2100 may be performed by a controller of the charged-particle inspection system (e.g., controller 109 of EBI system 100 in FIG. 1 or controller 904 in FIG. 9). The controller may include circuitry (e.g., a memory and a processor) programmed to implement method 2100. For example, the controller may be an internal controller or an external controller (e.g., controller 109 in FIG. 1 or controller 904 in FIG. 9) coupled with the charged-particle inspection system. Method 2100 may correspond with the components, operations, and steps shown and described with relation to FIGS. 3A-19.

Referring to FIG. 20, in some embodiments, method 2100 may be performed by a detector array (e.g., detector array 1800 or 1900). At step 2102, the detector array receives charged particles exiting a wafer (e.g., any of secondary charged-particle beams 236, 238, and 240 in FIG. 2). The charged particles may arrive at a first section (e.g., section 1802 or 1902 in FIGS. 8-9) of sensing elements and a second section of sensing elements of the detector array. The first section and the second section may be adjacent sections. For example, the first and second sections may be sections 321 and 322 in FIG. 14.

At step 2104, the detector array receives instruction data indicative of one of a first mode or a second mode for operating the charged-particle detector. The first mode may be a "beam spot boundary detection mode," while the second mode may be a "beam spot intensity detection mode," both of which may be applied with detector arrays such as those shown in FIGS. 16-19. In some embodiments, a controller of the detector array may receive the instruction data.

At step 2106, based on the instruction data, the detector array may perform one of a first operation corresponding to the first mode or a second operation corresponding to the second mode. The first operation may include determining a boundary of a charged particle beam spot projected on the surface of the detector array. The first operation may include reading detection signals output by sensing elements of the first section (e.g., section 1802) via bus output 1610. Such detection signals may be read out sequentially. The first operation may include steps 1502 and 1504 discussed above with reference to FIG. 15. The second operation may include outputting signals from at least one of the first section or the second section in the beam spot intensity detection mode. For example, a combined signal may be a signal merged by one or more common signals as described with reference to FIGS. 17-19 and output by a junction (e.g., junction 1710 in FIG. 18A) in the beam spot intensity detection mode. The second operation may include steps 1506 to 1532 discussed above with reference to FIG. 15.

In some embodiments, if the instruction data is indicative of the beam spot boundary detection mode, the detector array may determine whether the first section (e.g., section 1802 in FIG. 18A) includes a group of sensing elements. In some embodiments, the detector array may determine whether a group of sensing elements spans multiple sections. In some embodiments, grouped sensing elements may be adjacent sensing elements. For example, the first section may include a first sensing element (e.g., sensing element 1804 in FIG. 18B) that is grouped with a second sensing element (e.g., sensing element 1606 in FIG. 18B). If it is determined that the first section includes the first sensing element and one of the first section or the second section includes the second sensing element, the detector array may determine the combined signal by adding a first signal output by the first sensing element to a second signal output by the second sensing element. Then, the detector array may output the combined signal.

In some situations, a beam incident on a detector array may form a beam spot that is contained within one section. The first section may include both the first and the second sensing element. For example, it may be the case that a secondary charged-particle beam impinges on multiple adjacent sensing elements (e.g., sensing elements 1804 and 1606 in FIG. 18B) of the first section (e.g., section 1802 in FIG. 18A). In those cases, the detector array may form a combined signal by adding the first signal to the second signal. For example, the detector array may include a common output (e.g., common output 1818 in FIG. 18B) communicatively coupled to the first sensing element (e.g., sensing element 1804 in FIG. 18A). The detector array may receive the first signal and the second signal and form the combined signal by adding the first signal to the second signal. In some embodiments, when grouping the first sensing element and the second sensing element, the detector array may communicatively connect an inter-element switching element (e.g., inter-element switching element 1620 in FIG. 18B) between the first sensing element (e.g., sensing element 1804 in FIG. 18B) and the second sensing element (e.g., sensing element 1606 in FIG. 18B), and receive the combined signal at the common output. In some embodiments, the detector array may receive the combined signal at the common output of the first section.

In some embodiments, the detector array may receive the combined signal at the common output of another section. If, for example, the secondary charged-particle beam impinges on sensing elements of the first section and sensing elements of the second section, one of which is connected to the common output of the second section, the detector array may receive the combined signal of the group of sensing elements at the common output of the second section. The combined signal may be output by the second section. In another example, if the secondary charged-particle beam impinges only on the first section and no other sensing elements outside the first section, the group of sensing elements associated with the beam spot may consist only of sensing elements from the first section. In such a case, the combined signal may be output by the first section.

In some situations, a beam incident on the detector may form a beam spot that covers mostly sensing elements of one section while also covering at least some sensing elements of another section. The sensing elements of other sections may be connected to sensing elements of the one section by inter-element switching elements. Signals from the sensing elements of other sections may be routed to the common output that is provided in the one section.

Even when a beam spot is large, a detector array may be configured to accommodate the large beam spot and may achieve prescribed bandwidth requirements. For example, the detector array may be configured with a number and arrangement of sensing elements in individual sections such that even when the beam spot is large, the number of sensing elements grouped together to be associated with the beam spot is not too large to overwhelm analog signal pathways. Using a switch network may also help to improve analog bandwidth by allowing multiple common outputs (of different sections) to be connected. For example, in a case where bandwidth requirements may no longer be able to be met due to the large size of a beam spot, and the beam spot covers a large number of sensing elements that belong to several different sections, and sensing elements in those sections that are connected to the respective common outputs of the sections are also covered, then a switch network (e.g., switch network 1706) may be used to connect the common outputs in order to add an additional layer of connections to the sensing element network of the group to improve analog bandwidth. Under some conditions, for example in which the beam spot is large so as to at least partially cover multiple sections, and sensing elements directly connected to the common outputs in the partially covered sections are not covered by the beam spot (but may be very close to those that are covered), then such sensing elements may be connected to the group to improve analog bandwidth if needed. Some preconditions for connecting these sensing elements to the group may include, for example, that the sensing elements directly connected to the common outputs are not used by another group, and connecting them to the group will not cause issues (e.g., worsen cross talk).

By connecting sensing elements via inter-element switching elements, the signals from the sensing elements may be combined where the sensing elements are connected. That is, the outputs of connected sensing elements may be merged and may be routed together to downstream portions of the detector array (e.g., common outputs 1718, 1818, or junction 1710).

Figure 18C:
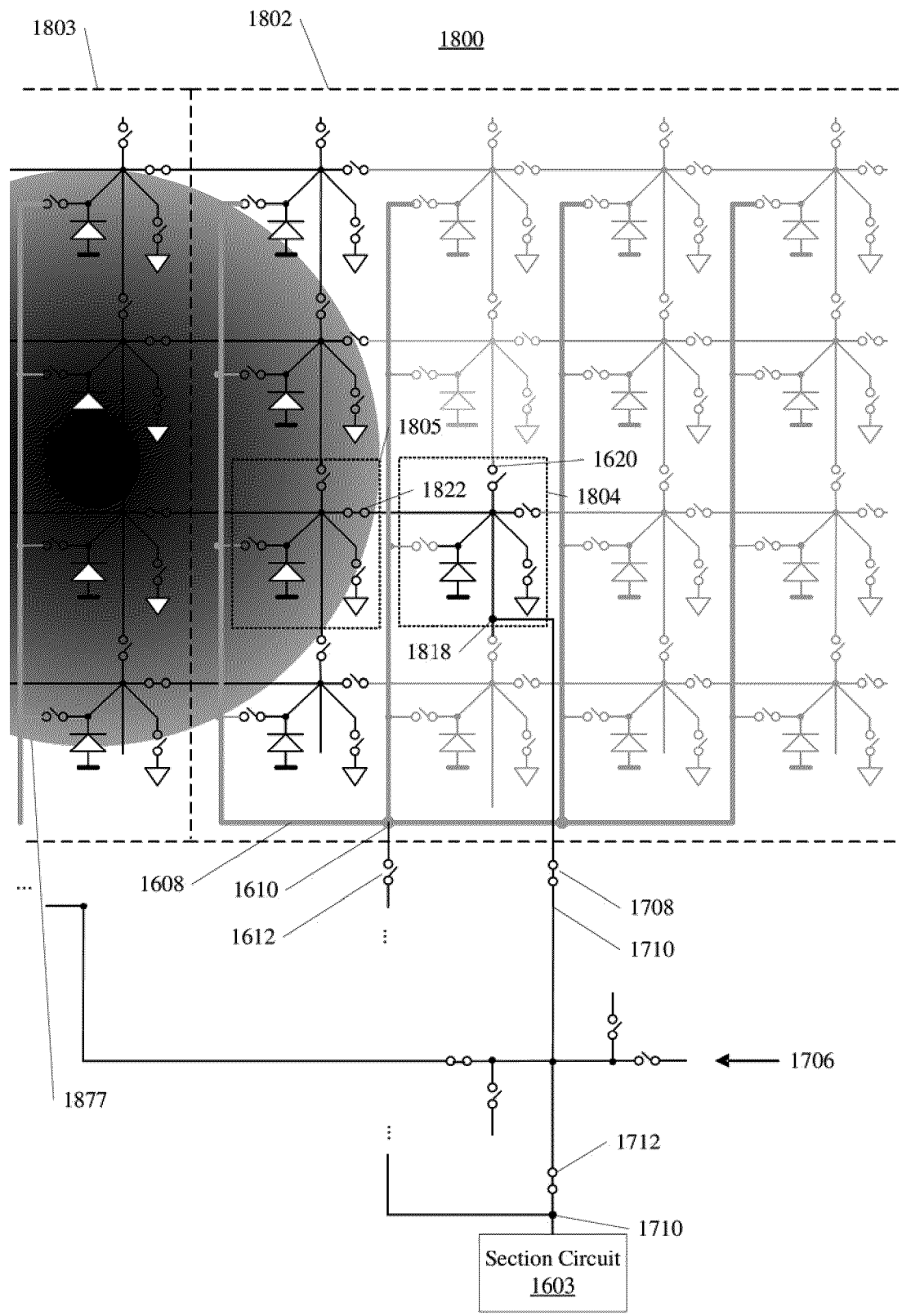
FIG. 18C is a diagram illustrating a beam spot on sensing elements of the detector array of FIG. 18A, consistent with embodiments of the present disclosure.

FIG. 18C shows an exemplary situation of a beam spot covering sensing elements of different sections, consistent with embodiments of the disclosure. As shown in FIG. 18C, detector array 1800 may include section 1802 and an adjacent section 1803. A secondary beam spot 1877 may be formed on detector array 1800 and may cover sensing elements of section 1803 as well as some sensing elements of section 1802. While some sensing elements of section 1802 may be covered by (e.g., within the boundaries of) beam spot 1877, sensing element 1804 that may be directly connected to common output 1818 may not be covered by beam spot 1877. Regardless, sensing element 1804 may be added to the group of sensing elements associated with beam spot 1877. An inter-element switching element 1822 may be closed, and sensing element 1804 may be connected to an adjacent sensing element 1805. Signals may be routed from sensing element 1805 and other sensing elements, and may be transmitted through common output 1818 via sensing element 1804.

In such a manner, at the hierarchy level of sensing elements, additional sensing elements (other than those that may be covered by a beam spot) may be involved in the grouping process as necessary to allow signals to be routed to a common output of other sections. Simultaneously, at the hierarchy level of switch networks (e.g., switch network 1706), switches may be actuated to connect common outputs of different sections.

In some situations, a beam spot may be so large as to cover a large number of sensing elements that may be included in one or more sections. If the beam spot is so large that the methods discussed above are no longer able to achieve the expected analog bandwidth, then the beam spot may be subdivided into sub areas. The group of sensing elements associated with the beam spot may be subdivided into subgroups. Each of the subgroups may correspond to the sub areas. The subgroups may provide additional analog signal paths and may help to achieve the targeted analog bandwidth.

In some embodiments, the first sensing element and the second sensing element may be adjacent sensing elements along one of a horizontal (e.g., x-axis) direction or a vertical (e.g., y-axis) direction in the first section. For example, the first and second sensing elements may be sensing elements 1904 and 1910 in FIG. 19A, respectively. In another example, the first and second sensing elements may be sensing elements 1904 and 1906 in FIG. 19A, respectively. In some embodiments, the first sensing element and the second sensing element may be adjacent sensing elements in a diagonal direction. For example, the first and second sensing elements may be sensing elements 1904 and 1908 in FIG. 19A, respectively. In another example, the first and second sensing elements may be sensing elements 1906 and 1910 in FIG. 19A, respectively.

In some embodiments, if the instruction data received at step 2104 of FIG. 20 is indicative of the beam spot intensity detection mode, the detector array may determine whether the first section (e.g., section 1802 in FIG. 18A) includes a first sensing element (e.g., sensing element 1804 in FIG. 18B) and whether one of the first section or the second section includes a second sensing element. The first and second sensing elements may output a first signal, and a second signal, respectively. If, on the other hand, the instruction data received at step 2104 is indicative of the beam spot boundary detection mode, the detector array may output the first signal and the second signal as independent signals.

In some embodiments, in the beam spot boundary detection mode, for example, the first section may include the first sensing element (e.g., sensing element 1804 in FIG. 18B) and the second sensing element (e.g., sensing element 1606 in FIG. 18B), and the first section may include a first output bus (e.g., output bus 1608 in FIG. 18A). For outputting the first signal and the second signal, the detector array may communicatively connect a first element-bus switching element (e.g., element-bus switching element 1618 in FIG. 18B) between the first sensing element (e.g., sensing element 1804 in FIG. 18B) and the first output bus, and communicatively connect a second element-bus switching element (e.g., element-bus switching element 1628 in FIG. 18B) between the second sensing element and the first output bus. The detector array may route the first signal from the first sensing element to the first output bus through the first element-bus switching element, and route the second signal from the second sensing element to the first output bus through the second element-bus switching element. The detector array may then output the first signal and the second signal from the first output bus to signal processing circuitry (e.g., section circuit 1603 in FIG. 18A). In some embodiments, for outputting the first signal and the second signal to the signal processing circuitry, the detector array may communicatively connect a second switching element (e.g., switching element 1612 in FIG. 18A) between the first output bus and signal processing circuitry, and output the first signal and the second signal to the signal processing circuitry through the second switching element.

In the beam spot boundary detection mode, each of the sensing elements in the detector may be addressed one-by-one (e.g., sequentially) to achieve an electronic scan on the detector surface. This may be used to acquire a detection image of a beam spot pattern on the detector. The sensing elements may be connected to a bus one at a time. For example, while one sensing element is connected to the bus, there may be no time period overlap of other sensing elements being connected to the bus. In FIG. 18B, element-bus switching element 1618 and element-bus switching element 1628 may be actuated one at a time such that only one of the respective sensing elements (1606 or 1804) is connected to output bus 1608 at a time. Signals from individual sensing elements may be transmitted independently and an image of a secondary beam projection image may be acquired.

In some embodiments, pixel binning may be performed. Pixel binning may involve combining signals from more than one sensing element at a time when transmitting the signals to the output bus. Pixel binning may be useful for obtaining a relatively lower resolution image of the secondary beam projection pattern at relatively higher speed. Pixel binning may comprise using switches between sensing elements and the bus to connect more than one sensing element to the bus at a time. In some embodiments, pixel binning may comprise using inter-element switching elements to connect sensing elements to be binned together. Then, any of the element-bus switching elements connected to the binned sensing elements may be actuated to connect the binned sensing elements to the bus. It will be understood that many variations, such as the above, may be achievable with a detector according to embodiments of the disclosure. A field-programmable detection device may be designed to have very high configuration flexibility and may be adaptable to many different application conditions.

The embodiments may further be described using the following clauses:

1. A detector comprising:
   a set of sensing elements comprising a first common output;
   inter-element switching elements configured to communicatively couple adjacent sensing elements of the set of sensing elements;
   an output bus configured to be communicatively coupled to each sensing element of the set of sensing elements;
   a junction configured to be communicatively coupled to the first common output via a first switching element and to the output bus via a second switching element; and
   a switch network arranged between the first common output and the first switching element, comprising an inter-set switching element configured to communicatively couple the first common output to a second common output of another set of sensing elements.

2. The detector of clause 1, wherein one sensing element of the set of sensing elements comprises the first common output.

3. The detector of any of clauses 1-2, wherein the second switching element is configured to control outputting a signal from the output bus to the junction.

4. The detector of any of clauses 1-3, further comprising:
   a first element-bus switching element configured to communicatively couple the output bus to a first sensing element of the set of sensing elements; and
   a second element-bus switching element configured to communicatively couple, independently from the first element-bus switching element, the output bus to a second sensing element of the set of sensing elements.

5. The detector of any of clauses 1-4, wherein the inter-element switching elements are configured to communicatively couple at least one sensing element of the set of sensing elements to a sensing element comprising the first common output.

6. The detector of clause 5, wherein the first switching element is configured to control outputting signals from the first common output to the junction.

7. The detector of any of clauses 5-6, wherein the first switching element and the second switching element are configured to control outputting one of signals from the first common output or the signal from the output bus to the junction.

8. The detector of any of clauses 5-7, wherein the switch network is configured to form a combined signal by adding signals from the first common output to other signals received from the second common output via the inter-set switching element.

9. The detector of clause 8, wherein the first switching element is further configured to control outputting the combined signal to the junction.

10. The detector of any of clauses 1-9, wherein the set of sensing elements is arranged as a matrix.

11. The detector of clause 10, wherein the inter-element switching elements comprise:
   a first inter-element switching element configured to communicatively couple a first sensing element to a second sensing element, wherein the first sensing element and the second sensing element are arranged along a first direction of the matrix; and
   a second inter-element switching element configured to communicatively couple the first sensing element to a third sensing element, wherein the first sensing element and the third sensing element are arranged along a second direction orthogonal to the first direction.

12. The detector of clause 11, wherein the inter-element switching elements further comprise a third inter-element switching element configured to communicatively couple the first sensing element to a fourth sensing element, wherein the fourth sensing element is arranged along a diagonal direction between the first direction and the second direction.

13. The detector of clause 12, wherein the inter-element switching elements further comprise:
   a fourth inter-element switching element configured to communicatively couple the first sensing element to a fifth sensing element, wherein the fifth sensing element is arranged along a second diagonal direction.

14. The detector of any of clauses 1-13, further comprising:
   section circuitry configured to communicatively couple the set of sensing elements to signal processing circuitry.

15. The detector of clause 14, wherein the junction is in the section circuitry.
16. The detector of any of clauses 14-15, wherein the first switching element is in the section circuitry.
17. The detector of any of clauses 14-16, wherein the second switching element is in the section circuitry.
18. The detector of any of clauses 14-17, wherein the switch network is in the section circuitry.
19. A detection system comprising:
   a set of sensing elements comprising a first common output;
   inter-element switching elements configured to communicatively couple adjacent sensing elements of the set of sensing elements;
   an output bus configured to be communicatively coupled to each sensing element of the set of sensing elements;
   a junction configured to be communicatively coupled to the first common output via a first switching element and to the output bus via a second switching element;
   a switch network arranged between the first common output and the first switching element, comprising an inter-set switching element configured to be communicatively couple the first common output to a second common output of another set of sensing elements; and
   signal processing circuitry communicatively coupled downstream from the junction, configured to process a signal from the junction.
20. The detection system of clause 19, wherein one sensing element of the set of sensing elements comprises the first common output.
21. The detection system of any of clauses 19-20, wherein the second switching element is configured to control outputting a signal from the output bus to the junction.
22. The detection system of any of clauses 19-21, further comprising:
   a first element-bus switching element configured to communicatively couple the output bus to a first sensing element of the set of sensing elements; and
   a second element-bus switching element configured to communicatively couple, independently from the first element-bus switching element, the output bus to a second sensing element of the set of sensing elements.
23. The detection system of any of clauses 20-22, wherein the inter-element switching elements are configured to communicatively couple at least one sensing element of the set of sensing elements to a sensing element comprising the first common output.
24. The detection system of clause 23, wherein the first switching element is configured to control outputting signals from the first common output to the junction.
25. The detection system of any of clauses 23-24, wherein the first switching element and the second switching element are configured to control outputting one of signals from the common output or the signal from the output bus to the junction.
26. The detection system of any of clauses 23-25, wherein the switch network is configured to form a combined signal by adding signals from the first common output to other signals received from the second common output via the inter-set switching element.
27. The detection system of clause 26, wherein the first switching element is further configured to control outputting the combined signal to the junction.
28. The detection system of any of clauses 18-27, wherein the set of sensing elements is arranged as a matrix.
29. The detection system of clause 28, wherein the inter-element switching elements comprise:
   a first inter-element switching element configured to communicatively couple a first sensing element to a second sensing element, wherein the first sensing element and the second sensing element are arranged along a first direction of the matrix; and
   a second inter-element switching element configured to communicatively couple the first sensing element to a third sensing element, wherein the first sensing element and the third sensing element are arranged along a second direction orthogonal to the first direction.
30. The detection system of clause 29, wherein the inter-element switching elements further comprise a third inter-element switching element configured to communicatively couple the first sensing element to a fourth sensing element, wherein the fourth sensing element is arranged along a diagonal direction between the first direction and the second direction.
31. The detection system of clause 30, wherein the inter-element switching elements further comprise: a fourth inter-element switching element configured to communicatively couple the first sensing element to a fifth sensing element, wherein the fifth sensing element is arranged along a second diagonal direction.
32. The detection system of any of clauses 19-31, further comprising:
   section circuitry configured to communicatively couple the set of sensing elements to the signal processing circuitry.
33. The detection system of clause 32, wherein the junction is in the section circuitry.
34. The detection system of any of clauses 32-33, wherein the first switching element is in the section circuitry.
35. The detection system of any of clauses 32-34, wherein the second switching element is in the section circuitry.
36. The detection system of any of clauses 32-35, wherein the switch network is in the section circuitry.
37. A charged-particle inspection system comprising:
   a charged-particle beam source configured to generate a primary charged-particle beam for sample scanning;
   a detector configured to receive a secondary charged-particle beam exiting from a point of incidence of the primary charged-particle beam, wherein the detector comprises:
   a set of sensing elements comprising a first common output;
   inter-element switching elements configured to communicatively couple adjacent sensing elements of the set of sensing elements;
   an output bus configured to be communicatively coupled to each sensing element of the set of sensing elements;
   a junction configured to be communicatively coupled to the first common output via a first switching element and to the output bus via a second switching element; and
   a switch network arranged between the first common output and the first switching element, comprising an inter-set switching element configured to be communicatively couple the first common output to a second common output of another set of sensing elements.
38. The charged-particle inspection system of clause 37, wherein one sensing element of the set of sensing elements comprises the first common output.
39. The charged-particle inspection system of any of clauses 37-38, wherein the second switching element is configured to control outputting a signal from the output bus to the junction.

40. The charged-particle inspection system of any of clauses 37-39, further comprising:
- a first element-bus switching element configured to communicatively couple the output bus to a first sensing element of the set of sensing elements; and
- a second element-bus switching element configured to communicatively couple, independently from the first element-bus switching element, the output bus to a second sensing element of the set of sensing elements.

41. The charged-particle inspection system of any of clauses 37-40, wherein the inter-element switching elements are configured to communicatively couple at least one sensing element of the set of sensing elements to a sensing element comprising the first common output.

42. The charged-particle inspection system of clause 41, wherein the first switching element is configured to control outputting signals from the first common output to the junction.

43. The charged-particle inspection system of any of clauses 41-42, wherein the first switching element and the second switching element are configured to control outputting one of signals from the first common output or the signal from the output bus to the junction.

44. The charged-particle inspection system of any of clauses 41-43, wherein the switch network is configured to form a combined signal by adding signals from the first common output to other signals received from the second common output via the inter-set switching element.

45. The charged-particle inspection system of clause 44, wherein the first switching element is further configured to control outputting the combined signal to the junction.

46. The charged-particle inspection system of any of clauses 37-45, wherein the set of sensing elements is arranged as a matrix.

47. The charged-particle inspection system of clause 46, wherein the inter-element switching elements comprise:
- a first inter-element switching element configured to communicatively couple a first sensing element and a second sensing element, wherein the first sensing element and the second sensing element are arranged along a first direction of the matrix; and
- a second inter-element switching element configured to communicatively couple the first sensing element and a third sensing element, wherein the first sensing element and the third sensing element are arranged along a second direction orthogonal to the first direction.

48. The charged-particle inspection system of clause 47, wherein the inter-element switching elements further comprise a third inter-element switching element configured to communicatively couple the first sensing element to a fourth sensing element, wherein the fourth sensing element is arranged along a diagonal direction between the first direction and the second direction.

49. The charged-particle inspection system of clause 48, wherein the inter-element switching elements further comprise:
- a fourth inter-element switching element configured to communicatively couple the first sensing element to a fifth sensing element, wherein the fifth sensing element is arranged along a second diagonal direction.

50. The charged-particle inspection system of any of clauses 37-48, further comprising: section circuitry configured to communicatively couple the set of sensing elements to signal processing circuitry.

51. The charged-particle inspection system of clause 50, wherein the junction is in the section circuitry.

52. The charged-particle inspection system of any of clauses 50-51, wherein the first switching element is in the section circuitry.

53. The charged-particle inspection system of any of clauses 50-52, wherein the second switching element is in the section circuitry.

54. The charged-particle inspection system of any of clauses 50-53, wherein the switch network is in the section circuitry.

55. A computer-implemented method, comprising:
- receiving charged particles of a secondary charged-particle beam at a first section of sensing elements of a charged-particle detector;
- receiving instruction data indicative of one of a first mode or a second mode for operating the charged-particle detector; and
- based on the instruction data, causing one of outputting a combined signal determined using signals from the first section corresponding to the second mode, or outputting independent signals from the sensing elements of the first section corresponding to the first mode.

56. The computer-implemented method of clause 55, wherein
- the first section includes a first sensing element and a second element, and
- outputting the combined signal comprises receiving a first signal from the first sensing element and a second signal from the second sensing element.

57. The computer-implemented method of clause 56, wherein the first sensing element comprises a common output, and outputting the combined signal comprises:
- routing the combined signal through the common output.

58. The computer-implemented method of clause 56 or clause 57, further comprising:
- connecting an inter-element switching element between the first sensing element and the second sensing element.

59. The computer-implemented method of any of clauses 55-58, wherein the charged-particle detector comprises a second set of sensing elements, and outputting the combined signal comprises:
- connecting an inter-element switching element between a sensing element of the first section and a sensing element of the second section.

60. The computer-implemented method of clause 55, wherein the first section comprises a first sensing element, a second sensing element, and a third sensing element, the first sensing element comprising a first common output, and the charged-particle detector comprises a second section of sensing elements, wherein outputting the combined signal comprises:
- connecting an inter-element switching element between a fourth sensing element of the second section and the third sensing element; and
- routing a signal from the sensing element of the second section through the first common output.

61. The computer-implemented method of clause 55, wherein the first sensing element is on a boundary of the first section.

62. The computer-implemented method of clause 55, wherein the first sensing element is at an interior of the first section.

63. The computer-implemented method of any of clauses 55-62, wherein the fourth sensing element of the second section is between the fifth sensing element and the third sensing element.

64. The computer-implemented method of clause 60, wherein the fifth sensing element comprises a second common output, the method further comprising:
- connecting an inter-section switching element of a switch network between the first section and the second section; and
- forming the combined signal by adding a signal from the first common output to a signal from the second common output.

65. The computer-implemented method of clause 55, wherein outputting the independent signals comprises:
- connecting a first element-bus switching element between a first sensing element and a first output bus; and
- connecting a second element-bus switching element between a second sensing element and the first output bus.

66. The computer-implemented method of clause 64, wherein outputting the combined signal comprises:
- actuating a switching element between the switch network and a signal processing circuit of the first section.

67. The computer-implemented method of clause 65, wherein the first section comprises the first output bus, and the second section comprises a second output bus.

68. The computer-implemented method of clause 65, wherein outputting the independent signals comprises:
- actuating the first element-bus switching element and the second element-bus switching element sequentially.

69. The computer-implemented method of clause 65, wherein outputting the independent signals comprises:
- performing pixel binning that comprises connecting the first element-bus switching element and the second element-bus switching element simultaneously.

70. The computer-implemented method of clause 65, wherein outputting the independent signals comprises:
- performing pixel binning that comprises connecting an inter-element switching element between the first sensing element and a first neighboring sensing element when the first element-bus switching element is connected; and connecting an inter-element switching element between the second sensing element and a second neighboring sensing element when the second element-bus switching element is connected.

71. A non-transitory computer-readable medium that stores a set of instructions that is executable by at least one processor of an apparatus to cause the apparatus to perform a method, the method comprising:
- receiving charged particles of a secondary charged-particle beam at a first section of sensing elements of a charged-particle detector;
- receiving instruction data indicative of one of a first mode or a second mode for operating the charged-particle detector; and
- based on the instruction data, causing one of outputting a combined signal determined using signals from the first section corresponding to the second mode, or outputting independent signals from the sensing elements of the first section corresponding to the first mode.

A non-transitory computer-readable medium may be provided that stores instructions for a processor of a controller (e.g., controller 109 in FIG. 1 or controller 904 in FIG. 9) for detecting a charged-particle beam according to the exemplary flowcharts of FIG. 15 and FIG. 20 above, consistent with embodiments in the present disclosure. For example, the instructions stored in the non-transitory computer-readable medium may be executed by the circuitry of the controller for performing method 1500 or 2100 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A detector comprising:
- a set of sensing elements comprising a first common output;
- inter-element switching elements configured to communicatively couple adjacent sensing elements of the set of sensing elements;
- an output bus configured to be communicatively coupled to each sensing element of the set of sensing elements;
- a junction configured to be communicatively coupled to the first common output via a first switching element and to the output bus via a second switching element; and
- a switch network arranged between the first common output and the first switching element, comprising an inter-set switching element configured to communicatively couple the first common output to a second common output of another set of sensing elements.

2. The detector of claim 1, wherein one sensing element of the set of sensing elements comprises the first common output.

3. The detector of claim 1, wherein the second switching element is configured to control outputting a signal from the output bus to the junction.

4. The detector of claim 1, further comprising:
- a first element-bus switching element configured to communicatively couple the output bus to a first sensing element of the set of sensing elements; and
- a second element-bus switching element configured to communicatively couple, independently from the first element-bus switching element, the output bus to a second sensing element of the set of sensing elements.

5. The detector of claim 1, wherein the inter-element switching elements are configured to communicatively couple at least one sensing element of the set of sensing elements to a sensing element comprising the first common output.

6. The detector of claim 5, wherein the first switching element is configured to control outputting signals from the first common output to the junction.

7. The detector of claim 5, wherein the first switching element and the second switching element are configured to control outputting one of signals from the first common output or the signal from the output bus to the junction.

8. The detector of claim 5, wherein the switch network is configured to form a combined signal by adding signals from the first common output to other signals received from the second common output via the inter-set switching element.

9. The detector of claim 8, wherein the first switching element is further configured to control outputting the combined signal to the junction.

10. The detector of claim 1, wherein the set of sensing elements is arranged as a matrix.

11. The detector of claim 10, wherein the inter-element switching elements comprise:
   a first inter-element switching element configured to communicatively couple a first sensing element to a second sensing element, wherein the first sensing element and the second sensing element are arranged along a first direction of the matrix; and
   a second inter-element switching element configured to communicatively couple the first sensing element to a third sensing element, wherein the first sensing element and the third sensing element are arranged along a second direction orthogonal to the first direction.

12. The detector of claim 11, wherein the inter-element switching elements further comprise a third inter-element switching element configured to communicatively couple the first sensing element to a fourth sensing element, wherein the fourth sensing element is arranged along a diagonal direction between the first direction and the second direction.

13. The detector of claim 12, wherein the inter-element switching elements further comprise:
   a fourth inter-element switching element configured to communicatively couple the first sensing element to a fifth sensing element, wherein the fifth sensing element is arranged along a second diagonal direction.

14. The detector of claim 1, further comprising:
   section circuitry configured to communicatively couple the set of sensing elements to signal processing circuitry.

15. The detector of claim 14, wherein the junction is in the section circuitry.

16. The detector of claim 14, wherein the first switching element is in the section circuitry.

17. The detector of claim 14, wherein the second switching element is in the section circuitry.

18. The detector of claim 14, wherein the switch network is in the section circuitry.

19. A detection system comprising:
   a set of sensing elements comprising a first common output;
   inter-element switching elements configured to communicatively couple adjacent sensing elements of the set of sensing elements;
   an output bus configured to be communicatively coupled to each sensing element of the set of sensing elements;
   a junction configured to be communicatively coupled to the first common output via a first switching element and to the output bus via a second switching element;
   a switch network arranged between the first common output and the first switching element, comprising an inter-set switching element configured to be communicatively couple the first common output to a second common output of another set of sensing elements; and
   signal processing circuitry communicatively coupled downstream from the junction, configured to process a signal from the junction.

* * * * *